United States Patent
Arai et al.

(10) Patent No.: US 6,850,038 B2
(45) Date of Patent: Feb. 1, 2005

(54) METHOD OF ESTIMATING STATE OF CHARGE AND OPEN CIRCUIT VOLTAGE OF BATTERY, AND METHOD AND DEVICE FOR COMPUTING DEGRADATION DEGREE OF BATTERY

(75) Inventors: Youichi Arai, Shizuoka (JP); Shuji Satake, Shizuoka (JP); Yoshiya Miyazaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/437,454

(22) Filed: May 14, 2003

(65) Prior Publication Data

US 2004/0008031 A1 Jan. 15, 2004

(30) Foreign Application Priority Data

May 14, 2002 (JP) ........................................ 2002-139230
Mar. 31, 2003 (JP) ........................................ 2003-097468

(51) Int. Cl.⁷ .......................... H02J 7/00; G01N 27/416
(52) U.S. Cl. ........................................ 320/132; 324/429
(58) Field of Search .......................... 320/132; 324/129, 324/130

(56) References Cited

U.S. PATENT DOCUMENTS 6,788,068 B2 * 9/2004 Arai .......................... 324/430

* cited by examiner

Primary Examiner—Pia Tibbits
(74) Attorney, Agent, or Firm—Armstrong, Kratz, Quintos, Hanson & Brooks, LLP

(57) ABSTRACT

A method of estimating a state of charge of a battery, a method of estimating an open circuit voltage of a battery, and a method and device for computing a degradation degree of a battery are provided. As a degradation degree, a ratio of a total electrical quantity chargeable or dischargeable of a battery at any time point to an initial electrical quantity that is a total electrical quantity chargeable or dischargeable of the battery upon non-degradation is computed, and by using the degradation degree, a state of charge or an open circuit voltage of the battery is accurately estimated.

25 Claims, 24 Drawing Sheets

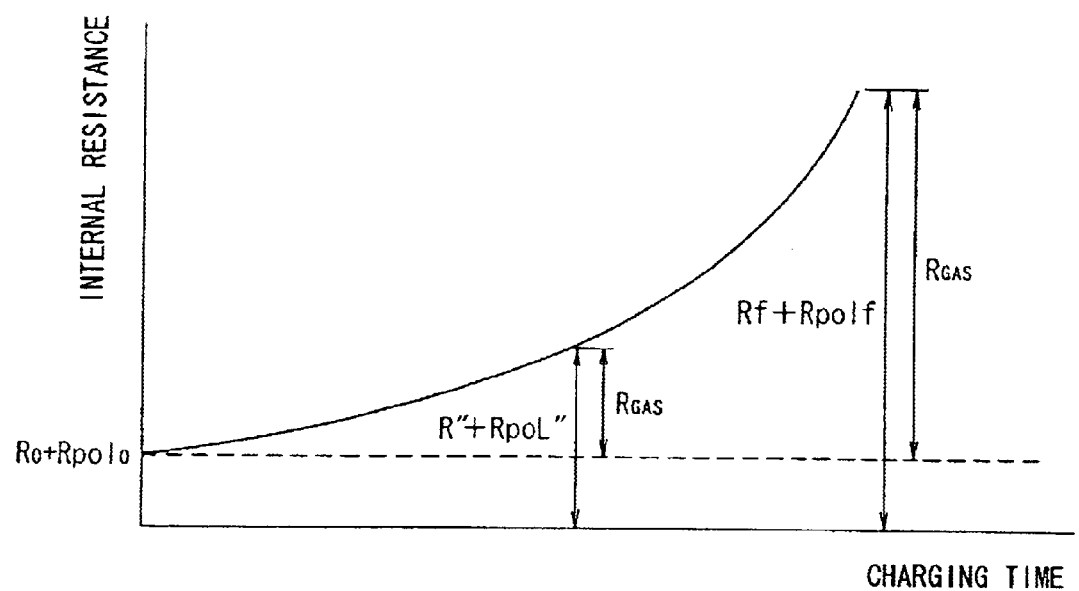
F I G. 2 1
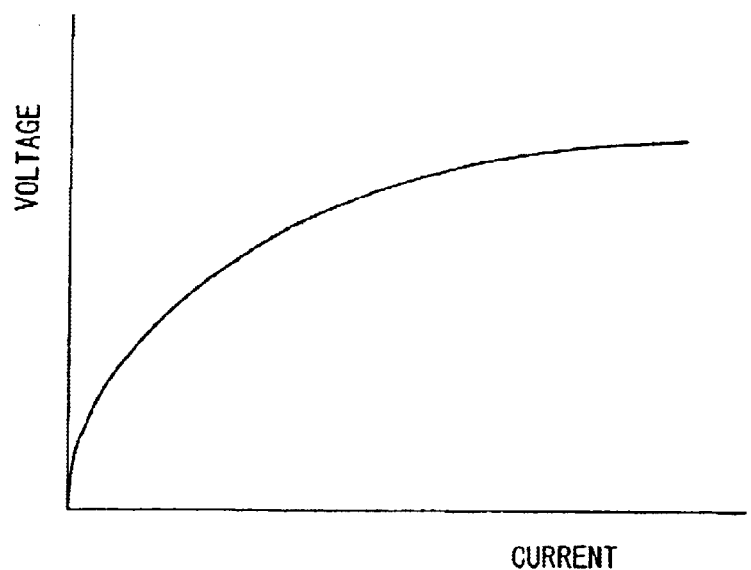
F I G. 2 4

METHOD OF ESTIMATING STATE OF CHARGE AND OPEN CIRCUIT VOLTAGE OF BATTERY, AND METHOD AND DEVICE FOR COMPUTING DEGRADATION DEGREE OF BATTERY

BACKGROUND OF THE INVENTION (1) Field of the Invention

The present invention relates to a method of estimating a state of charge of an on-vehicle battery that supplies electric power to on-vehicle loads, a method of estimating an open circuit voltage of the battery, and a method and device for computing a degradation degree of the battery.

(2) Description of the Related Art

Generally, as for an on-vehicle battery, an open circuit voltage upon fully charged state, an open circuit voltage upon completion of a discharge and an initial electrical quantity that is dischargeable from the open circuit voltage upon fully charged state to the open circuit voltage upon completion of a discharge are determined in advance with regard to a non-degraded battery. Then, a state of charge corresponding to any open circuit voltage or an open circuit voltage corresponding to a state of charge can be estimated on the basis of the open circuit voltage upon fully charged state, the open circuit voltage upon completion of a discharge and the initial electrical quantity.

As for a battery, its equivalent circuit is expressed by a series circuit of an electromotive force E0 and an internal impedance R0. One of parameters for expressing a state of the battery is a state of charge (SOC) as an initial electrical quantity that is dischargeable from the open circuit voltage upon fully charged state to the open circuit voltage upon completion of a discharge. The state of charge SOC is expressed by a percentage (%) as a relative capacity or ampere×hour (Ah) as an absolute capacity if an Ah value upon fully charged state is set to be 100%. The state of charge SOC can be estimated on the basis of an open circuit voltage (OCV), which is equal to the electromotive force E0 and is a terminal voltage in an open circuit state of a battery in its equilibrium state, in which state a polarization arisen in the battery due to a charge or discharge is canceled. Here, the open circuit voltage OCV has been measured or estimated.

If the SOC is expressed by a percentage, as seen in FIG. 35 illustrating a relation between SOC and OCV, the SOC (Ah) upon designing is always equal to an Ah converted value of the SOC (%), that is, a relation from the open circuit voltage upon fully charged state to the open circuit voltage upon completion of a discharge.

As for a battery, a reference internal (electrical) resistance value that varies depending on the state of charge is set clear as an internal impedance. The reference internal resistance value is used to know whether or not a terminal voltage of the battery becomes equal to or less than a vale of the open circuit voltage upon completion of a discharge when a certain discharge is carried out. For example, the reference internal resistance value is used to carry out a control of switching from a discharge to a charge when the open circuit voltage drops to a specific value or less.

However, when the battery degrades, the internal impedance tends to exceed the reference internal resistance value. In this case, the terminal voltage of the battery drops by a factor of an increase in the voltage drop in the battery during a discharge and therefore, a necessary terminal voltage of the battery cannot be obtained when a certain amount of discharge is carried out. For example, when a driver wants to start an engine of a vehicle again after the engine is once halted, the driver cannot start the engine again even if the driver thinks that the battery still has a sufficient capacity to start the engine.

That is, it is known that an allowable discharge capacity (ADC) of the battery decreases due to the increase in the internal impedance caused by the degradation. Accordingly, it has been regarded that the allowable discharge capacity should be revised by knowing the increase in the internal impedance caused by the degradation.

However, as mentioned above, even if the allowable discharge capacity is revised by knowing the increase in the internal impedance caused by the degradation, a necessary terminal voltage of the battery cannot be obtained when a certain amount of discharge is carried out, resulting in that the engine cannot be stated.

Facing such a problem as described above, so far one has understood the problem such that one could not correctly know the increase in the internal impedance caused by the degradation and one has solved the problem by taking a large margin for covering the inaccuracy. However, when the large margin is taken, it causes an obstruction when the capacity of the battery should be fully taken out. For example, in a hybrid vehicle, such a measure (taking a large margin) requires an early switching to a charge-direction, causing a degradation in fuel efficiency of a vehicle as a result.

As for a degradation of a battery, it has been known that inactivation degradation, that is, inactivation of active materials such as decrease in electrolyte and reduction in electrode-constituting material (thin plate made of lead in case of a lead battery) takes place besides the increase in the internal impedance as described above.

As shown in FIG. 35, in a case of the above-mentioned inactivation degradation, the relation between SOC and OCV is different from that in the case of non-degradation, in which the inactivation degradation does not take place, and the electrical quantity corresponding to the open circuit voltage upon fully charged state becomes small. To the contrary, in a case of the degradation, in which the internal impedance of a battery increases, its relation between SOC and OCV does not differ from that in a case of no degradation. As for a battery, in which the inactivation degradation takes place, if the OCV is converted into an Ah value, similarly to a case of a battery having no inactivation degradation, a value higher than its actual Ah value is obtained.

If such a value higher than its actual Ah value is obtained and therefore, if the accurate Ah value cannot be obtained, the OCV cannot be estimated accurately on the basis of the SOC, which varies from moment to moment during use of the battery and for example, when a driver wants to start an engine of a vehicle again after the engine is once halted, the driver cannot start the engine again even if the driver thinks that the battery still has a sufficient capacity to start the engine.

SUMMARY OF THE INVENTION

It is therefore an objective of the present invention to solve the above problem and to provide a method of accurately estimating a state of charge of a battery taking the above-mentioned inactivation degradation into consideration.

The present invention is also to provide a method of accurately estimating an open circuit voltage of a battery taking the inactivation degradation into consideration.

The present invention is also to provide a method and device for computing a degradation degree of a battery, which can be used to accurately know a state of a battery.

In order to attain the above objective, the present invention is to provide a method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a ratio of a total electrical quantity chargeable or dischargeable of the battery at any time point to the initial electrical quantity; and multiplying an electrical quantity estimated corresponding to said any open circuit voltage by the degradation degree, thereby estimating a state of charge of the battery at said any time point.

With the construction described above, even if inactivation degradation of active materials takes place in the battery, by estimating or measuring an open circuit voltage of the battery, a state of charge of the battery can be estimated taking the degradation degree due to the inactivation degradation into consideration on the basis of an electrical quantity corresponding to the open circuit voltage.

In order to attain the objective, the present invention is to provide a method of estimating a state of charge of a battery, in which an electrical quantity corresponding to any open circuit voltage of the battery is estimated on the basis of an initial electrical quantity that is a total electrical quantity chargeable or dischargeable between an open circuit voltage upon fully charged state and an open circuit voltage upon completion of a discharge which are predetermined for the battery upon non-degradation, the method comprising the steps of:

computing, as a degradation degree, a ratio of a total electrical quantity chargeable or dischargeable between an open circuit voltage upon fully charged state and an open circuit voltage upon completion of a discharge of the battery at any time point to the initial electrical quantity; and multiplying an electrical quantity estimated corresponding to said any open circuit voltage by the degradation degree, thereby estimating a state of charge of the battery at said any time point.

With the construction described above, even if inactivation degradation of active materials takes place in the battery, by estimating or measuring an open circuit voltage of the battery, a state of charge of the battery can be estimated taking the degradation degree due to the inactivation degradation into consideration on the basis of an electrical quantity corresponding to the open circuit voltage.

Preferably, the open circuit voltage upon fully charged state and the open circuit voltage upon completion of a discharge for the battery upon non-degradation are determined on the basis of a relation between an open circuit voltage and a state of charge, which relation is predetermined as an approximate expression computed by using data of state of charge in a range in which the state of charge exceeds a predetermined state of charge and data of open circuit voltage corresponding to the state of charge in the range, and if said any open circuit voltage exceeds an open circuit voltage corresponding to the predetermined state of charge on the approximate expression, the electrical quantity corresponding to said any open circuit voltage is estimated to be a state of charge corresponding to an open circuit voltage which is obtained by substituting said any open circuit voltage into an expression of the approximate expression, and if said any open circuit voltage does not exceed an open circuit voltage corresponding to the predetermined state of charge on the approximate expression, the electrical quantity corresponding to said any open circuit voltage is estimated to be a state of charge which is computed by adding or subtracting an integrated value of a charge or discharge current (that is, an integrated value of a charge or discharge current with time) to or from a state of charge before a start of a charge or discharge.

With the construction described above, even if the state of charge (SOC) is low, such a SOC can be accurately estimated. Furthermore, since an open circuit voltage (OCV) upon completion of a discharge is determined by the approximate expression, an estimation of a dischargeable capacity can be accurately carried out for a whole range of the SOC.

Preferably, the predetermined relation between an open circuit voltage and a state of charge of the battery is expressed by an approximate expression expressing an approximate straight line which is computed with least squares method by using data of state of charge in a range in which the state of charge exceeds a predetermined state of charge and data of open circuit voltage corresponding to the state of charge in the range.

With the construction described above, an accurate relation between OCV and SOC can be obtained without using OCV and SOC data in a range in which the relation therebetween is non-linear.

In order to attain the objective, the present invention is to provide a method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a ratio of a change (that is, increase or decrease) in an open circuit voltage corresponding to any change (that is, increase or decrease) in the electrical quantity of the battery upon non-degradation to a change in an open circuit voltage actually arising in the battery at any time point in response to said any change in the electrical quantity; and multiplying an electrical quantity estimated corresponding to said any open circuit voltage by the degradation degree, thereby estimating a state of charge of the battery at said any time point.

With the construction described above, even if inactivation degradation of active materials takes place in the battery, by estimating or measuring a change in an open circuit voltage of the battery, a state of charge of the battery can be estimated taking the degradation degree due to the inactivation degradation into consideration on the basis of an electrical quantity corresponding to the open circuit voltage.

In order to attain the objective, the present invention is to provide a method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a ratio of a change in an electrical quantity actually arising in the battery at any time point in response to a change in said any open circuit voltage to a change in an electrical quantity in response to a change in said any open circuit voltage of the battery upon non-degradation; and multiplying an electrical quantity estimated corresponding to said any open circuit voltage by the degradation degree, thereby estimating a state of charge of the battery at said any time point.

With the construction described above, even if inactivation degradation of active materials takes place in the battery, by estimating or measuring a change in an electrical quantity of the battery, a state of charge of the battery can be estimated taking the degradation degree due to the inactivation degradation into consideration on the basis of an electrical quantity corresponding to the open circuit voltage.

In order to attain the objective, the present invention is to provide a method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity; and multiplying an electrical quantity estimated corresponding to said any open circuit voltage by the degradation degree, thereby estimating a state of charge of the battery at said any time point.

With the construction described above, even if inactivation degradation of active materials takes place in the battery, by estimating or measuring a change in an open circuit voltage upon fully charged state of the battery and a change in an open circuit voltage, a state of charge of the battery can be estimated taking the degradation degree due to the inactivation degradation into consideration on the basis of an electrical quantity corresponding to the open circuit voltage.

In order to attain the objective, the present invention is to provide a method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a total electrical quantity chargeable or dischargeable of the battery at any time point to the initial electrical quantity; and revising an open circuit voltage estimated corresponding to said any electrical quantity by the degradation degree, thereby estimating an open circuit voltage of the battery at said any time point.

With the construction described above, even if inactivation degradation of active materials takes place in the battery, by measuring an electrical quantity of the battery, an open circuit voltage of the battery can be estimated after the revision with the degradation degree due to the inactivation degradation is carried out on the basis of an open circuit voltage corresponding to the electrical quantity.

In order to attain the objective, the present invention is to provide a method of estimating an open circuit voltage of a battery, in which an open circuit voltage corresponding to any electrical quantity of the battery is estimated on the basis of an initial electrical quantity that is a total electrical quantity chargeable or dischargeable between an open circuit voltage upon fully charged state and an open circuit voltage upon completion of a discharge which are predetermined for the battery upon non-degradation, the method comprising the steps of:

computing, as a degradation degree, a ratio of a total electrical quantity chargeable or dischargeable between an open circuit voltage upon fully charged state and an open circuit voltage upon completion of a discharge of the battery at any time point to the initial electrical quantity; and revising an open circuit voltage estimated corresponding to said any electrical quantity by the degradation degree, thereby estimating an open circuit voltage of the battery at said any time point.

With the construction described above, even if inactivation degradation of active materials takes place in the battery, by measuring an electrical quantity of the battery, an open circuit voltage of the battery can be estimated after the revision with the degradation degree due to the inactivation degradation is carried out on the basis of an open circuit voltage corresponding to the electrical quantity.

Preferably, the open circuit voltage upon fully charged state and the open circuit voltage upon completion of a discharge for the battery upon non-degradation are determined on the basis of a relation between an open circuit voltage and a state of charge, which relation is predetermined as an approximate expression computed by using data of state of charge in a range in which the state of charge exceeds a predetermined state of charge and data of open circuit voltage corresponding to the state of charge in the range, and if the open circuit voltage corresponding to said any electrical quantity exceeds an open circuit voltage corresponding to the predetermined state of charge in the approximate expression, the open circuit voltage corresponding to said any electrical quantity is estimated to be an open circuit voltage which is measured after a charge or discharge, and if the open circuit voltage corresponding to said any electrical quantity does not exceed an open circuit voltage corresponding to the predetermined state of charge in the approximate expression, the open circuit voltage corresponding to said any electrical quantity is estimated to be an open circuit voltage corresponding to a state of charge which is obtained by substituting a state of charge, which is computed by adding or subtracting an integrated value of a charge or discharge current to or from a state of charge before a start of a charge or discharge, into the approximate expression.

With the construction described above, even if the state of charge (SOC) is low, such a SOC can be accurately estimated. Furthermore, since an open circuit voltage (OCV) upon completion of a discharge is determined by the approximate expression, an estimation of a dischargeable capacity can be accurately carried out for a whole range of the SOC.

Preferably, the predetermined relation between an open circuit voltage and a state of charge of the battery is expressed by an approximated expression expressing an approximate straight line which is computed with least squares method by using data of state of charge in a range in which the state of charge exceeds a predetermined state of charge and data of open circuit voltage corresponding to the state of charge in the range.

With the construction described above, an accurate relation between OCV and SOC can be obtained without using OCV and SOC data in a range in which the relation therebetween is non-linear.

In order to attain the objective, the present invention is to provide a method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a change in an open circuit voltage corresponding to any change in the electrical quantity of the battery upon non-degradation to a change in an open circuit voltage actually arising in the battery at any time point in response to said any change in the electrical quantity; and revising an open circuit voltage estimated corresponding to said any electrical quantity by the degradation degree, thereby estimating an open circuit voltage of the battery at said any time point.

With the construction described above, even if inactivation degradation of active materials takes place in the battery, by estimating or measuring a change in an open circuit voltage of the battery, an open circuit voltage of the battery can be estimated after the revision with the degradation degree due to the inactivation degradation is carried out on the basis of an open circuit voltage corresponding to the electrical quantity.

In order to attain the objective, the present invention is to provide a method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a change in an electrical quantity actually arising in the battery at any time point in response to a change in said any open circuit voltage to a change in an electrical quantity in response to a change in said any open circuit voltage of the battery upon non-degradation; and revising an open circuit voltage estimated corresponding to said any electrical quantity by the degradation degree, thereby estimating an open circuit voltage of the battery at said any time point.

With the construction described above, even if inactivation degradation of active materials takes place in the battery, by estimating or measuring a change in an electrical quantity of the battery, an open circuit voltage of the battery can be estimated after the revision with the degradation degree due to the inactivation degradation is carried out on the basis of an open circuit voltage corresponding to the electrical quantity.

In order to attain the objective, the present invention is to provide a method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity; and revising an open circuit voltage estimated corresponding to said any electrical quantity by the degradation degree, thereby estimating an open circuit voltage of the battery at said any time point.

With the construction described above, even if inactivation degradation of active materials takes place in the battery, by estimating or measuring a change in an open circuit voltage upon fully charged state of the battery and a change in an open circuit voltage, an open circuit voltage of the battery can be estimated after the revision with the degradation degree due to the inactivation degradation is carried out on the basis of an open circuit voltage corresponding to the electrical quantity.

In order to attain the objective, the present invention is to provide a method of computing a degradation degree of a battery comprising a step of computing, as the degradation degree, a ratio of a total electrical quantity chargeable or dischargeable of the battery at any time point to an initial electrical quantity that is a total electrical quantity chargeable or dischargeable of the battery upon non-degradation.

With the construction described above, the computed degradation degree reflects a change in a relation between a total electrical quantity chargeable or dischargeable for the battery at any time point and a total electrical quantity chargeable or dischargeable for the battery upon non-degradation, that is, reflects the inactivation degradation of the active materials in the battery. Therefore, by using the degradation degree computed, a state of charge that is an electrical quantity at any time point and an open circuit voltage can be more accurately estimated.

In order to attain the objective, the present invention is to provide a method of computing a degradation degree of a battery comprising a step of computing, as the degradation degree, a ratio of a total electrical quantity chargeable or dischargeable between an open circuit voltage upon fully charged state and an open circuit voltage upon completion of a discharge of the battery at any time point to an initial electrical quantity, which is a total electrical quantity chargeable or dischargeable between an open circuit voltage upon fully charged state and an open circuit voltage upon completion of a discharge that are predetermined for the battery upon non-degradation.

With the construction described above, the computed degradation degree reflects a change in a relation between a total electrical quantity chargeable or dischargeable between an open circuit voltage upon fully charged state and an open circuit voltage upon completion of a discharge of the battery at any time point and an initial electrical quantity, which is a total electrical quantity chargeable or dischargeable between an open circuit voltage upon fully charged state and an open circuit voltage upon completion of a discharge that are predetermined for the battery upon non-degradation, that is, reflects the inactivation degradation of the active materials in the battery. Therefore, by using the degradation degree computed, a state of charge that is an electrical quantity at any time point and an open circuit voltage can be more accurately estimated.

In order to attain the objective, the present invention is to provide a method of computing a degradation degree of a battery comprising a step of computing, as the degradation degree, a ratio of a change in an open circuit voltage corresponding to any change in an electrical quantity of the battery upon non-degradation to a change in an open circuit voltage actually arising in the battery at any time point in response to said any change in the electrical quantity.

With the construction described above, the computed degradation degree reflects a change in a relation between a total electrical quantity chargeable or dischargeable between an open circuit voltage upon fully charged state and an open circuit voltage upon completion of a discharge of the battery at any time point and an initial electrical quantity, which is a total electrical quantity chargeable or dischargeable between an open circuit voltage upon fully charged state and an open circuit voltage upon completion of a discharge that are predetermined for the battery upon non-degradation, that is, reflects the inactivation degradation of the active materials in the battery. Therefore, by using the degradation degree computed, a state of charge that is an electrical quantity at any time point and an open circuit voltage can be more accurately estimated.

Preferably, a discharge current flowing during a discharge is intermittently measured and the measured discharge current is integrated with time, thereby computing said any decrease in the electrical quantity.

With the construction described above, an electrical quantity that decreases during a discharge is obtained by measuring a discharge current, and a ratio of decrease in an open circuit voltage accompanying with any decrease in an electrical quantity of the battery at any time point relative to that of the battery upon non-degradation is computed, thereby computing the degradation degree.

Preferably, a charge current flowing during a charge is intermittently measured and the measured discharge current is integrated with time by multiplying a real-time charging efficiency, thereby computing said any increase in the electrical quantity.

With the construction described above, an electrical quantity that increases during a charge is obtained by measuring it by taking the real-time charging efficiency into consideration, and a ratio of increase in an open circuit voltage accompanying with any increase in an electrical quantity of the battery at any time point relative to that of the battery upon non-degradation is more accurately computed, thereby computing the degradation degree.

Preferably, a change in an open circuit voltage in response to said any change in the electrical quantity is computed as a difference between an open circuit voltage before a start of charge or discharge, which is estimated or measured from a terminal voltage of the battery, and an open circuit voltage after a halt of charge or discharge, which is computed on the basis of an initial electrical quantity that is a total electrical quantity chargeable or dischargeable of the battery upon non-degradation, and the change in an open circuit voltage actually arising in the battery at any time point in response to said any change in the electrical quantity is computed as a difference between an open circuit voltage before a start of charge or discharge, which is estimated or measured from a terminal voltage of the battery, and an open circuit voltage after a halt of charge or discharge, which is estimated or measured from a terminal voltage of the battery.

With the construction described above, an open circuit voltage before or after a charge or discharge is estimated from a terminal voltage of the battery or measured, and is computed on the basis of an electrical quantity after a charge or discharge, thereby the degradation degree can be easily computed.

In order to attain the objective, the present invention is to provide a method of computing a degradation degree of a battery comprising a step of computing, as the degradation degree, a ratio of a change in an electrical quantity actually arising in the battery at any time point in response to said any change in an open circuit voltage to a change in an electrical quantity in response to any change in an open circuit voltage of the battery upon non-degradation.

With the construction described above, the computed degradation degree reflects a change in a relation between a change in an electrical quantity of the battery at any time point and a change in an electrical quantity of the battery upon non-degradation, that is, reflects the inactivation degradation of the active materials in the battery. An open circuit voltage before or after a charge or discharge is estimated from a terminal voltage of the battery or measured, and each change in an electrical quantity of the battery upon non-degradation and at any time point corresponding to the change in the open circuit voltage is computed and measured, thereby the degradation degree is easily computed from their relation. By using this degradation degree, a state of charge that is an electrical quantity at any time point and an open circuit voltage can be estimated.

In order to attain the objective, the present invention is to provide a method of computing a degradation degree of a battery comprising a step of computing, as the degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity.

With the construction described above, the computed degradation degree reflects a change in an open circuit voltage upon fully charged state and a change in a change in an open circuit voltage of the battery upon non-degradation and at any time point, that is, reflects the inactivation degradation of the active materials in the battery. An open circuit voltage upon fully charged state is estimated or measured, and each change in an open circuit voltage of the battery upon non-degradation and at any time point corresponding to any change in the electrical quantity is computed and measured, thereby the degradation degree is easily computed from their relation. By using this degradation degree, a state of charge that is an electrical quantity at any time point and an open circuit voltage can be estimated.

In order to attain the objective, the present invention is to provide a device for computing a degradation degree of a battery comprising:

first means for computing a change in an electrical quantity during a charge or discharge of a battery;

second means for computing a change in an open circuit voltage in response to any change in an electrical quantity computed by the first means on the basis of an initial electrical quantity that is a total electrical quantity chargeable or dischargeable of the battery upon non-degradation;

third means for estimating or measuring a change in an open circuit voltage actually arising in the battery at any time point in response to said any change in an electrical quantity; and fourth means for computing, as the degradation degree, a rate of the change in an open circuit voltage computed by the second means to the change in an open circuit voltage estimated or measured by the third means.

With the construction described above, the computed degradation degree reflects a change in a relation between a change in an open circuit voltage of the battery at any time point and a change in an open circuit voltage of the battery upon non-degradation, that is, reflects the inactivation degradation of the active materials in the battery. By using this degradation degree, a state of charge that is an electrical quantity of the battery at any time point and an open circuit voltage can be more accurately estimated.

BRIEF DESCRIPTION OF THE DRAWINGS

FIG. 21 is a graph illustrating a variation with time in charge/discharge current arisen in a battery, in which charge electrical quantity is detected by using a device for detecting charge electrical quantity of an on-vehicle battery shown in FIG. 2;

FIG. 24 is a graph illustrating an example of a change in polarization with respect to current;

DESCRIPTION OF THE PREFERRED EMBODIMENTS

Figure 1:
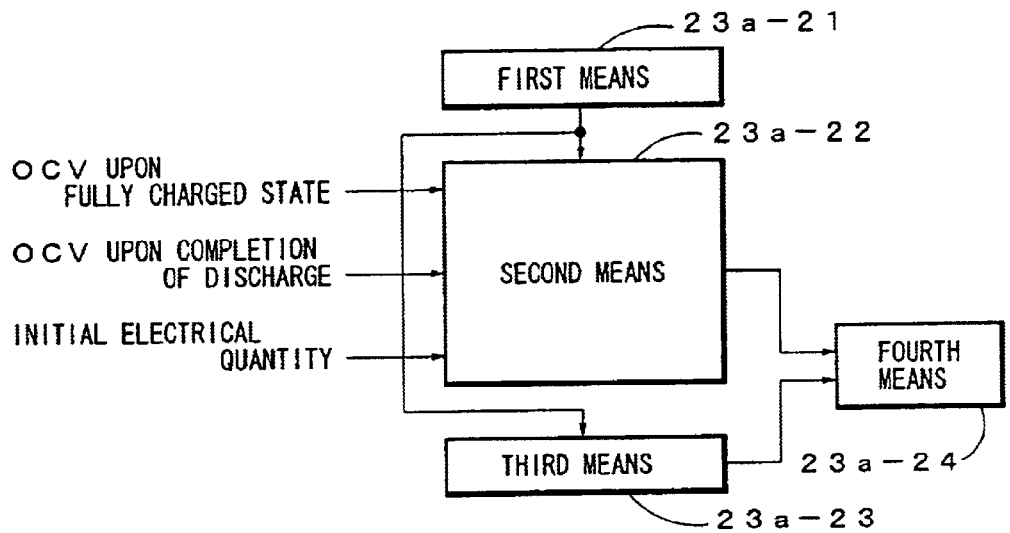
FIG. 1 shows a basic constitution of a device for computing a degradation degree of a battery according to the present invention.
Figure 2:
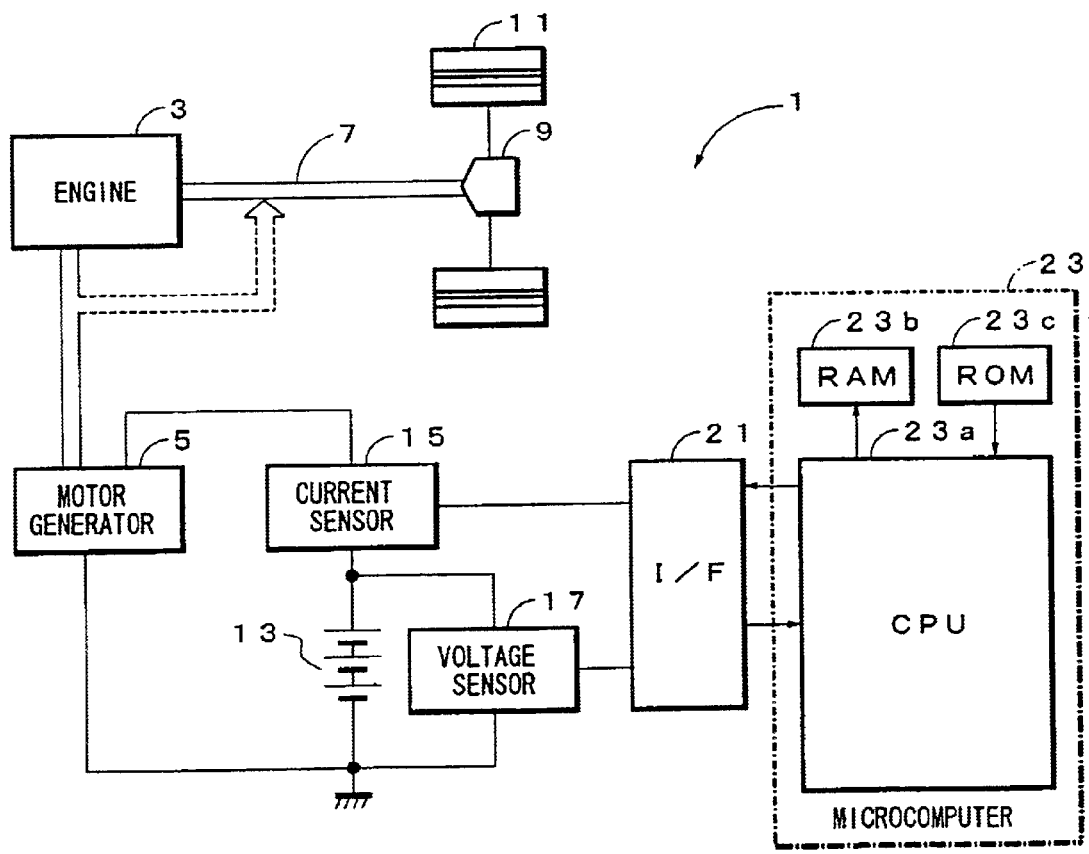
FIG. 2 shows a primary constitution of an on-vehicle battery-control device according to a preferred embodiment of the present invention, in which: a device to embody a method of estimating a state of charge of an on-vehicle battery according to the present invention; a device to embody a method of estimating an open circuit voltage of an on-vehicle battery according to the present invention; and a device to embody a method for computing a degradation degree of an on-vehicle battery according to the present invention for use in accurate estimation of a state of charge and an open circuit voltage are assembled, illustrating by partially using block diagrams.

In the following, the preferred embodiments of the present invention will be explained with reference to the attached drawings. FIG. 2 shows a primary constitution of an on-vehicle battery-control device according to a preferred embodiment of the present invention, in which: a device to embody a method of estimating a state of charge of an on-vehicle battery according to the present invention; a device to embody a method of estimating an open circuit voltage of an on-vehicle battery according to the present invention; and a device to embody a method for computing a degradation degree of an on-vehicle battery according to the present invention for use in accurate estimation of a state of charge and an open circuit voltage are assembled, illustrating by partially using block diagrams.

As shown in FIG. 2, an on-vehicle battery-control device 1 is mounted on a hybrid vehicle which includes an engine 3 and motor generator 5.

As for the hybrid vehicle, in its normal operation, only the output power from the engine 3 is transmitted to a wheel 11 by way of a drive shaft 7 and differential case 9, thereby the vehicle travels, while in its high load operation, the motor generator 5 functions as a motor with an electric power from a battery 13 such as a lead battery, transmitting the output power from the motor generator 5 in addition to the output power from the engine 3 to the wheel 11 by way of the drive shaft 7, thereby the vehicle attains an assist traveling.

Further, as for the hybrid vehicle, the motor generator 5 functions as a generator upon deceleration or braking so that the kinetic energy is transformed into the electric energy, thereby charging the battery 13.

Further, the motor generator 5 is used as a starter motor for forcibly rotating a flywheel of the engine 3 upon starting of the engine 3 accompanying with switching on of a starter switch (not shown). In such a case, the motor generator 5 receives a large current in a short period of time. When the engine 3 starts by the motor generator 5 accompanying with switching on of the starter switch, accompanying with the removal of the operation of an ignition key (not shown), the starter switch becomes off and the ignition switch or an accessory switch becomes on, thereby the discharge current from the battery 13 becomes a stationary current.

A device 1 for controlling an on-vehicle battery according to the preferred embodiment includes a current sensor 15, which detects the discharge current I of the battery 13 with regard to electric equipment such as a motor for assist traveling and a motor generator 5 and the charge/discharge current from the motor generator 5 and a voltage sensor 17, which detects a terminal voltage V of the battery 13, having a resistance of about 1 M ohm, which is connected in parallel with the battery 13.

The device 1 also includes a microcomputer 23, into which the output from the current sensor 15 and voltage sensor 17 are taken after A/D conversion in an interface circuit (hereinafter, I/F) 21.

The microcomputer 23 includes a CPU 23a, RAM 23b and ROM 23c, in which the CPU 23a is connected to the I/F 21 as well as to the RAM 23b and ROM 23c, and further to the starter switch, ignition switch, accessory switch, and switches of the electric equipment except the motor generator 5.

The RAM 23b has a data area for storing various data and a work area for use in various processes. A control program to make the CPU 23a carry out various processes is installed in the ROM 23c.

The ROM 23c records various data writably and readably, and has a nonvolatile storage (not shown in the figure) for storing the recorded data without an electric power source, in which various basic data and updated data for a battery are stored. For example, in the nonvolatile storage, basic data are stored in advance, such as an open circuit voltage upon fully charged state (OCVf; expressed by volt unit) of a battery 13 upon non-degradation (such as brand-new battery or battery upon designed), an open circuit voltage upon completion of a discharge (OCVe; expressed by volt unit), and an initial electrical quantity (SOCf; expressed by ampere×hour (Ah)) that is a total electrical quantity chargeable or dischargeable between OCVf and OCVe.

In ROM 23c, a summed value of pure resistance Rf and components (that is, activation polarization and concentration polarization) of polarization resistance Rpolf of a battery when the battery is initially mounted on a hybrid vehicle, that is, when the battery is brand-new (i.e., battery upon non-degradation), that is, (Rf+Rpolf) is stored in advance as a characteristic resistance value $R_F$ upon fully charged state of the battery 13.

A current value and voltage value that are an output from the current sensor 15 and voltage sensor 17, respectively, are taken into the CPU 23a in the microcomputer 23 through the I/F 21.

In the device 1 having a construction described above, first, a method of estimating a state of charge and an open circuit voltage, and method of computing a degradation degree of the battery 13 will be explained in the following.

In general, as for a battery 13 upon designing, that is, a battery 13 upon non-degradation, an open circuit voltage upon fully charged state OCVf expressed by volt unit, an open circuit voltage upon completion of a discharge OCVe expressed by volt unit, and a state of charge SOCf expressed by ampere×hour (Ah) which is an initial electrical quantity, that is, a total electrical quantity chargeable or dischargeable between OCVf and OCVe can be predetermined. If an open circuit voltage at any time point is known from their relation, a state of charge which is an electrical quantity corresponding to the open circuit voltage can be obtained, and inversely, if a state of charge at any time point is known, an open circuit voltage corresponding to the state of charge can be obtained.

However, when an activation degradation of active materials in the battery 13 takes place, the state of charge SOCf becomes smaller than the initial electrical quantity of the battery 13 upon non-degradation, therefore, even if an open circuit voltage at any time point is known, a state of charge which is an electrical quantity corresponding to the open circuit voltage cannot be figured out, and also even if a state of charge at any time point is known, an open circuit voltage corresponding to the state of charge cannot be figured out.

Accordingly, if a changing ratio of the total electrical quantity chargeable or dischargeable for the battery 13 at any time point (that is, the total electrical quantity chargeable or dischargeable between the open circuit voltage upon fully charged state and the open circuit voltage upon completion of a discharge) to the initial electrical quantity that is a total electrical quantity chargeable or dischargeable for the battery 13 upon non-degradation is computed as a degradation degree, we can estimate a state of charge of the battery 13 at any time point by multiplying an electrical quantity corresponding to any open circuit voltage by the degradation degree. Also inversely, we can estimate an open circuit voltage of the battery 13 at any time point by revising an open circuit voltage corresponding to any electrical quantity with the degradation degree.

As for types of the degradation of a battery, there are degradation due to internal resistance or the like and degradation due to inactivation degradation of active materials. We call the degradation degree to be computed for the former degradation as a state of health 1 (SOH1), while we call the degradation degree to be computed for the latter degradation as a state of health 2 (SOH2). The degradation degree that the present invention takes as the subject is the SOH2.

Since the inactivation degradation of active materials in the battery 13 causes a phenomenon that when the battery 13 is in operation its SOCf becomes smaller than the initial electrical quantity, therefore when the battery 13 is charged or discharged, a change (that is, increase or decrease) in an open circuit voltage corresponding to an electrical quantity due to the charge or discharge is different from a change in an open circuit voltage of the battery 13 upon non-degradation, accordingly, the degradation degree SOH2 can be computed by figuring out a difference between the two kinds of change as described above.

That is, an open circuit voltage is estimated or measured in advance upon starting a charge or discharge of the battery 13, and also an open circuit voltage is estimated or measured upon halting a charge or discharge of the battery 13. Thereby, as the degradation degree SOH2, computed can be a ratio of a change in an open circuit voltage corresponding to any change in an electrical quantity accompanying with a charge or discharge, which is computed on the basis of the initial electrical quantity (that is a total electrical quantity chargeable or dischargeable between OCVf and OCVe predetermined for the battery 13 upon non-degradation) to a change in an open circuit voltage actually arisen in the battery 13 at any time point corresponding to any change in an electrical quantity.

Further, an open circuit voltage before or after a charge or discharge is estimated from a terminal voltage of a battery or measured, then a change in an electrical quantity corresponding to a change in the open circuit voltage is computed on the basis of OCV upon fully charged state, OCV upon completion of a discharge and the initial electrical quantity and actually measured. Thereby, as the degradation degree SOH2, computed can be a ratio of a change in an electrical quantity actually arisen in the battery 13 at any time point corresponding to a change in any open circuit voltage to a change in an electrical quantity corresponding to any change in an open circuit voltage computed on the basis of the initial electrical quantity that is a total electrical quantity chargeable or dischargeable between the OCV upon fully charged state and the OCV upon completion of a charge, which are predetermined for the battery 13 upon non-degradation.

The degradation degree SOH2 computed by either method reflects a change in a relation between the initial electrical quantity (that is a total electrical quantity chargeable or dischargeable between the OCV upon fully charged state and the OCV upon completion of a charge, which are predetermined for the battery 13 upon non-degradation) and a total electrical quantity chargeable or dischargeable of the battery 13 at any time point (that is, a total electrical quantity chargeable or dischargeable between the OCV upon fully charged state and the OCV upon completion of a charge), that is, reflects the inactivation degradation of active materials in the battery 13. Therefore, by using the degradation degree, a state of charge which is an electrical quantity corresponding to an open circuit voltage at any time point or an open circuit voltage corresponding to a state of charge which is an electrical quantity at any time point can be estimated.

In the following, the inactivation degradation of active materials in the battery 13 will be explained in detail. There are four patterns; Degradation Modes 1–4 as to the inactivation degradation of active materials.

[Degradation Mode 1; A Case in which the Amount of Active Material $PbO_2$ of a Positive Electrode and That of Active Material Pb of a Negative Electrode Decrease]

Figure 3A:
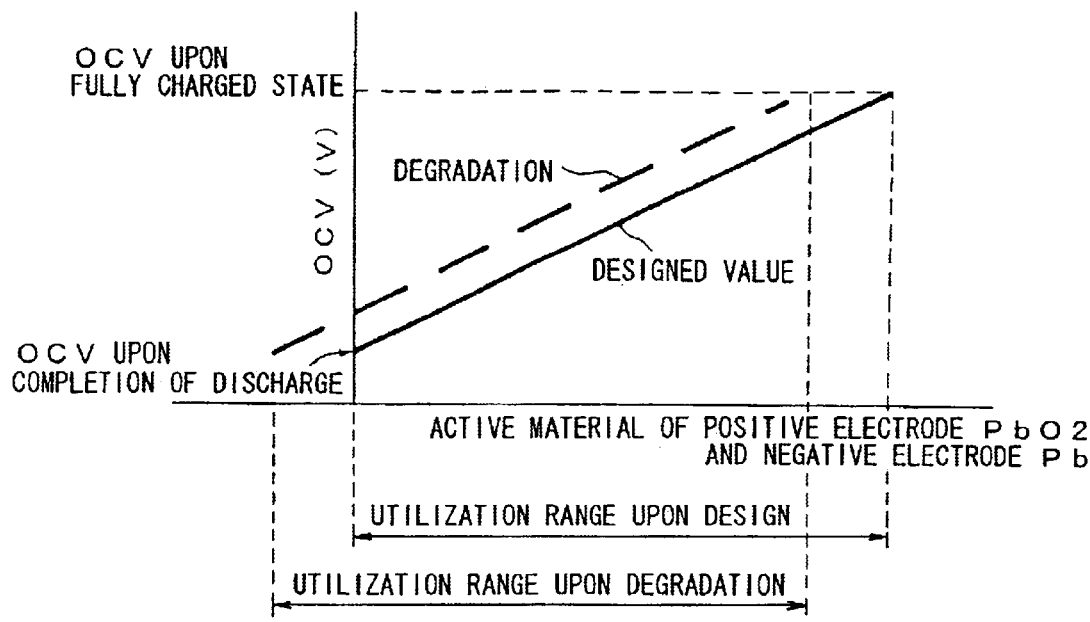
FIG. 3A illustrates a degradation mode 1 of active materials and specifically, a usage range of the active materials upon designing and upon degradation.
Figure 3B:
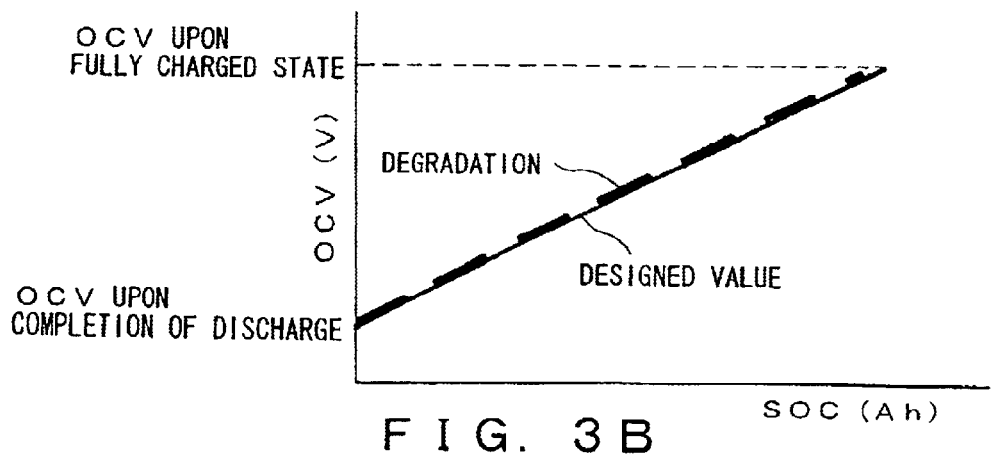
FIG. 3B illustrates a degradation mode 1 of active materials and specifically, a characteristic of OCV for SOC.

FIGS. 3A and 3B illustrate examples of a case in which the amount of active material $PbO_2$ of a positive electrode and that of active material Pb of a negative electrode decrease. Here, we show a case in which there is no decrease in the amount of $H_2SO_4$ in electrolyte. In the Degradation Mode 1, as shown in FIG. 3B, since the amount of $H_2SO_4$ stays constant as that upon designing, a gradient of an OCV characteristic (solid line) of the designed value for SOC is equal to a gradient of an OCV characteristic (dotted line) upon degradation in the Degradation Mode 1.

However, as shown in FIG. 3A, a utilization range of the active material is supposed to be different from the designed value. Usually, the amount of the active material is designed in excess compared to that corresponding to the utilization range by a factor of 1.5 (i.e., 150%). Therefore, the SOC (Ah) and SOC (%) that show the amount of coulomb do not supposed to be affected by decrease in the active materials of the positive and negative electrodes.

However, since the internal resistance seems to increase due to the decrease in the amount of the active materials, the dischargeable capacity ADC (Ah) is expected to decrease. Therefore, the ADC (Ah) can be estimated by monitoring the increase in the internal resistance.

[Degradation Mode 2; A Case in which the Amount of $H_2SO_4$ in Electrolyte Decreases]

Figure 4:
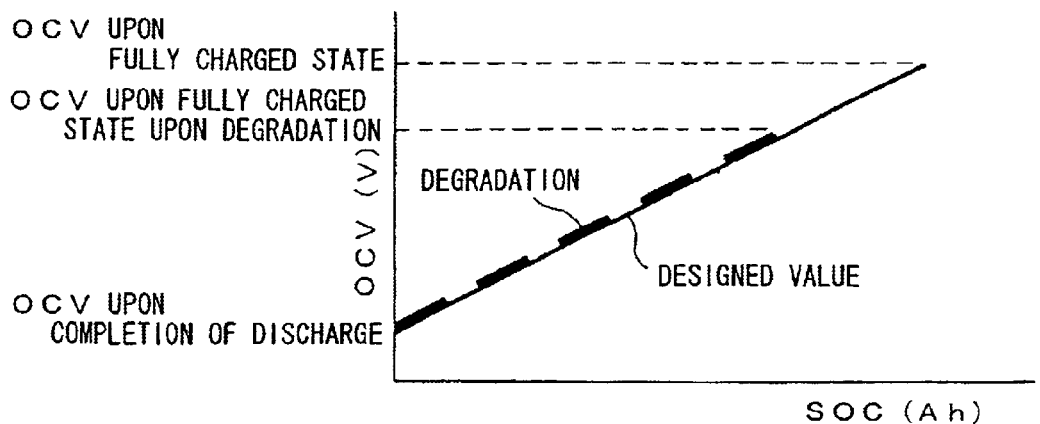
FIG. 4 illustrates a characteristic of OCV for SOC in a degradation mode 2 of active materials.

FIG. 4 illustrates a characteristic of OCV for SOC in a case in which the amount of $H_2SO_4$ in electrolyte decreases. When the amount of $H_2SO_4$ decreases, the OCV upon fully charged state decreases. That is, the OCV characteristic (dotted line) upon degradation in the Degradation Mode 2 shows the same gradient as that of the OCV characteristic (solid line) of the designed value, but the OCV upon fully charged state upon degradation is lower than that upon non-degradation.

[Degradation Mode 3; A Case in which Sulfation ($PbSO_4$ Precipitation) Takes Place (i.e., A Case in which the Amount of Active Material $PbO_2$ of a Positive Electrode, That of Active Material Pb of a Negative Electrode, and That of $H_2SO_4$ in Electrolyte Decrease)]

Figure 5:
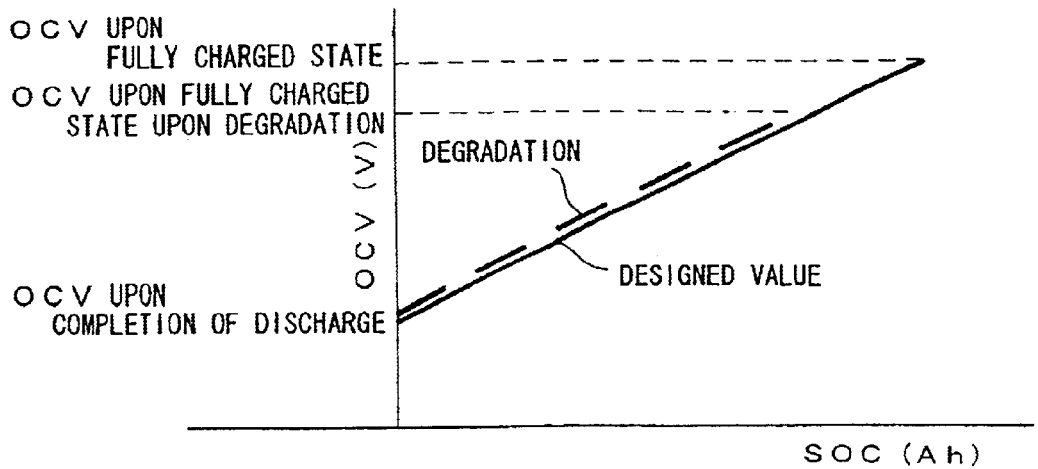
FIG. 5 illustrates a characteristic of OCV for SOC in a degradation mode 3 of active materials.

FIG. 5 illustrates a characteristic of OCV for SOC in a case in which $PbSO_4$ precipitates on the surface of the electrode by the sulfation phenomenon. The sulfation causes the decrease in OCV upon fully charged state and the decrease in ADC (Ah) due to the increase in the internal resistance. That is, when the sulfation phenomenon, in which the active material $PbO_2$ of a positive electrode and the active material Pb of a negative electrode are sulfated to $PbSO_4$ due to self-discharge caused by standing of a battery for a long period of time, takes place, the amount of active material $PbO_2$ of a positive electrode, that of active material Pb of a negative electrode, and that of $H_2SO_4$ in electrolyte decrease, thereby the OCV upon fully charged state becomes lower than the OCV upon fully charged state upon non-degradation (i.e., upon brand-new), that is, the degradation of the battery takes place. The gradient of the OCV characteristic (dotted line) upon degradation in the Degradation Mode 3 is the same as that of the OCV characteristic (solid line), however, the OCV upon fully charged state upon degradation becomes lower than the OCV upon fully charged state upon non-degradation. Most of the degradation of a battery in a market corresponds to the degradation in the Degradation Mode 3.

[Degradation Mode 4; A Case in which the Amount of $H_2SO_4$ and That of $H_2O$ Decrease]

Figure 6:
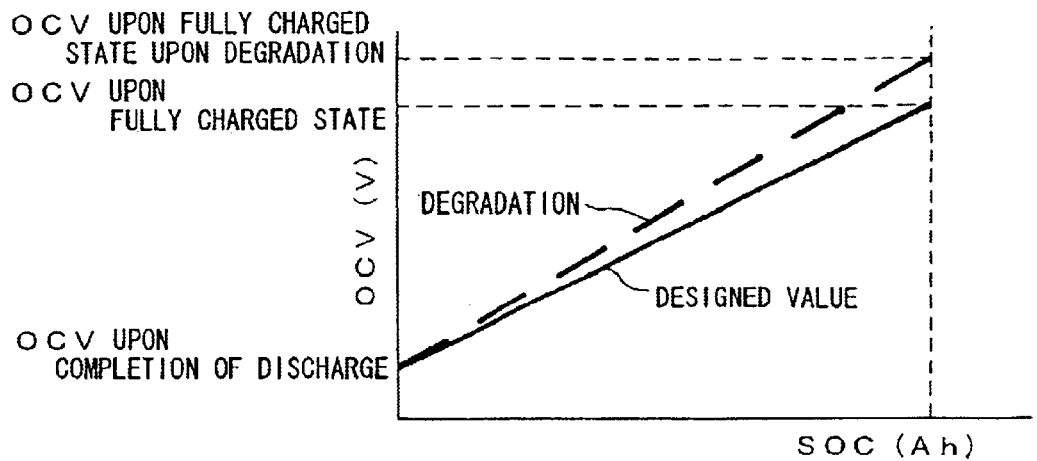
FIG. 6 illustrates a characteristic of OCV for SOC in a degradation mode 4 of active materials.

FIG. 6 illustrates a characteristic of OCV for SOC in a case in which the decrease in the amount of $H_2SO_4$ and that of $H_2O$ in electrolyte take place simultaneously. It reveals that the gradient of the OCV characteristic with respect to the SOC changes, that is, a change in the density of the electrolyte becomes larger than that of the designed value. The gradient of the OCV characteristic (dotted line) upon degradation in the Degradation Mode 4 is different from that (solid line) upon designing (i.e., upon non-degradation). The gradient upon degradation becomes larger than that upon non-degradation. Further, in the OCV characteristic (dotted line) upon degradation in the Degradation Mode 4, the OCV upon fully charged state is higher than that upon non-degradation.

Figure 7:
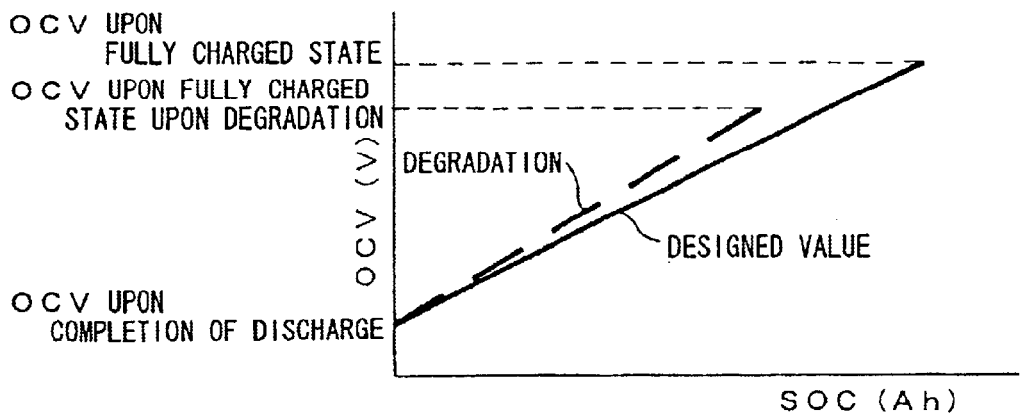
FIG. 7 illustrates an example of a characteristic of OCV for SOC in a case, in which all of the degradation modes 1–4 of active materials take place.

As described above, there are four patterns, the Degradation Modes 1–4 as to the degradation in the active materials. FIG. 7 shows one example of the OCV characteristic for the SOC, in which all of these Degradation Modes take place. That is, as for the OCV characteristic (dotted line) upon the degradation in the active materials in the Degradation Modes 1–4 its gradient with regard to the SOC is different from that (solid line) upon designing and further, its OCV upon fully charged state becomes lower (or higher) than that upon designing.

When the degradation in the active materials takes place, all the four patterns, i.e., the Degradation Modes 1–4 possibly take place, therefore it is necessary to compute the degradation degree SOH2 taking (1) a change in the gradient of the OCV characteristic with regard to the SOC upon degradation and (2) a change in the OCV upon fully charged state upon degradation (hereinafter, OCVd) into consideration by detecting these changes.

First, a method of detecting the OCVd will be explained. Generally in the hybrid vehicle, a battery 13 is used in an intermediate charged state that is not a fully charged state. In order to improve from the degradation arisen while charge and discharge processes are repeated in such an intermediate charged state of the battery 13, the battery 13 is periodically charged into its fully charged state with an output from the motor generator 5, thereby refreshing the battery. The OCVd can be detected by monitoring the deterioration in a real-time charge efficiency (RCE) upon the refreshing charge as described above. A method of computing the RCE will be explained later on.

When the state of charge of the battery 13 approaches the fully charged state upon the refreshing charge, the RCE deteriorates (for example, deteriorates to a value that is close to zero) caused by an increase in gasification resistance component with gassing. Therefore, the RCE is periodically computed during the refreshing charge and the deterioration in the computed RCE is monitored, thereby judging a time point when the battery 13 reaches its fully charged state and detecting an open circuit voltage at the time point as the OCVd.

As shown in FIG. 6, the OCVd upon the decrease in the electrolyte in the Degradation Mode 4 becomes larger than the OCV (hereinafter, OCVf) upon fully charged state upon non-degradation (i.e., OCVd>OCVf), on the other hand, as shown in FIGS. 4 and 5, the OCVd upon the degradation in the active materials in the Degradation Mode 2 or 3 becomes smaller than the OCVf (i.e., OCVd<OCVf).

As described above, when the decrease in the electrolyte in the Degradation Mode 4 and the degradation in the active materials in the Degradation Mode 2 or 3 take place simultaneously, the OCVd (i.e., the OCV upon fully charged state upon degradation) detected by the refreshing charge tends to be the same voltage as that in the non-degradated state depending on a ratio between a voltage rising with the decrease in the amount of the electrolyte and a voltage decreasing with the deterioration in the active materials.

Therefore, in the case in which all the Degradation Modes 1–4 take place, the SOH2 which takes the OCVd that changes during the degradation of the battery into consideration can be computed by the following expression (1):

$$SOH2=(OCVd-OCVe)/(OCVf-OCVe). \qquad (1)$$

Then, in the case in which all the Degradation Modes 1–4 take place, the SOH2 which takes the change in the gradient of the OCV characteristic and the OCVd that changes during the degradation of the battery into consideration can be computed by the following expression (2):

$$SOH2=(OCVd-OCVe)/(OCVf-OCVe)\times(K1/K2), \qquad (2)$$

wherein K1 is a gradient of the OCV characteristic versus SOC for the battery 13 upon non-degradation, while K2 is a gradient of the OCV characteristic versus SOC for the battery 13 upon the degradation in the active materials. The (K1/K2) indicates a ratio between these gradient values. Here, the gradient means a ratio of a change in OCV in an equilibrium state to a change in SOC (i.e., electrical quantity). In a case of the degradation in the active materials in the Degradation Mode 2 or 3, which has no decrease in the amount of the electrolyte due to the Degradation Mode 4, the (K1/K2) is 1 in the expression (2).

That is, in the case of the decrease in the electrolyte in the Degradation Mode 4, the change in the OCV in an equilibrium state versus the change in SOC (i.e., the gradient) changes. Further, in the case of the decrease in the electrolyte, the OCV upon fully charged state increases. On the other hand, in the case of the degradation in the active materials in the Degradation mode 2 or 3, the OCV upon fully charged state decreases and the gradient does not change. In a case in which Degradation Modes 2, 3 and 4 take place simultaneously, the degradation degree SOH2 is expressed by the expression (2) finally.

Figure 8:
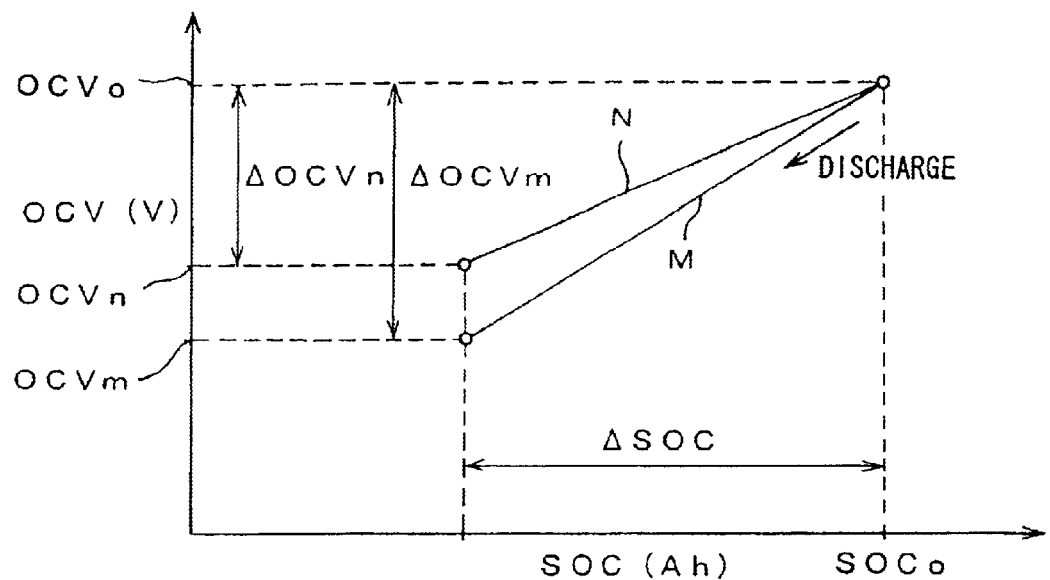
FIG. 8 is a graph illustrating a method of computing a ratio (K1/K2) of gradient in a degradation degree (SOH2) during a discharge.
Figure 9:
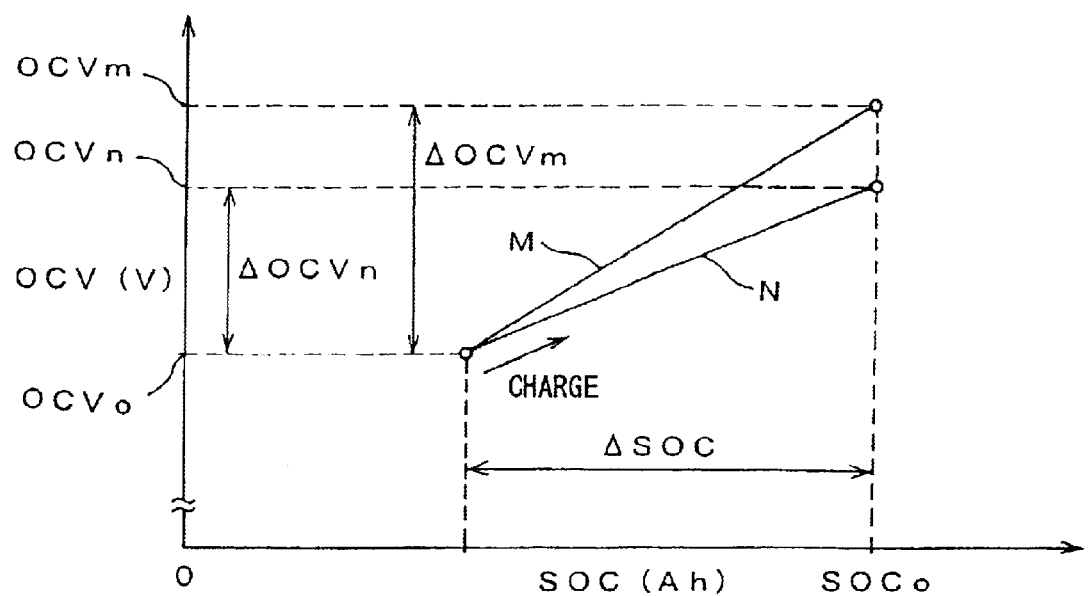
FIG. 9 is a graph illustrating a method of computing a ratio (K1/K2) of gradient in a degradation degree (SOH2) during a charge.

In the following, a method of computing the gradient ratio (K1/K2) will be explained. FIG. 8 is a graph illustrating a method of computing a ratio (K1/K2) of gradient in a degradation degree (SOH2) during a discharge. FIG. 9 is a graph illustrating a method of computing a ratio (K1/K2) of gradient in a degradation degree (SOH2) during a charge.

In a discharge shown in FIG. 8, if a discharge is carried out for the battery 13 from an arbitrary open circuit voltage (OCVo) at a time point when the discharge starts, regarding the battery 13 upon non-degradation, the open circuit voltage decreases along a straight line N as the discharge going on, and at a time point when the discharge is halted and thus an arbitrary electrical quantity is discharged, the open circuit voltage decreases to an OCVn. Here, the straight line N is a part of a straight line which is formed by connecting two points corresponding to the OCVf (open circuit voltage upon fully charged state) upon non-degradation and the OCVe (open circuit voltage upon completion of a discharge) upon non-degradation for the battery 13. On the other hand, as for the battery 13 upon degradation in which the decrease in the electrolyte takes place due to Degradation Mode 4, an open circuit voltage during the discharge decreases along a straight line M, the gradient of which is larger than that of the straight line N, and at a time point when the same arbitrary electrical quantity is discharged, the open circuit voltage decreases to an OCVm which is lower than the OCVn.

The gradient K1 of the straight line N is expressed by the following expression (3):

$$K1 = \Delta OCVn/\Delta SOC \quad (3)$$
$$= (OCVo - OCVn)/\Delta SOC,$$

wherein $\Delta SOC$ is a change in an electrical quantity when an arbitrary electrical quantity is discharged for the battery 13 upon non-degradation and $\Delta OCVn=(OCVo-OCVn)$ is a decrement in an open circuit voltage with regard to $\Delta SOC$.

Likewise, The gradient K2 of the straight line M is expressed by the following expression (4):

$$K2 = \Delta OCVm/\Delta SOC \quad (4)$$
$$= (OCVo - OCVm)/\Delta SOC,$$

wherein $\Delta SOC$ is a change in an electrical quantity when an arbitrary electrical quantity is discharged for the battery 13 upon degradation and $\Delta OCVm=(OCVo-OCVm)$ is a decrement in an open circuit voltage with regard to $\Delta SOC$.

Therefore, a ratio (K1/K2), which is equal to or less than 1, can be expressed by the following expression (5):

$$K1/K2 = (\Delta OCVn/\Delta SOC)/(\Delta OCVm/\Delta SOC) \quad (5)$$
$$= \Delta OCVn/\Delta OCVm$$
$$= (OCVo - OCVn)/(OCVo - OCVm).$$

In a charge shown in FIG. 9, if a charge is carried out for the battery 13 from an arbitrary open circuit voltage (OCVo) at a time point when the charge starts, regarding the battery 13 upon non-degradation, the open circuit voltage increases along a straight line N as the charge going on, and at a time point when the charge is halted and thus an arbitrary electrical quantity is charged, the open circuit voltage increases to an OCVn. On the other hand, as for the battery 13 upon degradation in which the decrease in the electrolyte takes place due to Degradation Mode 4, an open circuit voltage during the charge increases along a straight line M, the gradient of which is larger than that of the straight line N, and at a time point when the same arbitrary electrical quantity is charged, the open circuit voltage increases to an OCVm which is higher than the OCVn.

The gradient K1 of the straight line N is also expressed by the expression (3) as described above.

The gradient K2 of the straight line M is also expressed by the expression (4) as described above.

Therefore, a ratio (K1/K2), which is equal to or less than 1, can also be expressed by the expression (5) as described above.

As described above, if each value of OCVo, OCVn and OCVm is known upon a charge or discharge, the ratio (K1/K2) of the gradient can be computed by the expression (5), accordingly, the degradation degree SOH2 can be computed by the expression (2) on the basis of the computed ratio (K1/K2) of the gradient.

The SOH2 thus computed becomes equal to the ratio (K1/K2) provided that (OCVd−OCVe)/(OCVf−OCVe)=1 seeing from the expression (2) in a case in which there is no difference between the values of the open circuit voltage upon non-degradation (OCVf) and degradation (OCVd).

In either case of a charge or discharge, an open circuit voltage OCVo at a time point of the start of a charge or discharge can be obtained by measuring a terminal voltage of the battery that is in an equilibrium state, in which the influence of the polarization arisen in the battery 13 due to the former charge and discharge is completely canceled off and therefore there is no decrement or increment in the terminal voltage of the battery due to the polarization, or by using a terminal voltage of the battery estimated from a result of monitoring for a short period of time a change in the terminal voltage of the battery right after the halting of a charge or discharge. This method of estimating an open circuit voltage will be explained later on.

Likewise, in either case of a charge or discharge, an open circuit voltage OCVm of the battery upon degradation at a time point of the halt of a charge or discharge can be obtained by measuring a terminal voltage of the battery that is in an equilibrium state, in which the influence of the polarization arisen in the battery 13 due to a charge and discharge is completely canceled off and therefore there is no decrement or increment in the terminal voltage of the battery due to the polarization, or by using a terminal voltage of the battery estimated by using a power approximate expression from a result of monitoring for a short period of time a change in the terminal voltage of the battery right after the halting of a charge or discharge.

In a case of a charge, since the charging current is not fully stored in the battery 13 as an electrical quantity, that is, a part of the charging current is consumed for gas generation, a time integration of the charging current as it cannot be used as a charged electrical quantity. In this case, a real-time charge efficiency (RCE) computed with a method as explained later on is used to compute a state of charge by revising the charged electrical quantity, and an open circuit voltage corresponding to the state of charge must be computed.

Figure 10:
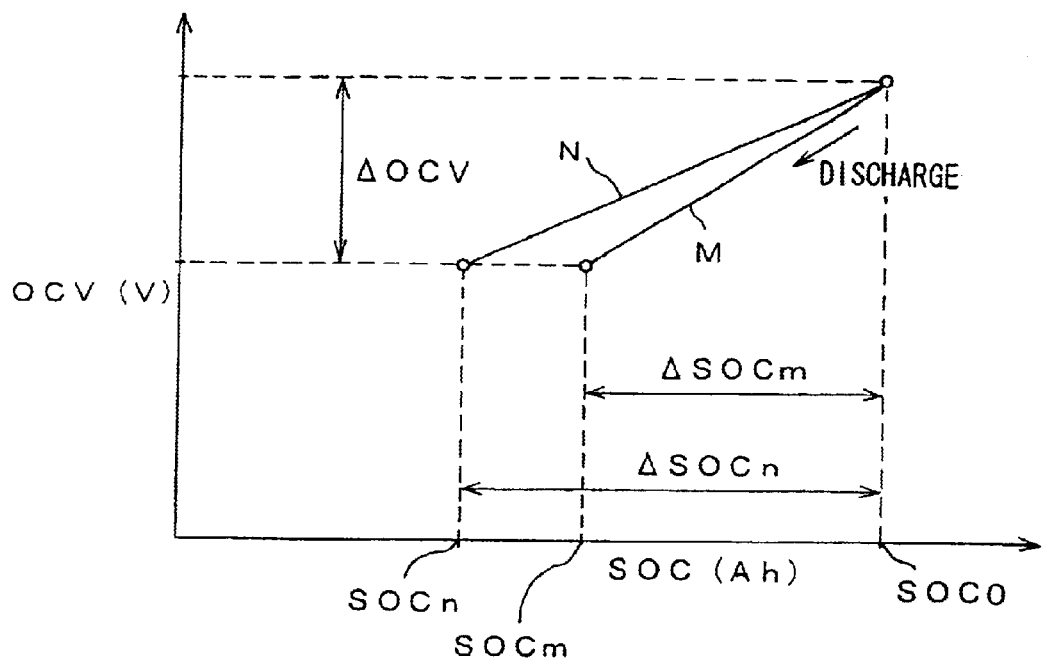
FIG. 10 is a graph illustrating another method of computing a ratio (K1/K2) of gradient in a degradation degree (SOH2) during a discharge.
Figure 11:
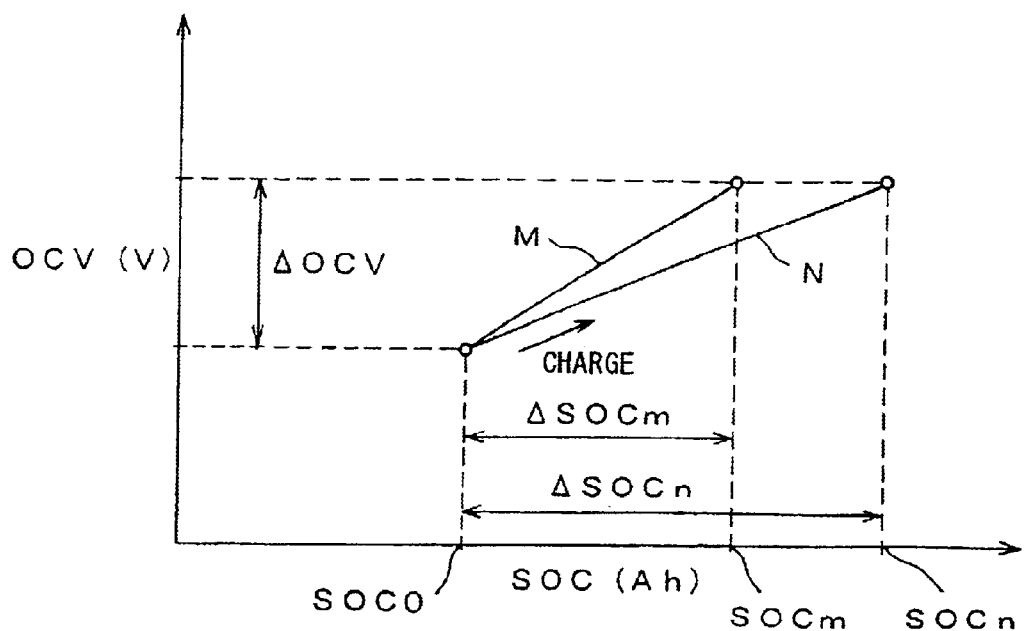
FIG. 11 is a graph illustrating another method of computing a ratio (K1/K2) of gradient in a degradation degree (SOH2) during a charge.

In FIGS. 8 and 9, the ratio K1/K2 is computed on the basis of a difference in the values of the open circuit voltage for the battery upon non-degradation and that upon degradation in the active materials, which is arisen when an arbitrary electrical quantity is charged or discharged. Instead, the ratio K1/K2 can also be computed by using a method as illustrated in FIGS. 10 and 11.

That is, the ratio K1/K2 can be computed on the basis of a difference in the values of the electrical quantity for the battery upon non-degradation and that upon degradation in the active materials, which is arisen when an arbitrary decrement in the open circuit voltage takes place due to a charge or discharge. In FIGS. 10 and 11, SOCo is an electrical quantity before the start of a charge or discharge, SOCn is an electrical quantity of the battery 13 upon non-degradation after the halt of a charge or discharge, SOCm is an electrical quantity of the battery 13 upon degradation after the halt of a charge or discharge, $\Delta SOCn$ is a change in the electrical quantity of the battery 13 upon non-degradation due to a charge or discharge, and $\Delta SOCm$ is a change in the electrical quantity of the battery 13 upon degradation due to a charge or discharge. The degradation degree SOH2 can be computed by computing a ratio of the $\Delta SOCm$ to the $\Delta SOCn$.

In either case of a charge or discharge, an open circuit voltage OCVn for the battery 13 upon non-degradation at a time point of the halt of a charge or discharge can be estimated to be an open circuit voltage corresponding to an electrical quantity (SOCn) that is obtained by adding the time integration of the charging or discharging current to the electrical quantity (SOCo) at a time point of a start of a charge or discharge on the straight line N as described in the following.

Conventionally, when a charge and discharge are repeated in a battery, a charging and discharging current have been measured at intervals of a constant time period and then the measured charging and discharging current are multiplied by a constant time period, thereby the electrical quantity (SOCn) upon a charge or discharge has been estimated. Thus, when a charge and discharge are repeated in a battery, especially in a lead battery, the ability for a charge is not good because when a speed of the delivery of ions between the surface of the electrode and the electrolyte is low with regard to the charging electrical quantity, a part of the charging current starts flowing directly without having an ionic reaction in the electrolyte and therefore, the charging efficiency deteriorates by gassing (i.e., gas generation due to the electrolysis of water in the electrolyte).

Conventionally, when the SOC is being detected by integrating the charging or discharging current (that is, by integrating the charging or discharging current with multiplying it by time), the charge efficiency has generally been revised by using a data table taking an environment of a battery, the SOC level, and the degradation degree into consideration and this charge efficiency has been applied for the current integrated value. However, this data table method cannot assure for all batteries, that is, the SOC cannot be estimated accurately.

In the present invention, during a discharge of the battery 13, only the time integration of the discharging current is summed, thereby estimating the SOC after the discharge and determining this SOC after the discharge as the SOCn. Further, during a charge of the battery 13, instead of a charge efficiency of the conventional data table-type, a real-time charge efficiency (RCE) is applied for a value of the time integration of the charging current and thus computed electrical quantity (SOC) after a charge is determined to be the SOCn. That is, the electrical quantity (SOC) after a charge (i.e., SOCn) can be computed by the following expressions (6) and (7):

electrical quantity (SOC) after discharge=SOCo−Σ (discharging current×time), (6)

and electrical quantity (SOC) after charge=SOCo+Σ (charging current×time×real-time charge efficiency (RCE)). (7)

The CPU 23a in the device 1 for controlling an on-vehicle battery carries out the computation of the expressions (6) and (7), thereby always estimating the SOC of the battery 13 more accurately even if the battery 13 is in use (i.e., upon a charge or discharge). The real-time charge efficiency (RCE) in the expression (7) can be estimated by measuring a charging resistance of the battery 13 and will be explained later on.

As described above, the estimated SOC is always computed during a charge or discharge, and when a charge or discharge is halted, the final SOC (i.e., SOCn) upon the halting is estimated by the expression (6) or (7) and thus estimated SOCn is converted into a corresponding estimated OCVn. The conversion from the SOCn into OCVn is carried out on the straight line N on the basis of an initial electrical quantity that is a total electrical quantity chargeable or dischargeable between the open circuit voltage upon fully charged state (OCVf) and the open circuit voltage upon completion of a discharge (OCVe), which are predetermined for the battery 13 upon non-degradation.

After a charge or discharge is halted, an open circuit voltage OCVm that is a terminal voltage of the battery in an equilibrium state is computed by measuring a terminal voltage of the battery when the concentration polarization is canceled or by estimating with a power approximate expression. By comparing the OCVn with OCVm for the SOCn, a decrease in the capacity due to the inactivation of the active materials or the decrease in the amount of the electrolyte can be estimated. FIGS. 8 and 9 show the SOC–OCV characteristics for a discharge and a charge, respectively.

As shown in FIGS. 8 and 9, when the degradation due to the cause described above does not take place, the OCVn and OCVm show the same change with regard to a change in the SOC. On the other hand, when such a degradation goes on, the OCVm has a lower value than that of the OCVn with regard to the same change in the SOC in a discharge process, while the OCVm has a higher value than that of the OCVn with regard to the same change in the SOC in a charge process. FIGS. 10 and 11 illustrate a method of computing not the change in the OCV but the reducing amount of the SOC.

Accordingly, in the device 1 for controlling an on-vehicle battery, the CPU 23a writes a value of the OCVd detected upon the refreshing charge, which changes upon degradation, in a nonvolatile storage in the ROM 23c, updates the value of the OCVd whenever a refreshing charge is carried out and writes the value, writes the value of SOH2 computed by using the expression (5) in the nonvolatile storage in the ROM 23c when a charge or discharge is carried out, and updates the value of the SOH2 computed whenever a charge or discharge is carried out and writes the value.

Figure 12:
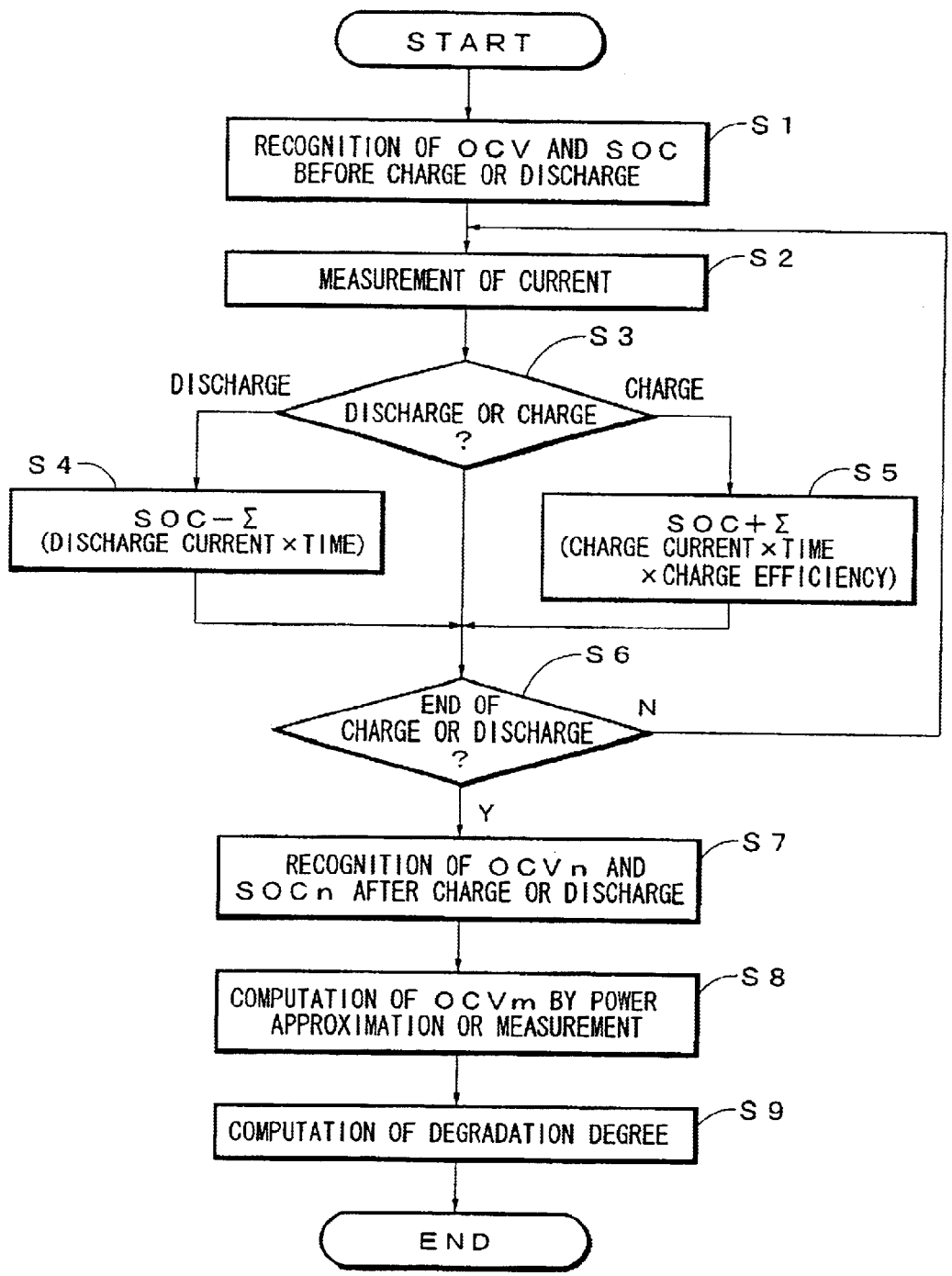
FIG. 12 is a flow chart illustrating processes that a CPU carries out according to a control program stored in a ROM of a microcomputer shown in FIG. 2.

In the following, a process that the CPU 23a carries out according to a predetermined program in order to compute the degradation degree SOH2 of the battery 13 will be explained with reference to a flow chart shown in FIG. 12.

The CPU 23a starts an operation with a switching on of an ignition switch and first in step S1, computes OCVo and SOCo before a charge or discharge. There are various way to computes them depending on the situation, but they are not explained here. Then, a current sensor 15 measures a current during the charge or discharge (step S2). By knowing the direction of the measured current flow, it is judged whether the current is due to a discharge or charge (step S3). If it is due to a discharge, the process advances to step S4 and carries out a computation of the expression (6) as described above so as to compute the SOC which decreases due to the discharge. On the other hand, if it is due to a charge, the process advances to step S5 and carries out a computation of the expression (7) as described above so as to compute the SOC which increases due to the charge. The computation in Steps 4 and 5 is carried out whenever the current is measured in a predetermined sampling cycle and then the process advances to step S6, in which it is judged whether or not the charge or discharge is completed, and step S2–step S6 are repeated until the charge or discharge is completed.

When a charge or discharge is completed, the process advances to step S7, in which an OCVn and SOCn after the charge or discharge are computed by using the SOC computed in step S4 or step S5. Since the OCVn and SOCn are those for a non-degradated battery, they can be computed from the SOCn corresponding to the computed SOC and the OCVn corresponding to the SOCn, on the basis of an initial electrical quantity (that is a total electrical quantity chargeable or dischargeable between an OCV upon fully charged state and an OCV upon completion of a discharge, which are predetermined for a battery upon non-degradation). The predetermined OCV upon fully charged state and OCV upon completion of a discharge and the initial electrical quantity as described above are stored in the nonvolatile storage in the ROM 23c together with the converted values computed in advance by using these values.

When the OCVn and SOCn are computed in step S7, the process advances to step S8, in which an OCVm are computed by an estimation by using a power approximate expression or by a measurement, and further advances to step S9 to compute the degradation degree. In the computation in step S9, a ratio of ΔOCVn to ΔOCVm is computed as the degradation degree SOH2. The computed SOH2 is stored and held in the nonvolatile storage until a new SOH2 is computed next, and used when an electrical quantity and an open circuit voltage of the battery 13 are estimated.

As is clearly seen from the processing of the CPU 23a, which is explained with reference to the flow chart, the CPU 23a functions as means for computing the degradation degree, which computes a ratio of a total electrical quantity at any (i.e., arbitrary) time point to the initial electrical quantity as the degradation degree. Moreover, the CPU 23a can also function as means for estimating an electrical quantity, which estimates an electrical quantity corresponding to any (i.e., arbitrary) open circuit voltage of the battery 13 on the basis of the initial electrical quantity. As a result, a state of charge for the battery 13 at any time point can be estimated by multiplying the electrical quantity estimated corresponding to any open circuit voltage by the degradation degree SOH2.

Further, besides the CPU 23a functions as means for computing the degradation degree, which computes a ratio of a total electrical quantity at any (i.e., arbitrary) time point to the initial electrical quantity as the degradation degree, the CPU 23a can also function as means for estimating an open circuit voltage, which estimates an open circuit voltage corresponding to any (i.e., arbitrary) electrical quantity for the battery 13 on the basis of the initial electrical quantity. As a result, an open circuit voltage of the battery 13 at any time point can be estimated by revising the open circuit voltage estimated corresponding to any electrical quantity with the degradation degree SOH2.

Furthermore, the CPU 23a functions as:

first means 23a-21 for computing a change in an electrical quantity during a charge or discharge of a battery 13;

second means 23a-22 for computing a change in an open circuit voltage in response to any change in an electrical quantity computed by the first means 23a-21 on the basis of an initial electrical quantity that is a total electrical quantity chargeable or dischargeable of the battery 13 upon non-degradation;

third means 23a-23 for estimating or measuring a change in an open circuit voltage actually arising in the battery 13 at any time point in response to said any change in an electrical quantity; and also fourth means 23a-24 for computing, as the degradation degree SOH2, a rate of the change in an open circuit voltage computed by the second means 23a-22 to the change in an open circuit voltage estimated or measured by the third means 23a-23.

In the following, a method of estimating an open circuit voltage in such a short period of time that the polarization due to a charge or discharge is not canceled even when the charge or discharge is halted will be explained.

Figure 13:
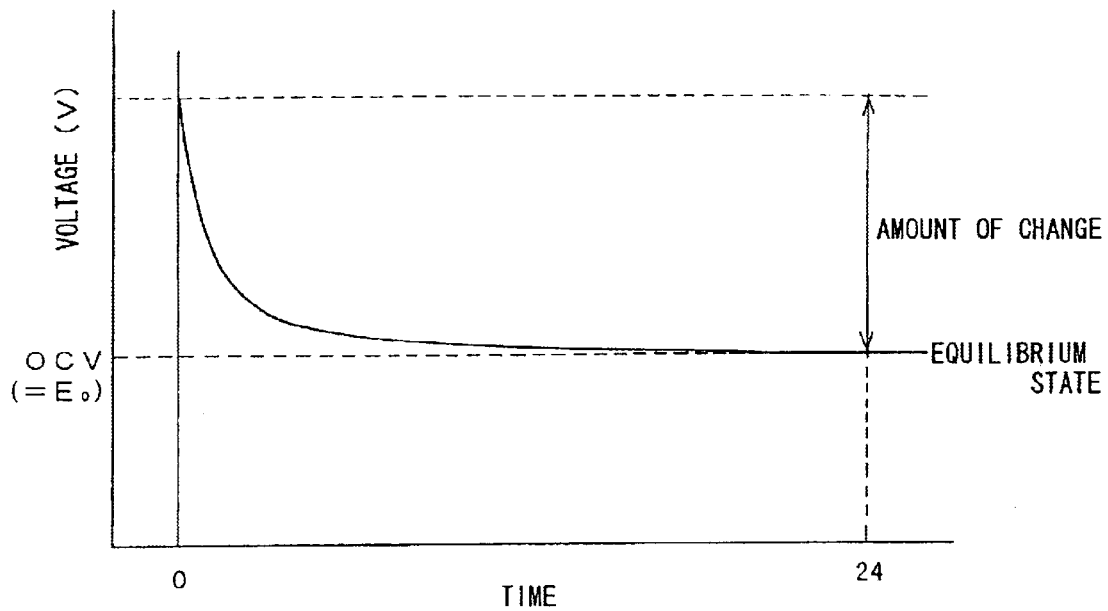
FIG. 13 is a graph illustrating a change in a voltage in an open circuit state of a battery after completion of a charge.

Generally, when a charge of an on-vehicle battery is completed, as for a terminal voltage of the battery in its open circuit state, the component which has risen due to the concentration polarization gradually decreases with time passing and, as shown in FIG. 13, asymptotically changes approaching an open circuit voltage E0 that is a terminal voltage of the battery in its equilibrium state, for example, after 24 hours. Such an asymptotic curve is generally expressed by a power expression.

Figure 15:
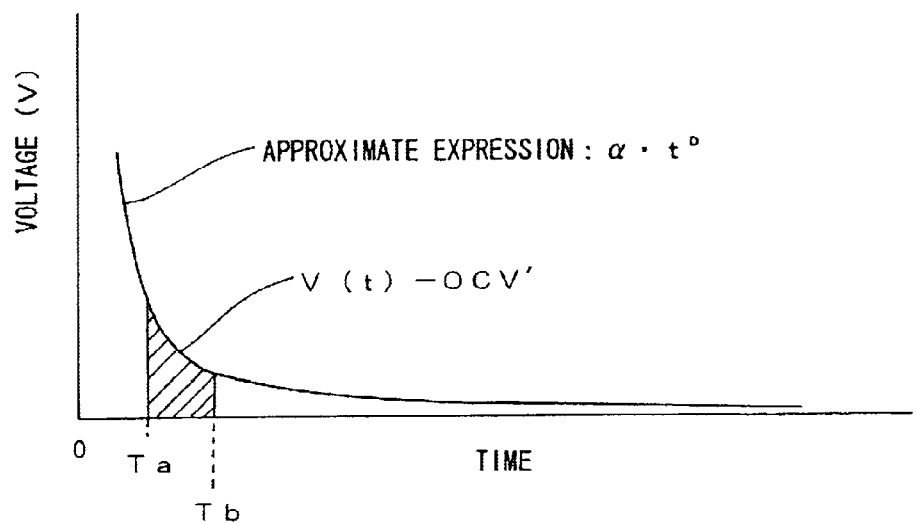
FIG. 15 is another graph for use to illustrate a method of estimating an open circuit voltage.
Figure 14:
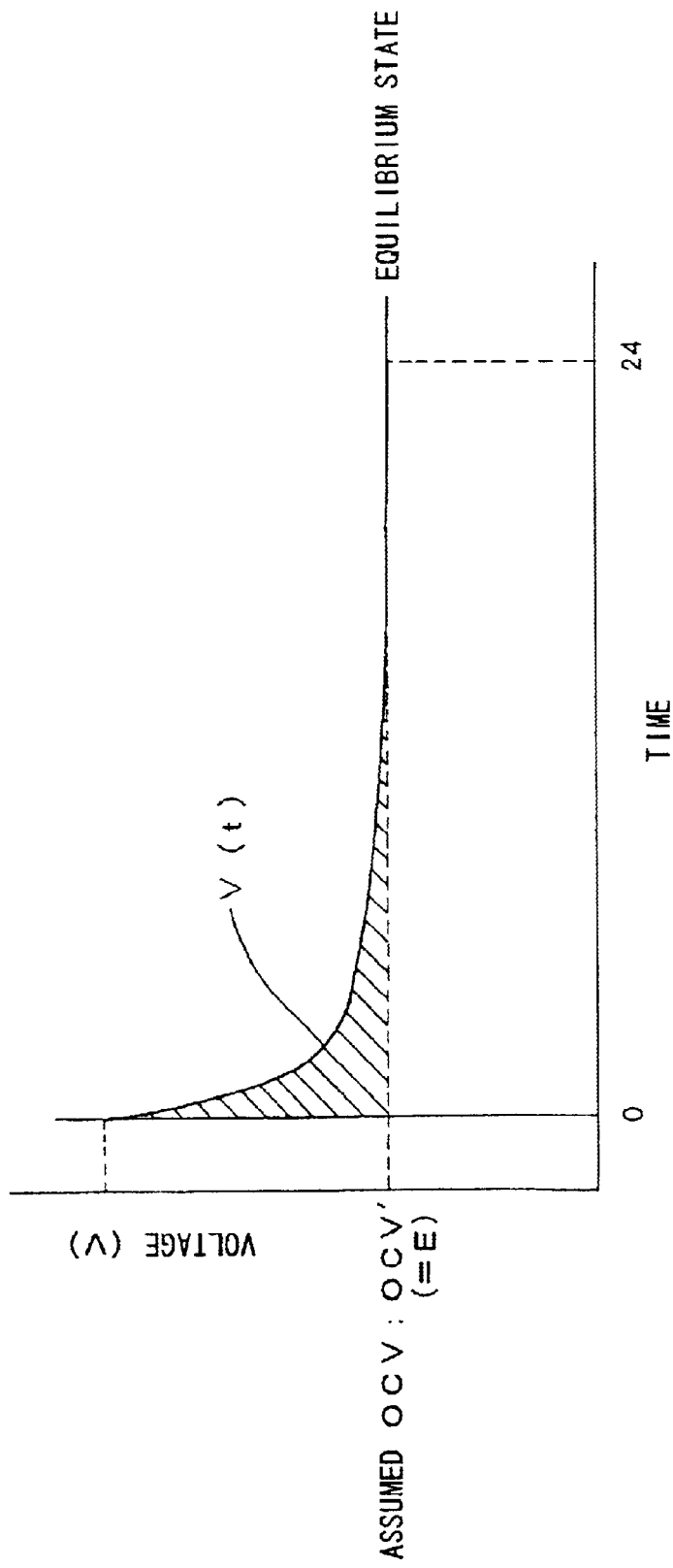
FIG. 14 is a graph for use to illustrate a method of estimating an open circuit voltage.

Therefore, if the E0 is unknown, as shown in FIG. 14, an assumed open circuit voltage E is computed and then, if this E is subtracted from the terminal voltage V(t), as shown in FIG. 15, it is expressed by a power approximate expression $\alpha \cdot t^D$ which asymptotically approaches the horizontal axis, wherein t is time, $\alpha$ is an unknown coefficient, and D is an unknown negative exponent. Generally, if a diffusion phenomenon is approximated by a power approximate expression $\alpha \cdot t^D$, an exponent D will be about—0.5.

Then, as shown in FIG. 15, after a charge is completed, a terminal voltage of the battery in its open circuit state is measured from a time point when a predetermined time Ta, for example 5 minutes, is passed to a time point when a predetermined time Tb, for example 15 minutes, is passed. An assumed open circuit voltage E is subtracted from the thus measured terminal voltage of the battery in its open circuit state, thereby computing the power approximate expression $\alpha \cdot t^D$.

Since a change in an open circuit voltage after completion of a charge can be regarded as a change in a voltage arisen due to the diffusion of the electrolyte, an assumed open circuit voltage E obtained when the power approximate expression $\alpha \cdot t^D$, the exponent of which is—0.5, is obtained can be regarded as an open circuit voltage of the battery.

On the contrary, when a discharge of the battery is completed, as for a terminal voltage of the battery in its open circuit state, the component which has fallen due to the concentration polarization gradually increases with time passing and asymptotically changes approaching an open circuit voltage E0 that is a terminal voltage of the battery in its equilibrium state, for example, after 24 hours. In the case of a discharge, since the assumed open circuit voltage E is always greater than the power approximate expression $\alpha \cdot t^D$, a value obtained by subtracting the assumed open circuit voltage E from the measured terminal voltage of the battery in its open circuit state becomes negative, therefore the absolute value of such a subtracted value described above is used, thereby computing the power approximate expression $\alpha \cdot t^D$.

Generally, upon completion of a charge or discharge, after a predetermined period of time therefrom, a terminal voltage of the battery in an open circuit state is measured plural times for a specific period of time. Then, from a value obtained by subtracting an assumed open circuit voltage from the measured terminal voltage, a predetermined power approximate expression having a negative exponent is determined. Then, such a determination is carried out repeatedly with updating the assumed open circuit voltage until the exponent of the determined power approximate expression becomes—0.5 and the assumed open circuit voltage when the exponent becomes—0.5 is estimated to be an open circuit voltage.

In a case, in which the exponent does not become—0.5 even when the determination is carried out by updating the assumed open circuit voltage for a predetermined number of times, it is judged that the exponent does become about—0.5 with the repeated determination and the assumed open circuit voltage at that time is estimated to be an open circuit voltage, thereby eliminating unnecessary process for determining the power approximate expression.

The reason why the sampling of the terminal voltage is started after the predetermined time Ta, for example 5 minutes, is passed upon a charge or discharge is halted is that a change in the voltage right after the charge or discharge includes a component having no relation with the diffusion of the electrolyte such as internal resistance, activation polarization and overvoltage accompanying with gas generation and that if such a component is collected it might be a cause of error when the power approximate expression is computed.

The reason why the sampling of the terminal voltage is carried out up to a time point when the predetermined time Tb, for example 15 minutes, is passed from when a charge or discharge is halted is that besides for saving time period for the measurement, a decrease in a change in the voltage with time passing might cause a deterioration in the estimating accuracy of an open circuit voltage depending on the measurement resolution an that an influence of a voltage drop due to a dark current of a vehicle increases with time passing.

Figure 16:
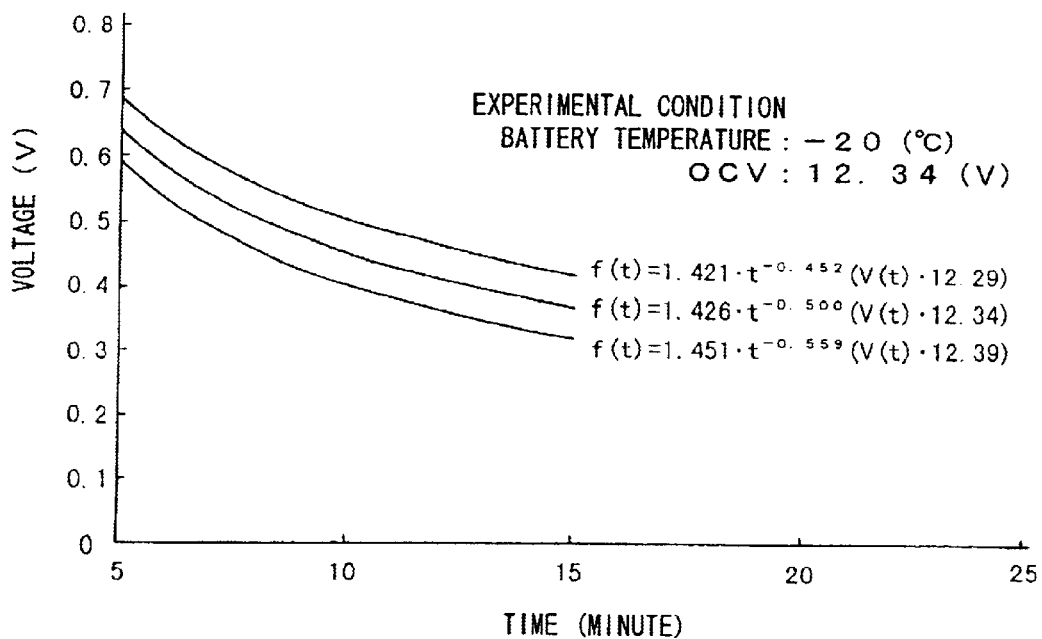
FIG. 16 is a graph for illustrating materialization of a method.

In the following, it will be explained that if a diffusion phenomenon is approximated by a power approximate expression $\alpha \cdot t^D$, the exponent becomes about—0.5, with reference to FIG. 16.

In a battery having an open circuit voltage 12.34 V, the assumed open circuit voltage is set to be 12.34 V and in a power approximate expression determined by using a value obtained by subtracting the assumed open circuit voltage from the terminal voltage of the battery in an open circuit state measured after the halt of a charge, the exponent becomes—0.500, whereas if the estimated OCV is set to be 12.29 V which is smaller than 12.34 V, the exponent becomes—0.452 which is larger than—0.500 while if the estimated OCV is set to be 12.39 V which is larger than 12.34 V, the exponent becomes—0.559 which is smaller than—0.500. Thus, it is seen that when the exponent of the power approximate expression becomes—0.5, the assumed OCV becomes equal to an OCV.

Summarizing the methods as described above, in the method of estimating an open circuit voltage, upon estimating an OCV of the battery mounted on a vehicle for supplying electric power to loads on the vehicle, upon completion of a charge or discharge, a terminal voltage of the battery in its open circuit state is measured plural times in a specific period of time after the predetermined time has passed, then from a difference between the measured terminal voltage and the assumed OCV, a predetermined power approximate expression having a negative exponent is determined and then, the determination of the expression is repeatedly carried out with updating the assumed OCV until the exponent of the determined expression becomes—0.5 or about—0.5 and finally, the assumed OCV when the exponent becomes—0.5 or about—0.5 is estimated to be an OCV.

According to the method described above, by measuring a terminal voltage of the battery in an open circuit state for a relatively short period of time after completion of a charge or discharge of the battery, an asymptote of a power approximate expression that does not change being affected by temperature can be estimated to be an OCV.

In the method of estimating an open circuit voltage as described above, in a case in which the terminal voltage is measured after completion of a discharge, the value for determining the power approximate expression is an absolute value of the value obtained by subtracting the assumed OCV from the measured terminal voltage of the battery in an open circuit state.

In the following, another method of estimating an OCV will be explained.

Generally, when a charge of the battery mounted on a vehicle is completed, as for a terminal voltage of the battery in an open circuit state, the component which has risen due to the concentration polarization gradually decreases with time passing and asymptotically changes approaching an open circuit voltage OCV that is a terminal voltage of the battery in its equilibrium state, for example, after 24 hours. Such an asymptotic curve is generally expressed by a power expression.

In a case of completion of a charge, for example, when the temperature is high, the speed for asymptotically approaching the OCV is higher compared to when the temperature is low. However, when a certain period of time passes after the completion of the charge, a decreasing acceleration of the terminal voltage becomes small with regard to a lapse of time not depending on the temperature, and the asymptotic curve can become almost approximated by a straight line.

Therefore, if an appropriate part of the terminal voltage-time characteristic after a certain period of time passes from the completion of the charge is approximated by a straight line, the part is expressed by a straight line approximate expression $V(t)=c \cdot t+E$ which has a very small gradient with regard to the horizontal axis. In the expression, c is an unknown coefficient, t is an elapsed time from the completion of a charge or discharge, and E is an unknown intercept.

Figure 17:
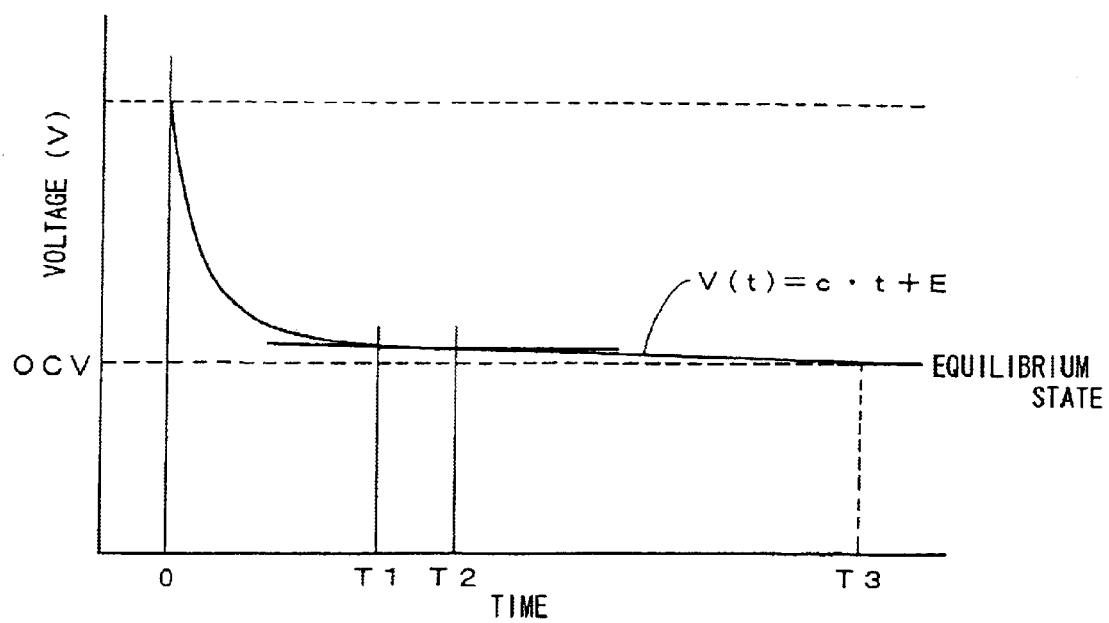
FIG. 17 is a graph for use to illustrate another method of estimating an open circuit voltage.

As shown in FIG. 17, after the completion of a charge, a terminal voltage of the battery in an open circuit state is measured from a time point when the predetermined time T1 passes up to a time point when the predetermined time T2 passes, then from the measured terminal voltage, a straight line approximate expression $V(t)=c \cdot t+E$, which shows a relation between the terminal voltage of the battery in an open circuit state and the elapsed time period from the completion of the charge, is computed.

Generally, a change in an OCV after completion of a charge or discharge can be regarded as a change in the voltage due to diffusion of the electrolyte. Since the diffusion of the electrolyte increases with increasing temperature, therefore the absolute value of a coefficient c, which is the gradient for the horizontal axis (i.e., time axis) of the computed straight line approximate expression $V(t)=c \cdot t+E$, becomes large when the temperature is low, while it becomes small when the temperature is high. On the other hand, after a charge, the intercept E that is the gradient for the longitudinal axis (i.e., voltage axis) of the computed straight line approximate expression $V(t)=c \cdot t+E$ becomes large when the temperature is low, while it becomes small when the temperature is high. On the other hand, after a discharge, it becomes small when the temperature is low, while it becomes large when the temperature is high.

Accordingly, whatever values the c and E are computed to be depending on the temperature, there exists an identical time t=T3 at which an OCV is computed in the straight line approximate expression $V(t)=c \cdot t+E$. Therefore, a value of the straight line approximate expression $V(t)=c \cdot t+E$ at this t=T3 can be regarded as an OCV of the battery in an equilibrium state.

In the preferred embodiment, the time point T1 when the sampling of the terminal voltage in an open circuit state is started is set to be a time point when 20 minutes passes after a halt of a charge or discharge, while the time point T2 when the sampling of the terminal voltage in an open circuit state is finished is set to be a time point when 30 minutes passes after the halt of a charge or discharge. Further, the time point T3, which is substituted for t in the straight line approximate expression $V(t)=c \cdot t+E$ that is computed from the terminal voltage in an open circuit state sampled (i.e., measured) for the 10 minutes therebetween, is set to be a time point when 83–84 minutes passes after the halt of a charge or discharge. These time points can be predetermined by figuring out experimentally depending on the specification of each battery.

The reason why the sampling of the terminal voltage is carried out up to a time point when the predetermined time T2 is passed from when a charge or discharge is halted is that besides for saving time period for the measurement, a decrease in a change in the voltage with time passing might cause a deterioration in the estimating accuracy of an open circuit voltage depending on the measurement resolution an that an influence of a voltage drop due to a dark current of a vehicle increases with time passing.

Summarizing the methods as described above, in the method of estimating an open circuit voltage, upon estimating an OCV of the battery mounted on a vehicle for supplying electric power to loads on the vehicle, a terminal voltage of the battery in its open circuit state is measured plural times while an elapsed time after completion of a charge or discharge reaches from a predetermined first time to a predetermined second time, then a predetermined straight line approximate expression is determined (here, the expression showing a relation between the measured terminal voltage and the elapsed time described above) and then, a solution of the straight line approximate expression obtained when a predetermined third time (being longer than the second time) is substituted for t as the elapsed time is estimated to be an OCV of the battery in an equilibrium state.

In the following, a basic idea of the real-time charge efficiency (RCE) and a method of computing the RCE of the battery 13 during a charge will be explained.

Upon a constant voltage charge with a predetermined charging voltage value $V_T$ for the battery 13, if an electrically insulating passivation film is formed on a surface of the electrode of the battery 13 while a charge or discharge has not been carried out previously, at a time stage when a charge is just started, the predetermined charging voltage value $V_T$ is applied to the battery 13, thereby gradually breaking the passivation film and canceling it.

Figure 18:
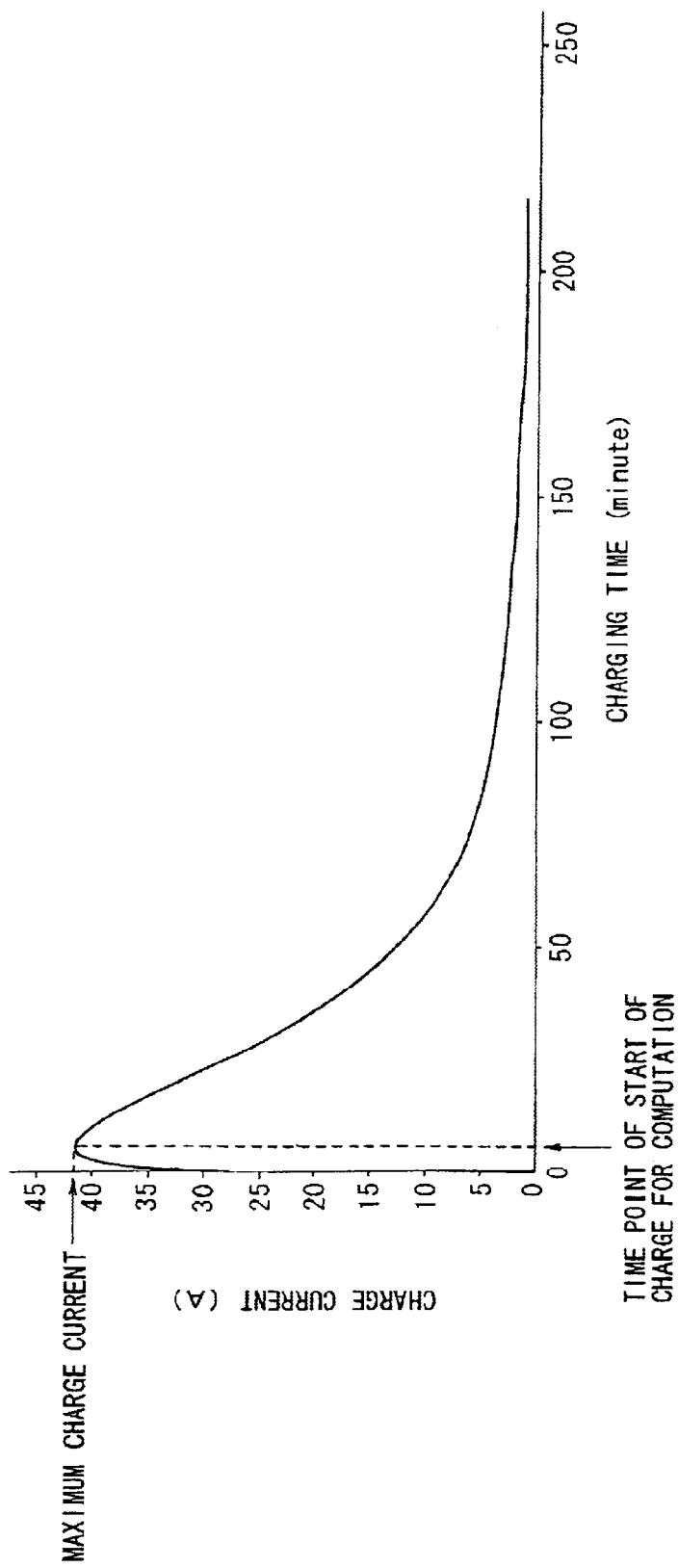
FIG. 18 is a graph illustrating a relation between a charging time and a charging current.

In this case, when a charge of the battery 13 is started, a charging current $I_{CHG}$ corresponding to the predetermined charging voltage value $V_T$ does not flow immediately, instead, as shown in FIG. 18, accompanying with the recovery in the electrical conductivity of the electrode due to the break of the passivation film, the charging current $I_{CHG}$ of the battery 13 gradually increases approaching a value corresponding to the predetermined charging voltage value $V_T$.

For the time stage while the charging current $I_{CHG}$ of the battery 13 gradually increases approaching a value corresponding to the predetermined charging voltage value $V_T$, since the charging current $I_{CHG}$ keeps low values, it can be regarded that there is no deterioration in the RCE due to the phenomenon of gasification. Therefore, in a time period until a value of the charging current $I_{CHG}$ reaches a value corresponding to the predetermined charging voltage value $V_T$, it can be regarded that the battery 13 is charged with RCE=100% not depending on a lapse of the charging time.

When the value of the charging current $I_{CHG}$ reaches a value corresponding to the predetermined charging voltage value $V_T$, at that time, since there is no resistance component due to the passivation film (because the film being broken), therefore only a resistance component consisting of: a change $R_{E0}$ of the resistance corresponding to the increased component $\Delta E0$ of the internal electromotive force E0 of the battery 13; and an internal resistance of the battery (i.e., pure resistance R+polarization resistance Rpol) governs (i.e., controls) the charging current $I_{CHG}$ of the battery 13, which is under a constant voltage charge with the predetermined charging voltage value $V_T$.

The internal electromotive force E0 of the battery 13 rises in a time period until the value of the charging current $I_{CHG}$ reaches the maximum value corresponding to the predetermined charging voltage value $V_T$, however its change $\Delta E0$ is very small compared to E0, therefore the resistance component of the battery 13 at a time point when the charging current $I_{CHG}$ reaches the maximum value can be substantially regarded as only the internal resistance (R+Rpol) of the battery 13.

If an insulating passivation film is not formed on a surface of the electrode of the battery 13 when the battery 13 is constant voltage charged with the predetermined charging voltage value $V_T$, since the charging current $I_{CHG}$ corresponding to the predetermined charging voltage value $V_T$ immediately starts to flow, the resistance component of the battery 13 is regarded as only the internal resistance R+Rpol from the beginning of the charge.

Figure 19:
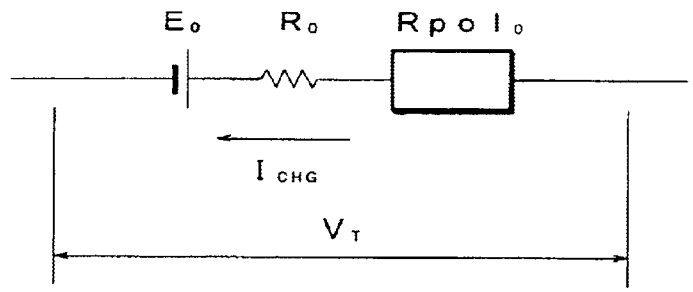
FIG. 19 is an equivalent circuit of a battery at a starting point of time of a charge.

Accordingly, if a time point of start of a charge is supposed to be either (1) a time point when a constant voltage with $V_T$ is applied to the battery 13 in which an insulating passivation film is not formed on a surface of the electrode or (2) a time point when the value of $I_{CHG}$ of the battery 13 reaches the maximum value corresponding to $V_T$, an equivalent circuit of the battery 13 at that time is a circuit as shown in FIG. 19, in which circuit the pure resistance $R_0$, the polarization resistance component $Rpol_0$ and the electromotive force $E_0$ are connected in series. That is, the internal resistance Rs of the battery 13 at a time point when a charge is started is expressed by the following expression:

$$Rs=R_0+Rpol_0.$$

During the charge with the predetermined charging voltage value $V_T$, the battery 13 receives a change in its state such as a rise in the electromotive force ($E_0 \rightarrow E_0+\Delta E_0$), and a drop in the pure resistance and in the polarization resistance component ($R_0 \rightarrow R'$ ($R'<R_0$), $Rpol_0 \rightarrow Rpol'$ ($Rpol'<Rpol_0$)) in response to the rise $\Delta E_0$ in the electromotive force.

Figure 20:
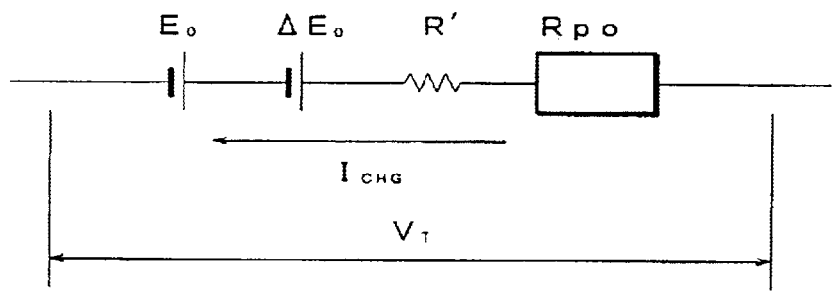
FIG. 20 is an equivalent circuit of a battery after starting of a charge.

Here, if the rise $\Delta E_0$ in the internal electromotive force $E_0$ of the battery 13 is considered as a change $R_{E0}$ in the resistance for the rise $\Delta E_0$, it means that the $R_{E0}$ is further connected in series into the series circuit consisting of the pure resistance R', the polarization resistance component Rpol' and the electromotive force $E_0$, the equivalent circuit changes to a circuit shown in FIG. 20. That is, the internal resistance Rs' of the battery 13 during the charge is started is expressed by the following expression:

$$Rs'=R_{E0}+R'+Rpol'.$$

If a total electrical quantity flowing into the battery 13 during the charge is equal to an electrical quantity being charged in the battery 13 as the electromotive force, that is, the RCE is ideally 100%, a rise in the voltage in the remaining resistance component obtained by subtracting each electromotive force $E_0$ from the equivalent circuit in FIGS. 19 and 20 is the same with each other, that is, it means that the resistance drops only by the amount of the change $R_{E0}$ in the resistance for the rise in the electromotive force.

Therefore, before the charge and during the charge, regarding the internal resistance of the battery 13, the following expressions are formed:

$$Rs=Rs'$$

$$R_{E0}+R'+Rpol'=R_0+Rpol_0$$

$$(R_{E0}+R'+Rpol') \times I_{CHG}=(R_0+Rpol_0) \times I_{CHG0}.$$

Then, since the value Rs ($=R_0+Rpol_0$) of the internal resistance of the battery 13 at a time point when the charge starts is constant of course, the value Rs'($=R_{E0}+R'+Rpol'$) of the internal resistance of the battery during the charge is constant provided that the RCE is 100% ideally.

However, practically, the RCE is not 100% because oxygen and hydrogen gas is formed in the vicinity of the electrode of the battery 13 accompanying with the charge reaction, generating $H_2O$, and a part of the electrical quantity flowing into the battery 13 is not stored in the battery 13 as the electromotive force.

Considering the gas generation with respect to a change in the internal resistance of the battery 13, the value of the internal resistance Rs' of the battery 13 during the charge is not equal to the value of the internal resistance Rs $(=R_0+Rpol_0)$ of the battery 13 at a time point when the charge starts and increases by a factor of a value of gasification resistance component $R_{GAS}$, which corresponds to the amount of the electrical quantity to be gasified. That is, the internal resistance Rs' of the battery 13 during the charge is expressed by the following expression:

$$Rs' = R_{E0} + R' + Rpol' + R_{GAS}.$$

Further, since the amount of gas being generated during a charge increases significantly when the state of charge of the battery 13 approaches the fully charged state, the gasification resistance component $R_{GAS}$ also changes according to the state of charge of the battery 13. As shown in FIG. 21, in which a change in the internal resistance of the battery 13 is shown with regard to the charging time in a case of the constant voltage charge, the internal resistance of the battery 13 during a charge increases from the value of the internal resistance $Rs = (R_0 + Rpol_0)$ at a time point when the charge starts by a factor of an increase in the gasification resistance component $R_{GAS}$ as the time passes approaching the fully charged state.

Since the charge of the battery 13 is carried out by the constant voltage charge with the predetermined charging voltage value $V_T$, the value of the internal resistance of the battery 13 during a charge, that is, the $Rs' = (R_{E0} + R' + Rpol')$ after the charge starts increases exceeding the internal resistance of the battery 13 when the charge starts, that is, Rs $(=R_0 + Rpol_0)$.

Accordingly, a value of an effective current (hereinafter, $I_{CHG}$(effective)) for a charge, which corresponds to a value of the electrical quantity actually stored as the electromotive force in the battery 13, is smaller than a value of the charging current (hereinafter, $I_{CHG}$(measured)), which corresponds to a total electrical quantity actually flowing into the battery 13. The difference between the two described above is a value of gasification current (hereinafter, $I_{GAS}$) corresponding to an electrical quantity that is not stored as the electromotive force in the battery 13. This is expressed by the following expression:

$$I_{CHG}(\text{measured}) = I_{CHG}(\text{effective}) + I_{GAS}.$$

Then, the RCE of the battery 13 can be computed by the following expression:

$$RCE = [I_{CHG}(\text{effective})/I_{CHG}(\text{measured})] \times 100\%.$$

Since $I_{CHG}$(measured) is a value of current actually flowing into the battery 13, it's A/D converted value of an output from the current sensor 15 by way of I/F21 can be collected, that is, can be measured. On the other hand, $I_{CHG}$(effective) cannot be actually measured like $I_{CHG}$(measured) and of course the gasification current $I_{GAS}$ cannot be measured, that is, cannot be computed. Therefore, the expression of RCE described above must be converted into another factor which can be measured or computed.

Here, since the $I_{CHG}$(effective) becomes small when the $R_{GAS}$ becomes large, as for the fully charged state of the battery 13 in which the $R_{GAS}$ becomes the maximum, most of the total electrical quantity flowing into the battery 13 corresponding to the $I_{CHG}$(effective) is actually consumed in the gasification and it is not stored as the electromotive force in the battery 13.

Therefore, it means that although an electrical quantity corresponding to the value of $R_{GAS}$ flows into the battery 13 in the fully charged state of the battery 13, it is consumed for the gasification and not stored as the electromotive force in the battery 13, and such a state can be regarded as a state in which the RCE=0.

Further, since the component $R_{GAS}$ out of the internal resistance $Rs' = (R_{E0} + R' + Rpol' + R_{GAS})$ of the battery 13 during a charge can be regarded as a value corresponding to an electrical quantity which is not stored as the electromotive force in the battery 13 out of the electrical quantity flowing into the battery 13 at that time point, therefore by dividing a value of the $R_{GAS}$ at any time point during the charge by a value $R_{GASf}$ of the $R_{GAS}$ in the fully charged state of the battery 13 in a state of the RCE=0, a value indicating a deterioration ratio of the real-time charge efficiency RCE of the battery 13 can be computed.

Then, the $R_{GAS}$ at any time point during a charge can be computed by the following expression:

$$R_{GAS} = Rs' - Rs = (R' + Rpol') - (R_0 + Rpol_0).$$

On the other hand, there is the following relation as shown in FIG. 21 between the internal resistance $R_F$ in the characteristic fully charged state of the battery 13 and the $R_{GAS}$ in the fully charged state:

$$R_F = R_{GASf} + Rs.$$

Therefore, the $R_{GASf}$ in the fully charged state of the battery 13 can be computed by the following expression:

$$R_{GASf} = R_F - Rs.$$

Therefore, a value divided the gasification resistance component $R_{GAS}$ at any time point during a charge by the gasification resistance component $R_{GASf}$ in a state of the RCE=0, that is, in the fully charged state can be computed by the following expression:

$$(Rs' - Rs)/(R_F - Rs).$$

Therefore, a value indicating a deterioration ratio of the charge efficiency of the battery 13 at any time point during a charge can be computed by the expression $(Rs' - Rs)/(R_F - Rs)$ and then, by an expression subtracted 1 therefrom:

$$[1 - (Rs' - Rs)/(R_F - Rs)] \times 100\%,$$

the RCE of the battery 13 at any time point during a charge can be computed.

That is, the RCE is expressed by the following expression:

$$RCE = [1 - (Rs' - Rs)/(R_F - Rs)] \times 100\%.$$

As for the value $R_{GASf}$ in a state of RCE=0, the state of RCE=0 is a fully charged state of the battery, in which a value of $R_{GAS}$ becomes the maximum, and at that time, the following relation:

$$R_{GAS} \gg R_{E0} + R' + Rpol'$$

is realized meaning that a value of the internal resistance $(R_{E0} + R' + Rpol')$ of the battery 13 during a charge in a case of RCE=100% is negligibly small compared to a value of the gasification resistance component $R_{GAS}$.

Since a value of the resistance $R_F$ (=Rf+Rpolf) upon the fully charged state that is a value of the internal resistance in the characteristic fully charged state of the battery 13 indicates a value of the internal resistance Rs' (=$R_{E0}$+R'+Rpol'+$R_{GAS}$) of the battery 13 during a charge especially in its fully charged state, upon the fully charged state, a relation $R_F$=Rs', that is, a relation:

$$Rf+Rpolf=R_{E0}+R'+Rpol'+R_{GAS}$$

is realized.

Then, upon the fully charged state of the battery 13 when RCE=0, a relation:

$$R_{GAS} \gg R_{E0}+R'+Rpol'$$

is realized, and a relation:

$$Rf+Rpolf=R_{E0}+R'+Rpol'+R_{GAS}$$

is realized. Therefore, a relation:

$$Rf+Rpolf \approx R_{GAS}$$

is realized, accordingly, since (Rf+Rpolf) is $R_F$ and the $R_{GAS}$ upon the fully charged state is $R_{GASf}$, a relation:

$$R_F \approx R_{GASf}$$

is realized.

Therefore, a value of the $R_{GASf}$ upon fully charged state of the battery 13 is converted into a value of the resistance $R_F$ upon the characteristic fully charged state of the battery 13, thereby instead of the expression described above, the real-time charge efficiency RCE can be computed by the following expression:

$$RCE=[1-(Rs'-Rs)/R_F] \times 100\%.$$

The above-mentioned explanation shows a basic idea of the real-time charge efficiency (RCE) and a method of computing the RCE of the battery 13 during a charge.

In the following, a method of computing the internal resistance R+Rpol (a resultant resistance consisting of the pure resistance R and the polarization resistance component Rpol) of the battery 13 during a charge, which is necessary to compute the RCE (real-time charge efficiency) of the battery 13, will be explained.

If the passivation film is not formed on the surface of the electrode in the battery 13, the state of the battery 13 is expressed by the following expression:

$$V_T-E=(R+Rpol) \times I_{CHG}.$$

That is, a value obtained by subtracting the internal electromotive force E from $V_T$ which is a terminal voltage of the battery 13 should be equal to a value obtained by multiplying the internal electrode (R+Rpol) by $I_{CHG}$ which is a value of the charging current at that time point.

Therefore, the internal electrode (R+Rpol) of the battery 13 can be computed by the following expression:

$$(R+Rpol)=(V_T-E)/I_{CHG}.$$

In the following, a method of computing the internal electromotive force E of the battery 13 before the start of a charge, which is necessary to compute the internal electrode (R+Rpol) of the battery 13 before the start of a charge, will be explained.

Since the internal electromotive force E of the battery 13 before the start of a charge is equal to an open circuit voltage of the battery 13 at that time point, a value of the OCV should be computed.

During a discharge of the battery 13, a pair of A/D converted values outputted from the current sensor 15 and voltage sensor 17 through the I/F21 is periodically collected, thereby periodically measuring the terminal voltage V and discharge current I of the battery 13, and then measuring the pure resistance R therefrom and computing a voltage—current characteristic, which does not include the influence of the polarization and depends on only the pure resistance R.

A voltage-current characteristic which includes the influence of the polarization is also computed from the measured values of V and I during the discharge, especially during the decrease in the discharge current I.

By using these two voltage-current characteristics described above, an estimated voltage Vn which is an OCV as a computed value is estimated.

In the following, a characteristic of a normal battery itself will be explained.

In a normal vehicle having an engine as a drive source and a hybrid vehicle in which a motor assists for shortage of the power generated by an engine, a load such as a starter motor and motor generator, which requires a large current, is mounted. An example of a voltage-current (V-I) characteristic of a battery that supplies an electric power to the load is plotted in FIGS. 22 and 23.

Figure 22:
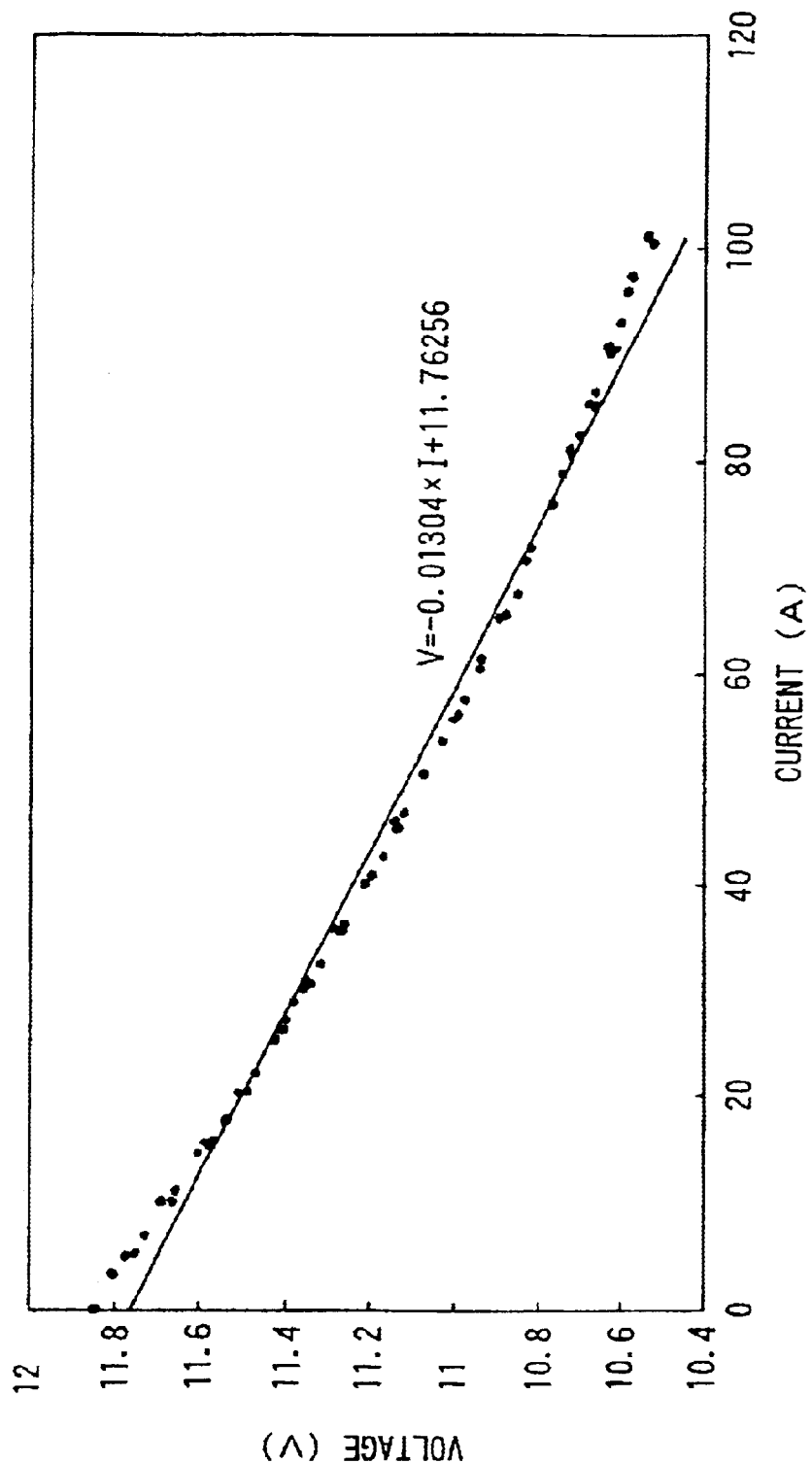
FIG. 22 is a graph illustrating an example of voltage-current characteristic of a battery, which is expressed by a linear approximate expression.
Figure 23:
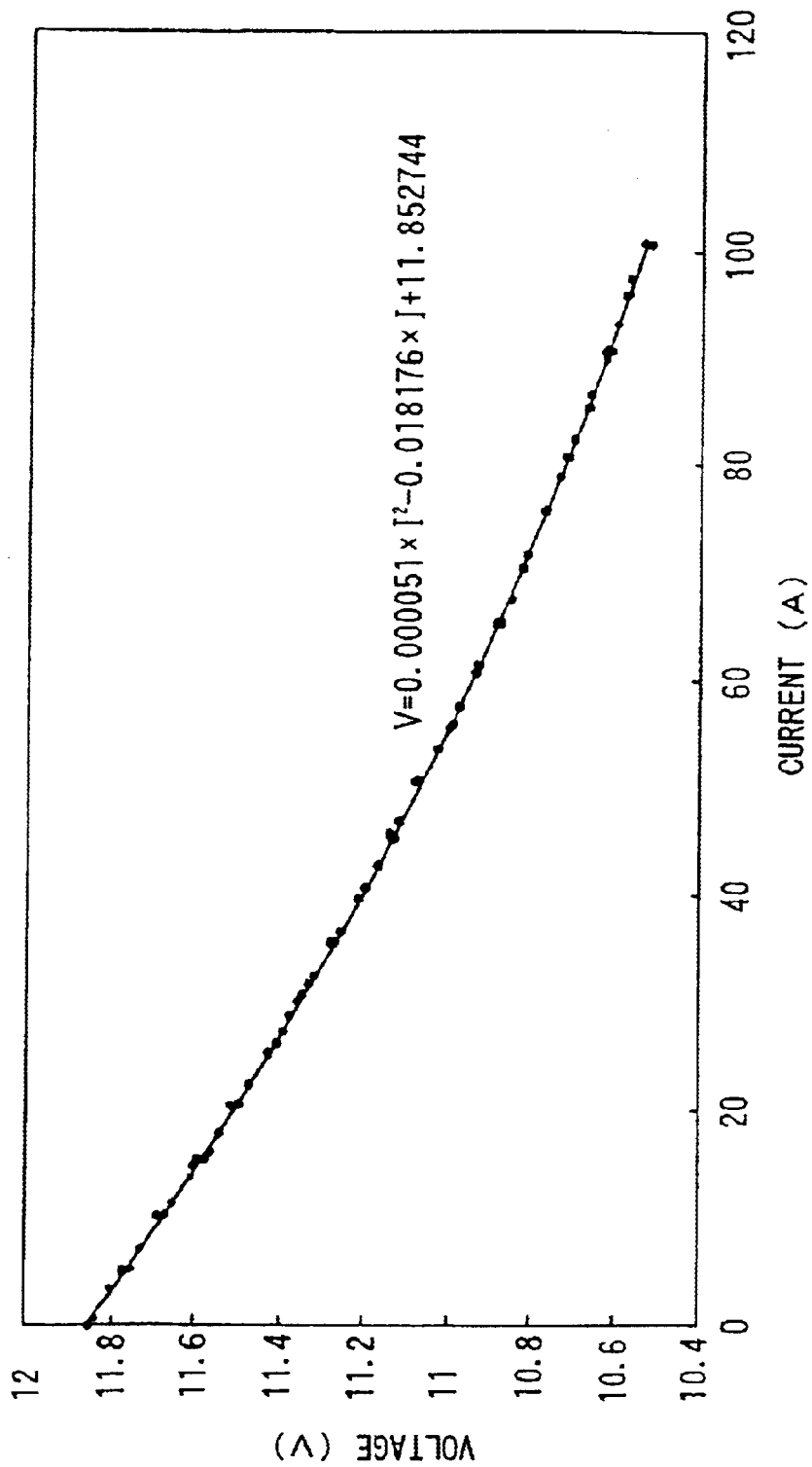
FIG. 23 is a graph illustrating an example of voltage-current characteristic of a battery, which is expressed by a quadratic approximate expression.

Conventionally, as shown in FIG. 22, the V-I characteristic has been approximated by a linear expression V=aI+b. However, because of an influence of a non-linear characteristic in the polarization resistance component as shown in FIG. 24, it has been known that a quadratic expression gives better correlation between V and I than a linear expression. Therefore, in the preferred embodiment, when an approximated V-I characteristic due to the pure resistance of the battery 13 is to be computed, as shown in FIG. 23, a quadratic approximate curve expression $V=aI^2+bI+c$ is computed by least squares method so as to use an approximate expression which gives a good correlation between V and I.

Figure 25:
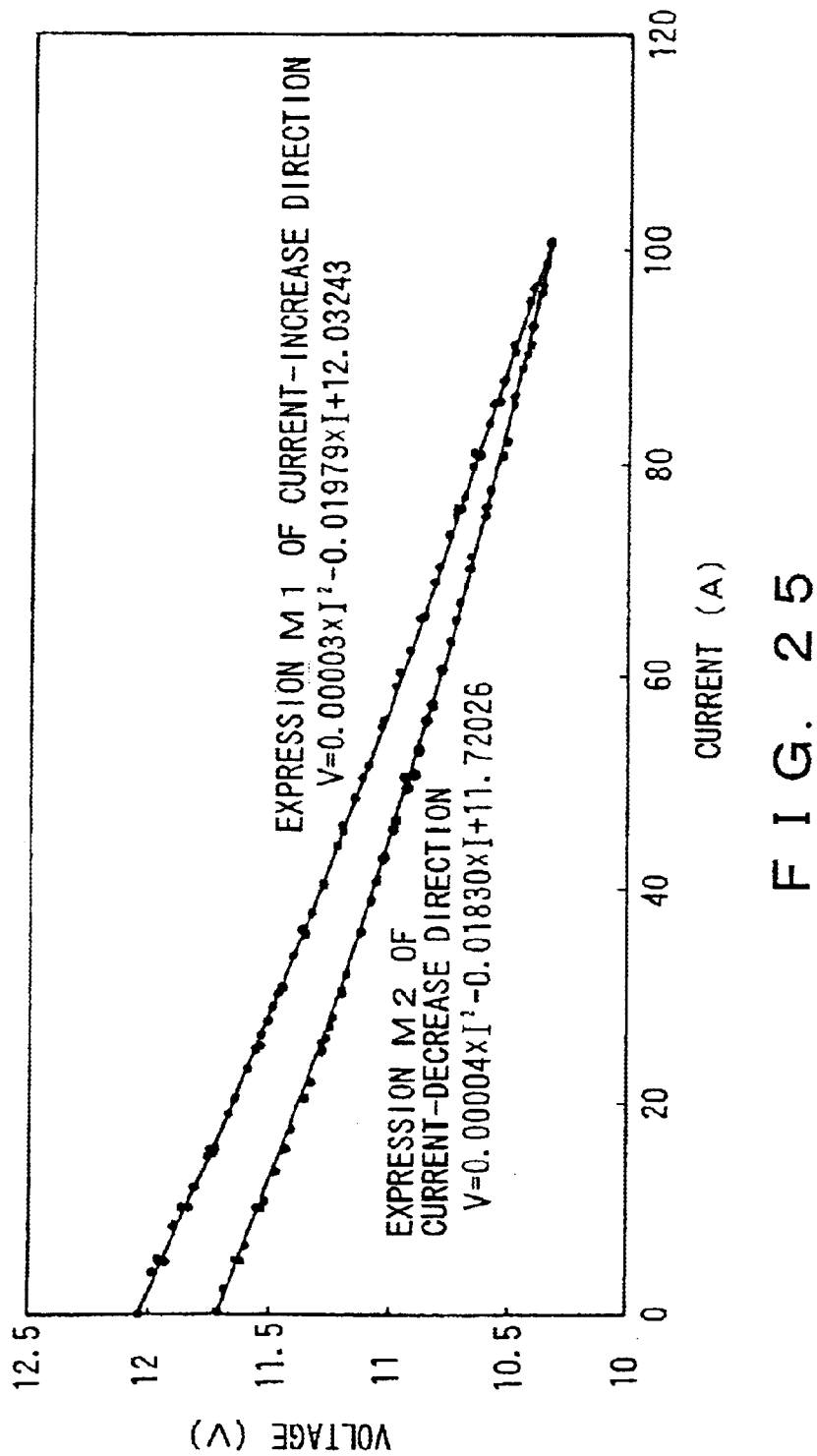
FIG. 25 is a graph illustrating an example of an approximate characteristic curve expressed by two quadratic approximate curve expressions obtained in one discharge process.

When the load requiring a large current as described above is drived, a constant load discharge with a specific large current value, which corresponds to the maximum supplying power value to the load, is carried out. A terminal voltage and discharge current are periodically measured, and on the basis of real data revealing a correlation between the terminal voltage and discharge current, as shown by a graph in FIG. 25, obtained are two expressions, that is, a first approximate curve expression M1 for a V-I characteristic during the increase in the discharge current and a second approximate curve expression M2 for a V-I characteristic during the decrease in the discharge current. The expressions described in FIG. 25 are an example of the approximate curve expressions obtained from the real data. A difference between M1 and M2 will be explained in the following.

In the approximate curve expression M1, taking the polarization resistance component at a time point when a discharge starts as a reference, when the discharge starts and the current increases, the polarization resistance component gradually increases. Thereafter, at a time point when the current reaches the maximum value, the polarization resistance component also reaches its maximum value and then the polarization is supposed to be canceled with the decrease in the current. However, practically, the polarization is not canceled with the decrease in the current, and because the reaction takes place being delayed, therefore in the approximate curve expression M2, its V-I characteristic is different from that of the M1 and a voltage drop larger than that of the M1 takes place, thereby the two approximate curve expressions M1 and M2 are obtained corresponding to the cases of the increase and decrease in the current, respectively.

In the following, a method of measuring the pure resistance R of the battery by using the M1 and M2 described above will be explained with reference to FIGS. 26–28.

Figure 26:
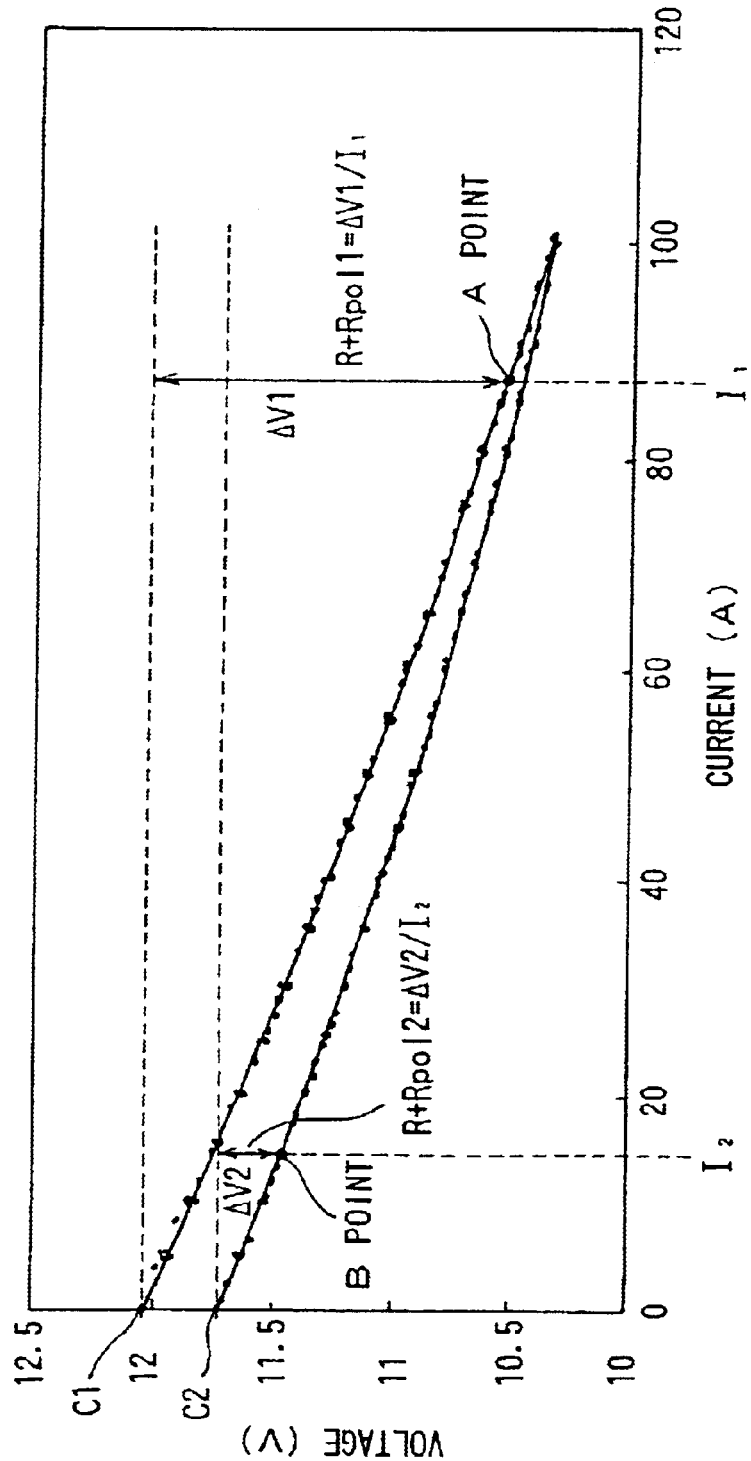
FIG. 26 is a graph illustrating how to determine two optional points on two approximate characteristic curves.

As shown in FIG. 26, first, an arbitrary point A is selected in a range of the real data on the approximate curve expression expressed by M1, and then $\Delta V1$, which is a voltage drop from an intercept C1 to the point A on the approximate curve, is computed. A value obtained by dividing this $\Delta V1$ by a current I1 at the point A is a resultant resistance consisting of the pure resistance R and the Rpol1 at that time point. That is, $$R+Rpol1=\Delta V1/I1.$$

Likewise, as shown in FIG. 26, an arbitrary point B is selected in a range of the real data on the approximate curve expression expressed by M2, and then $\Delta V2$, which is a voltage drop from an intercept C2 to the point B on the approximate curve, is computed. A value obtained by dividing this $\Delta V2$ by a current I2 at the point B is a resultant resistance consisting of the pure resistance R and the Rpol2 at that time point. That is, $$R+Rpol2=\Delta V2/I2.$$

A difference $\Delta R$ between the values of the resultant resistance at points A and B is expressed by:

$$\Delta R=R+Rpol1-(R+Rpol2)=Rpol1-Rpol2,$$

and is a difference between the values of the polarization resistance component at points A and B. That is clear from that the pure resistance R does not change during a discharge.

Figure 27:
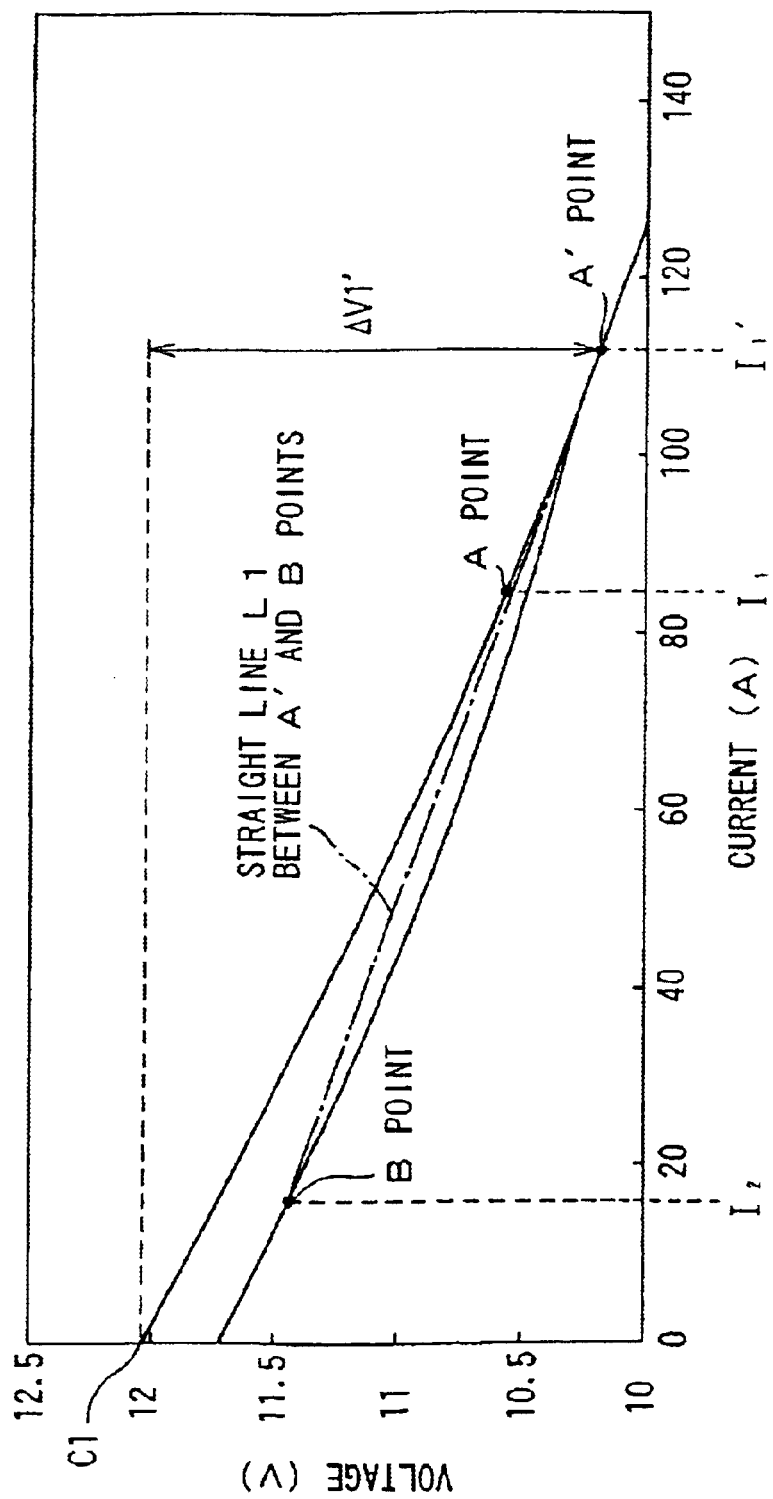
FIG. 27 is a graph illustrating how to determine an assumed point for a point determined on one approximate characteristic curve and how to compensate a gradient between two points.
Figure 28:
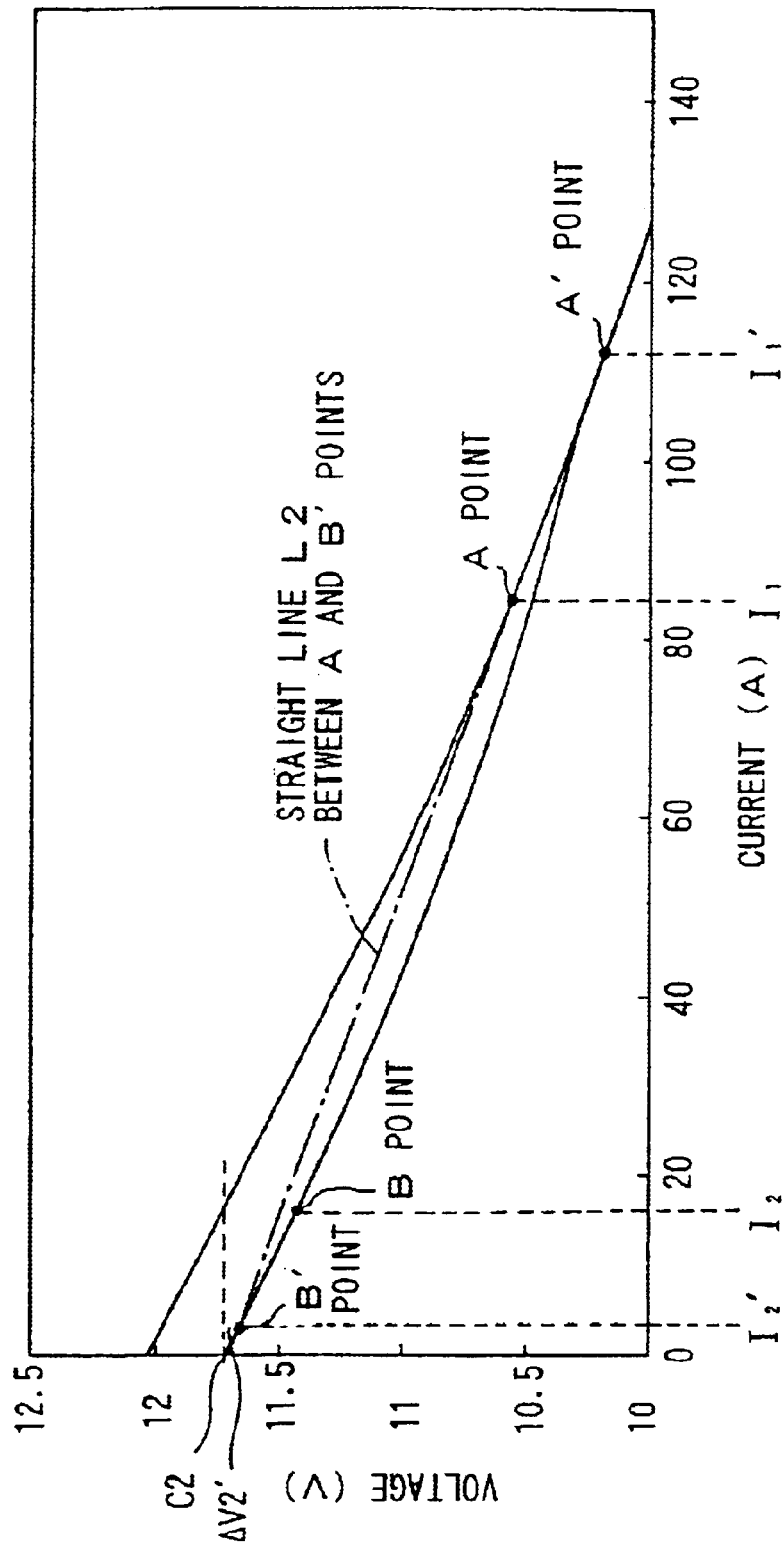
FIG. 28 is a graph illustrating how to determine an assumed point for a point determined on another approximate characteristic curve and how to compensate a gradient between two points.

As shown in FIG. 27, on the approximate curve expressed by M1, there is a point A' having a value of (R+Rpol1') which is equal to the resultant resistance (R+Rpol2) at the arbitrary point B, which is selected on the approximate curve expressed by M2. Further, as shown in FIG. 28, on the approximate curve expressed by M2, there is a point B' having a value of (R+Rpol2') which is equal to the resultant resistance (R+Rpol1) at the arbitrary point A, which is selected on the approximate curve expressed by M1.

That is, if the current and voltage at the point A' is set I1' and V1', respectively, and if the current and voltage at the point B' is set I2' and V2', respectively, a value of the polarization resistance component at the coordinate (I1', V1') of point A' is equal to that at the coordinate (I2, V2) of point B, and a value of the polarization resistance component at the coordinate (I1, V1) of point A is equal to that at the coordinate (I2', V2') of point B'.

In the following, taking the point B as a reference, a method of computing the current I1' and voltage V1' at point A' having the same value with a value of the resultant resistance (R+Rpol2) at point B will be explained.

If a voltage drop from an intercept C1 (i.e., an intercept of the approximate curve expressed by M1 against the longitudinal axis) to the point A' is set to be $\Delta V1'$, it is expressed by:

$$\Delta V1'=C1-(a1I1'^2+b1I1'+C1)=(R+Rpol2)I1',$$

and then, $$-(a1I1'+b1)=R+Rpol2.$$

Then, $$I1'=-(b1+R+Rpol2)/a1.$$

Since R+Rpol2 (=R+Rpol1')=$\Delta V2/I2$ (=$\Delta V1'/I1'$), $$I1'=-[b1+(\Delta V2/I2)]/a1$$
$$=-[b1+(\Delta V1'/I1')]/a1.$$

Further, for the voltage V1' at the point A' is expressed by:

$$V1'=a1I1'^2+b1I1'+C1,$$

therefore, the coordinate (I1', V1') of the point A' is determined from the known values.

Likewise, taking the point A as a reference, the current I2' and voltage V2' at point B' having the same value with a value of the resultant resistance (R+Rpol1) at point A can be determined from the known values as follows:

$$I2'=-[b2+(\Delta V1/I1)]/a2$$
$$=-[b2+(\Delta V2'/I2')]/a2, \text{ and}$$
$$V2'=a2I2'^2+b2I2'^2+C2,$$

wherein $\Delta V2'$ is a voltage drop from an intercept C2 to the point B'.

If the coordinate (I1', V1') of the point A' is determined, as shown in FIG. 27, a gradient of a straight line L1 which is formed by connecting the point A' and point B is computed, thereby computing a value of the resultant resistance R1, which is obtained by dividing a difference (V1'–V2) in the voltage drop arisen due to the resultant resistance consisting of the pure resistance and the polarization resistance component Rpol2 by a difference (I1'–I2) in the current which flows at point A' and B. That is:

$$R1=(V1'-V2)/(I1'-I2).$$

Likewise, if the coordinate (I2', V2') of the point B' is determined, as shown in FIG. 28, a gradient of a straight line L2 which is formed by connecting the point B' and point A is computed, thereby computing a value of the resultant resistance R2, which is obtained by dividing a difference (V1–V2') in the voltage drop arisen due to the resultant resistance consisting of the pure resistance and the polarization resistance component Rpol1 by a difference (I1–I2') in the current which flows at point B' and A. That is:

$$R2=(V1-V2')/(I1-I2').$$

However, the values R1 and R2 of the resultant resistance computed as described above does not agree with the pure resistance. In order to make the gradient between the two points agree with the pure resistance, a difference in the voltage drop obtained by eliminating the voltage drop component arisen due to the polarization resistance component is divided by the difference in the values of the current, which will be explained in the following.

First, in a case in which the point B is taken as a reference, supposing that the value of the resultant resistance R1 is given by:

$$R1=R1'+Rpol2=R1'+Rpol1',$$

a voltage drop arisen when the current corresponding to a difference between the current I1' at point A' and the current I2 at point B flows into the resistance R1' is revised by lifting up the voltage at point A' by a factor of a voltage drop arisen when the current corresponding to a difference between the current I1' at point A' and the current I2 at point B flows into the polarization resistance component Rpol1' (or Rpol2), therefore the following expression is formed:

$$R1'(I1'-I2)=[V1'+Rpol1'(I1'-I2)]-V2.$$

Therefore, $$R1'(I1'-I2)=(V1'-V2)+Rpol1'(I1'-I2).$$

Since $Rpol1'=\Delta V1'/I1'-R1'$, $$R1'(I1'-I2)=(V1'-V2)+(\Delta V1'/I1'-R1')\times(I1'-I2)$$

and $$2R1'(I1'-I2)=(V1'-V2)+\Delta V1'/I1'(I1'-I2),$$

and as a result, $$R1'=[(V1'-V2)+(\Delta V1'/I1')\times(I1'-I2)]/2(I1'-I2).$$

Here, ($\Delta V1'/I1'$) can be replaced by ($\Delta V2/I2$).

Likewise, in a case in which the point A is taken as a reference, supposing that the value of the resultant resistance R1 is given by:

$$R2=R2'+Rpol1=R2'+Rpol2',$$

a voltage drop arisen when the current corresponding to a difference between the current I1 at point A and the current I2' at point B' flows into the resistance R2' is revised by lifting up the voltage at point B' by a factor of a voltage drop arisen when the current corresponding to a difference between the current I1 at point A and the current I2' at point B' flows into the polarization resistance component Rpol2' (or Rpol1), therefore the following expression is formed:

$$R2'(I1-I2')=V1-[V2'-Rpol2'(I1-I2')].$$

Therefore, $$R2'(I1-I2')=(V1-V2')+Rpol2'(I1-I2').$$

Since $Rpol2'=\Delta V2'/I2'-R2'$, $$R2'(I1-I2')=(V1-V2')+(\Delta V2'/I2'-R2')\times(I1-I2),$$

and $$2R2'(I1-I2')=(V1-V2')+\Delta V2'/I2'(I1'-I2'),$$

and as a result, $$R2'=[(V1-V2')+(\Delta V2'/I2')\times(I1-I2')]/2(I1-I2).$$

Here, ($\Delta V2'/I2'$) can be replaced by ($\Delta V1/I1$).

However, the two values R1' and R2' computed as described above cannot be the real pure resistance R. By averaging the two values as:

$$R=(R1'+R2')/2,$$

the real pure resistance R can be obtained.

When the pure resistance R of the battery 13 is being computed, by using an updated pair of A/D converted values outputted from the current sensor 15 and voltage sensor 17 collected through the I/F21, by least squares method, computed are a voltage-current characteristic revealing a correlation between the terminal voltage V and discharge current I of the battery during the increase in discharge current I, for example, a first approximate curve expression M1 expressed by a quadratic expression $V1(I)=a1I^2+b1I+C1$, and a voltage-current characteristic revealing a correlation between the terminal voltage V and discharge current I of the battery during the decrease in discharge current I, for example, a first approximate curve expression M2 expressed by a quadratic expression $V2(I)=a2I^2+b2I+C2$.

Then, a first point A is determined on a voltage-current characteristic curve expressed by M1 and a second point B is determined on a voltage-current characteristic curve expressed by M2. Here, these points A and B are preferably determined in a range where real data of the terminal voltage and discharge current that are used to compute the respective approximate curve expressions exist, thereby preventing an assumed point from being set at an unsuitable position when the assumed point corresponding to each point A or B is being set afterward. Preferably, the points A and B are determined at both sides of a point where the polarization resistance component becomes the maximum, thereby enabling the assumed points being determined at both sides of the point of the maximum value and improving the accuracy upon computing the pure resistance of the battery.

Then, a first assumed point A' having the same resistance value with that of the second resultant resistance R2 consisting of the pure resistance and the second polarization resistance component Rpol2, which causes the second voltage drop $\Delta V2$ arisen when the second discharge current I2 corresponding to the second point B flows, is assumed on the first approximate expression M1. Likewise, a second assumed point B' having the same resistance value with that of the first resultant resistance R1 consisting of the pure resistance and the first polarization resistance component Rpol1, which causes the first voltage drop $\Delta V1$ arisen when the first discharge current I1 corresponding to the first point A flows, is assumed on the second approximate expression M2.

Then, the first gradient R1 of the straight line L1 formed by connecting the second point B and the first assumed point A' points is revised with a difference Rpol2 (I1'-I2) in the voltage drop due to the second polarization resistance component Rpol2, thereby computing a first revised gradient R1', in which the voltage drop due to the second polarization resistance component Rpol2 is eliminated. Likewise, the second gradient R2 of the straight line L2 formed by connecting the first point and the second assumed point B' points is revised with a difference Rpol1 (I1-I2') in the voltage drop due to the first polarization resistance component Rpol1, thereby computing a second revised gradient R2', in which the voltage drop due to the first polarization resistance component Rpol1 is eliminated.

By averaging the R1' and R2' thus computed, the pure resistance R of the battery 13 is computed.

Then, by multiplying the value of thus computed pure resistance R by the discharge current I in the real data which are collected for a newest specific period of time, a terminal voltage V due to the pure resistance during the discharge of the battery 13 is computed and then, by applying least squares method for a pair of the terminal voltage thus computed and the discharge current I collected previously, a linear voltage-current characteristic expression $V_R=a_R I+b_R$, which does not include the influence of the polarization and depends only on the pure resistance of the battery 13, is computed.

Then, with regard to the real data of the discharge current I, which decreases from a peaked value out of the real data previously collected, the correlation of the data is confirmed and least squares method is applied to a pair of the discharge current I and the terminal voltage corresponding to the discharge current I, thereby a linear voltage-current characteristic expression V=aI+b, which includes the influence of the polarization of the battery 13, is computed.

Then, the voltage-current characteristic expression V=aI+b is shifted toward the voltage axis so that the expression satisfies a coordinate (V1, I1) which is on the expression $V_R=a_R I+b_R$, wherein the current I1 is a current that is lower than the peaked current and usually flows when a starter motor or a motor generator is drived, thereby computing a shifted voltage-current characteristic expression V'=aI+b'.

Then, an assumed current value Is=−10 A (ampere), by which the estimated voltage Vn upon a constant current discharge has a linear characteristic with regard to the capacity of the battery 13, is substituted into the shifted voltage-current characteristic expression V'=aI+b' so as to estimate the estimated voltage Vn, and then a predetermined remnant voltage drop value $e_0$ is added to the estimated voltage Vn, thereby computing a revised estimated voltage Vn'.

The predetermined remnant voltage drop value $e_0$ means a remnant voltage drop value due to the influence of the remnant polarization upon completion of a discharge of the battery 13, which is obtained by subtracting the estimated voltage Vn from the OCV of the battery 13 computed in advance on the basis of the correlation between the terminal voltage V and the discharge current I of the battery 13.

The description mentioned above is a method of computing an OCV (i.e., revised estimated voltage Vn') of the battery 13 before a charge starts.

The method of computing an OCV (i.e., revised estimated voltage Vn') of the battery 13 before a charge starts as explained above is only a preferred embodiment and therefore, instead, for example, an electrical quantity stored in the battery 13 may be calculated by integrating the discharging quantity per unit time, which is computed by multiplying a value of the discharge current periodically measured by the measuring cycle time, and an OCV of the battery corresponding to the calculated quantity may be derived from a correspondence table stored in advance in the ROM 23c and so on.

Summarizing the method described above, in the charge efficiency detection method, as to an arbitrary period of time from the beginning of a charge of the battery to the end of the charge, a real-time charge efficiency (RCE), which is a ratio of an electrical quantity to be charged in the battery as the electromotive force to a total electrical quantity that has flowed into the battery, is detected.

According to the charge efficiency detection method, a real-time charge efficiency (RCE) of the battery at any time point can be accurately detected taking the occurrence of the gasification phenomenon accompanying with a change in the state of charge of the battery into consideration.

In the charge efficiency detection method, for an arbitrary time point (i.e., any time point) from a start of a charge to an end of the charge, the RCE (real-time charge efficiency) that is defined as a ratio of an electrical quantity to be charged into the battery as electromotive force to a total electrical quantity flowing into the battery is detected. In the method, by using a terminal voltage and charge current measured at each time point, a resistance upon starting the charge, which is an internal resistance value when the battery starts the charge, and a resistance after starting the charge, which is an internal resistance value at an arbitrary time point from a start of the charge to an end of the charge, are computed, then a difference between the resistance after starting the charge and the resistance upon starting the charge is computed, and then a ratio of the above-defined difference to the resistance value upon fully charged state that is a characteristic internal resistance value for the battery in its fully charged state is computed, thereby the RCE of the battery at an arbitrary time point is detected on the basis of this ratio.

With the method described above, the RCE can be accurately detected taking the occurrence on the gasification phenomenon accompanying with a change in the state of charge of the battery into consideration.

Further, the ratio of the above-defined difference to the resistance value upon fully charged state is computed as a value that indicates a drop from an ideal value of the RCE at an arbitrary time point, and a value obtained by subtracting the ratio from 1 is computed as a value that indicates the RCE at an arbitrary time point, thereby detecting the RCE of the battery at an arbitrary time point.

Further, in the charge efficiency detection method, a ratio of the above-defined difference (that is, the difference between the resistance after starting the charge and the resistance upon starting the charge) to a difference between the resistance value upon fully charged state and the resistance value after starting the charge is computed as a value that indicates a drop from an ideal value of the RCE of the battery, and then a value is computed by subtracting the value that indicates the drop from 1, thereby detecting the RCE of the battery at an arbitrary time point.

Further, with the charge efficiency detection method, on the basis of the RCE of the battery, a charged electrical quantity stored in the battery by the charge from the time point when the charge starts to the time point when the charge is completed is detected.

Furthermore, with the charge efficiency detection method, on the basis of the RCE of the battery, which is repeatedly continuously detected from the time point when the charge starts to the time point when the charge is completed, an electrical quantity stored in the battery, which is actually stored as the electromotive force, per unit time is computed, and then by integrating these values of the electrical quantity, an electrical quantity actually stored in the battery from the time point when the charge starts to the time point when the charge is completed is accurately detected.

In the method for detecting a charged electrical quantity, the time point when a charge starts is the time point when the charge starts from an active state of the electrode in which a passivation film is not formed on the electrode of the battery, and on the basis of a pattern of the change with time of the charge current of the battery, it is judged whether or not the electrode is in an active state, and if it is in an active state, an electrical quantity stored in the battery by the charge is detected on the basis of the RCE of the battery, and on the other hand if it is in a state in which a passivation film is formed on the electrode of the battery (that is, a state in which a passivation film is being broken by the charging process), a charged electrical quantity obtained by multiplying the charge current by the charging time is integrated, thereby an electrical quantity stored in the battery by the charge is detected.

If an insulating passivation film is formed on the electrode of the batter before a charge starts, a value of the charge current increases toward an inherent value corresponding to a voltage which is applied to the battery for the charge because of the destruction of the passivation film accompanying with the electric conduction to the electrode, and in such a time period in which the electrode is not in an active state, it can be regarded that there is no drop in the RCE due to the occurrence of the gasification phenomenon since the charge current is small. Therefore, in the time period in which the electrode is not in an active state, an electrical quantity being stored in the battery is periodically computed as a charged electrical quantity per unit time by multiplying the charge current by the charging time, and on the other hand, in a state in which the electrode is in an active state, on the basis of the RCE of the battery detected by the above-mentioned charge efficiency detection method, an electrical quantity to be stored in the battery is detected.

Although the present invention is explained with the preferred embodiments as described above, the present invention is not limited to these preferred embodiments, and various modifications and applications are possible.

In the above-mentioned preferred embodiment, as a relation between the predetermined OCV and SOC for the battery 13 upon non-degradation, a straight line N on the basis of an initial electrical quantity that is a total electrical quantity chargeable or dischargeable between OCVf and OCVe is used so that an electrical quantity (i.e., SOC) corresponding to an arbitrary OCV is estimated and then by multiplying this estimated SOC by the degradation degree SOH2, a SOC of the battery at an arbitrary time point is estimated. However, instead, as a relation between the predetermined OCV and SOC for the battery 13 upon non-degradation, an approximate expression, which is computed by using SOC data in a range in which a value of SOC exceeds a specific value of SOC and OCV data corresponding to SOC in the range, may be used.

Figure 29:
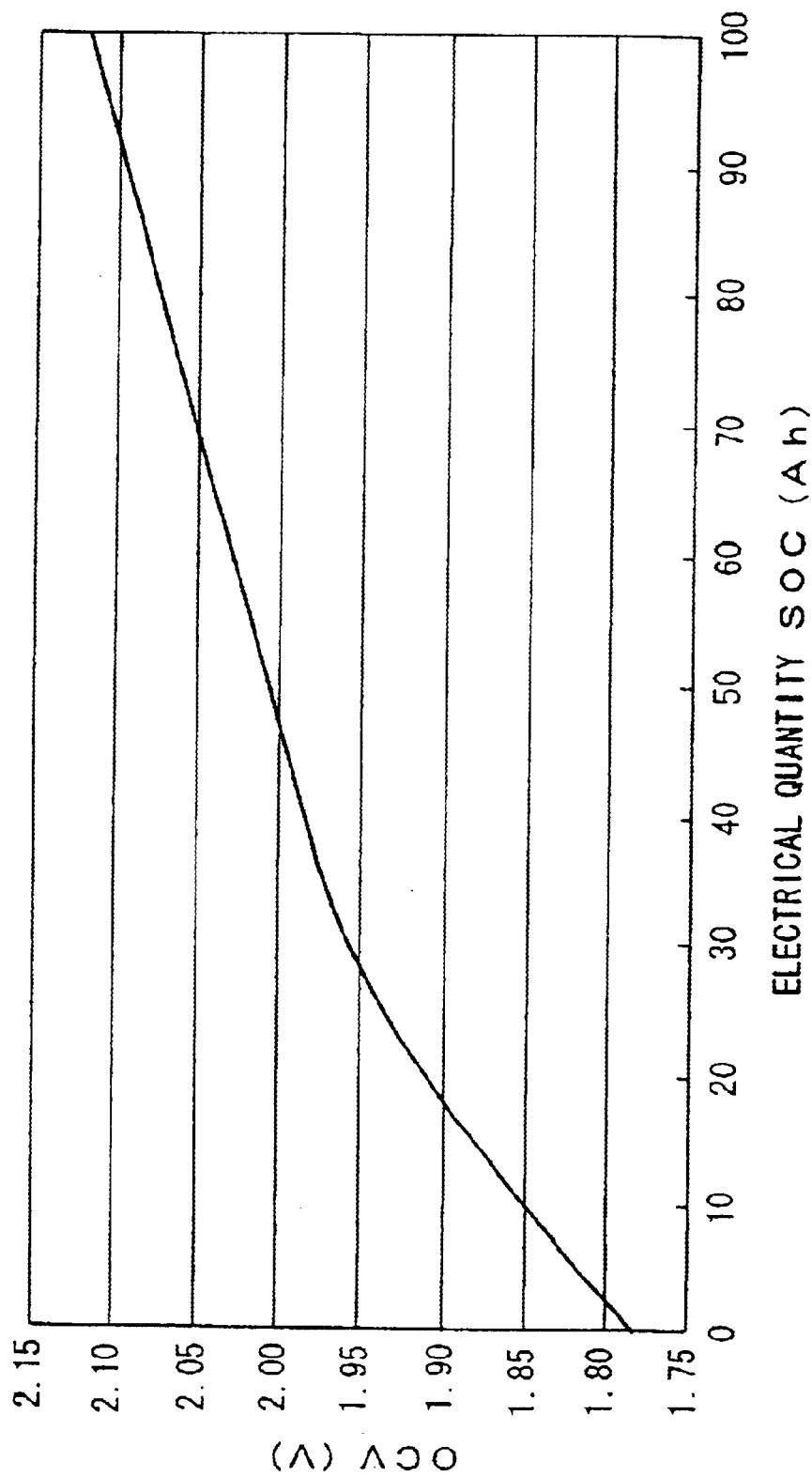
FIG. 29 is a graph illustrating a measured example of relation between OCV and SOC.

In the following, such an example will be explained. As is seen for a measured example of a relation between OCV and SOC shown in FIG. 29, actually, a relation between OCV and SOC is linear in a SOC range in which the SOC exceeds 20–30%, but in a SOC range in which the SOC is equal to or lower than 20–30%, the measured OCV deteriorates and the linear relation as described above is not seen.

Figure 30:
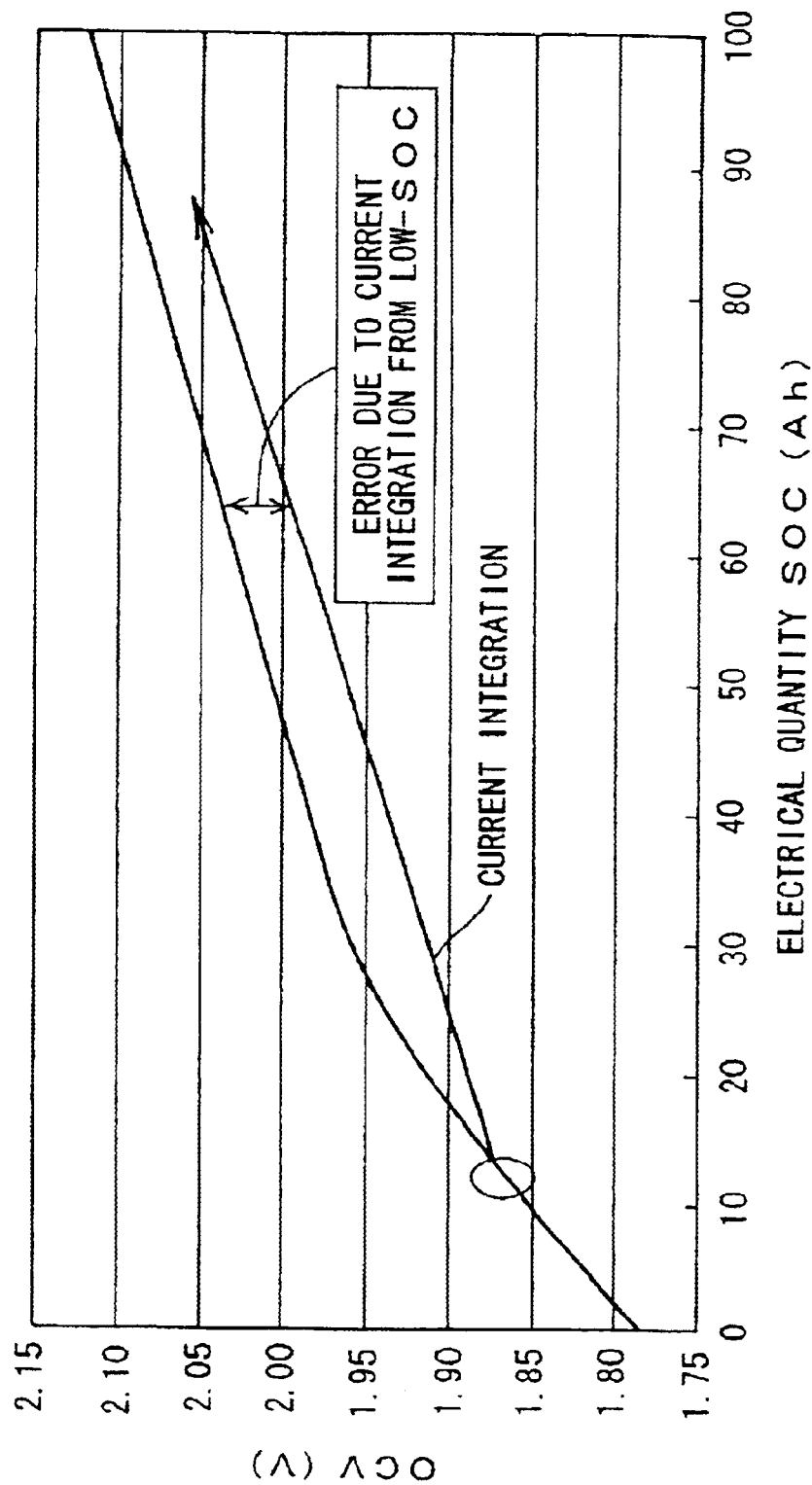
FIG. 30 is a graph illustrating the occurrence of an error upon conventional estimation of a state of charge.

In the preferred embodiment, when a charge or discharge is carried out, the SOCo is computed from the OCVo on the basis of the straight line N and then as to the computed SOCo, the charge or discharge current is integrated with multiplying by time, thereby computing a SOCn after the charge or discharge. However, as shown in FIG. 30, in a case in which a SOC after the charge is computed by time integration of the charge current starting from the low SOC state upon the charge, when the charge advances -and the SOC enters in a range in which the SOC after the charge exceeds 20–30%, there is arisen a problem that an OCV corresponding to the computed SOC on an OCV vs. SOC characteristic (dotted line in FIG. 30) obtained on the basis of the time integration of the charge current becomes different from an OCV on an OCV vs. SOC characteristic obtained by actual measurement.

Figure 31:
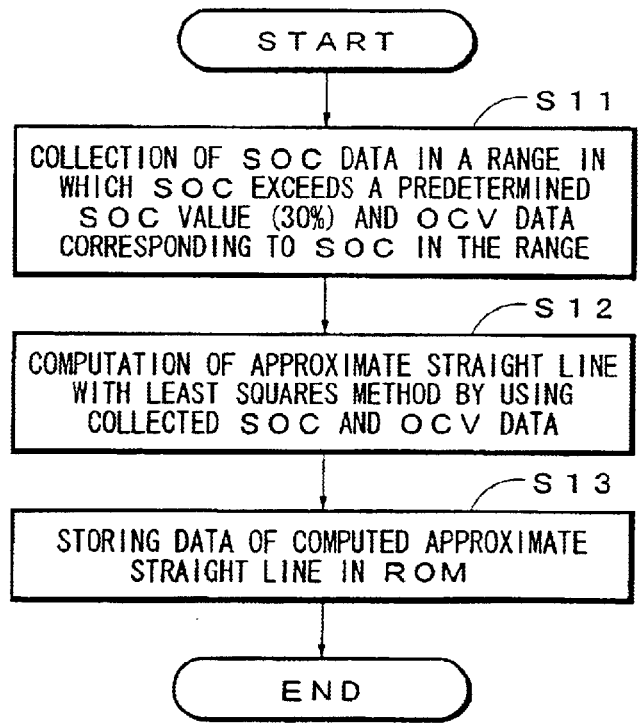
FIG. 31 is a flow chart for computing an approximate straight line as a relation between an open circuit voltage (OCV) and a state of charge (SOC) of a battery, which is set in advance.

In order to solve the above problem, the CPU 23a carries out a process for computing an approximate straight line as a relation between OCV and SOC of the battery, which is predetermined, according to a flow chart shown in FIG. 31.

Figure 34:
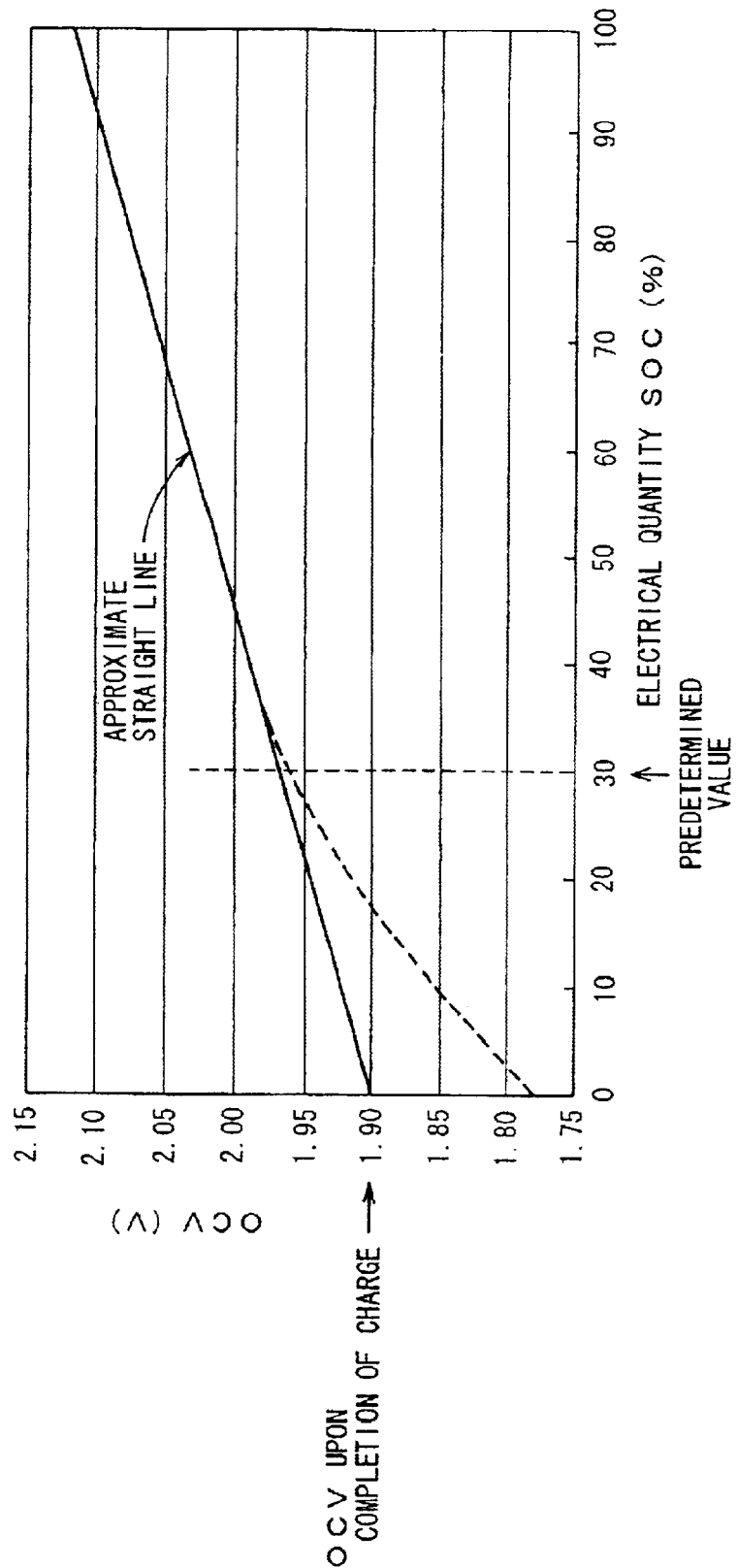
FIG. 34 is a graph illustrating an approximate straight line computed as a relation between an open circuit voltage (OCV) and a state of charge (SOC) of a battery, which is set in advance.
Figure 35:
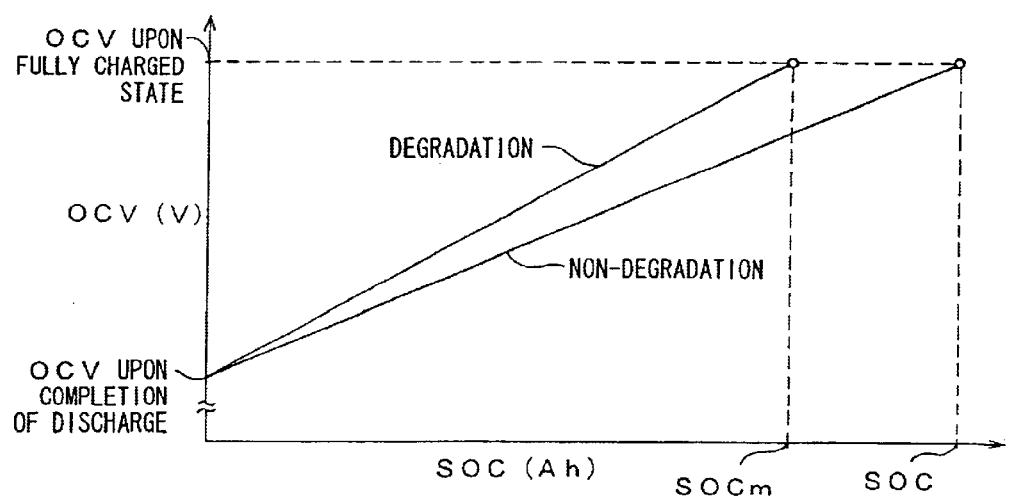
FIG. 35 is a graph illustrating a change in a characteristic of SOC versus OCV due to degradation.

First, only SOC data in a range in which the SOC exceeds a specific value (for example, 30%) of SOC for the battery 13 and OCV data corresponding to the SOC in the range are collected (step S11), then by using least squares method on the basis of the collected SOC and OCV data, an approximated straight line of SOC for OCV is computed (step S12). The above specific value is set on a point at which the relation between the measured OCV and the SOV corresponding to the measured OCV becomes non-linear in FIG. 29. A timing for computing the approximate straight line is a time point when a device for estimating SOC of the battery and a device for estimating OCV of the battery is designed. The computed approximate straight line is written and stored in a nonvolatile storage in the ROM 23c as an expression expressing a relation between OCV and SOC of the battery 13, which is predetermined (step S13). FIG. 34 shows such an approximate straight line computed as described above.

In the nonvolatile storage in the ROM 23c, a value of the OCV (hereinafter, $OCV_{th}$) corresponding to the above specific value (30%) of SOC is also stored.

Figure 32:
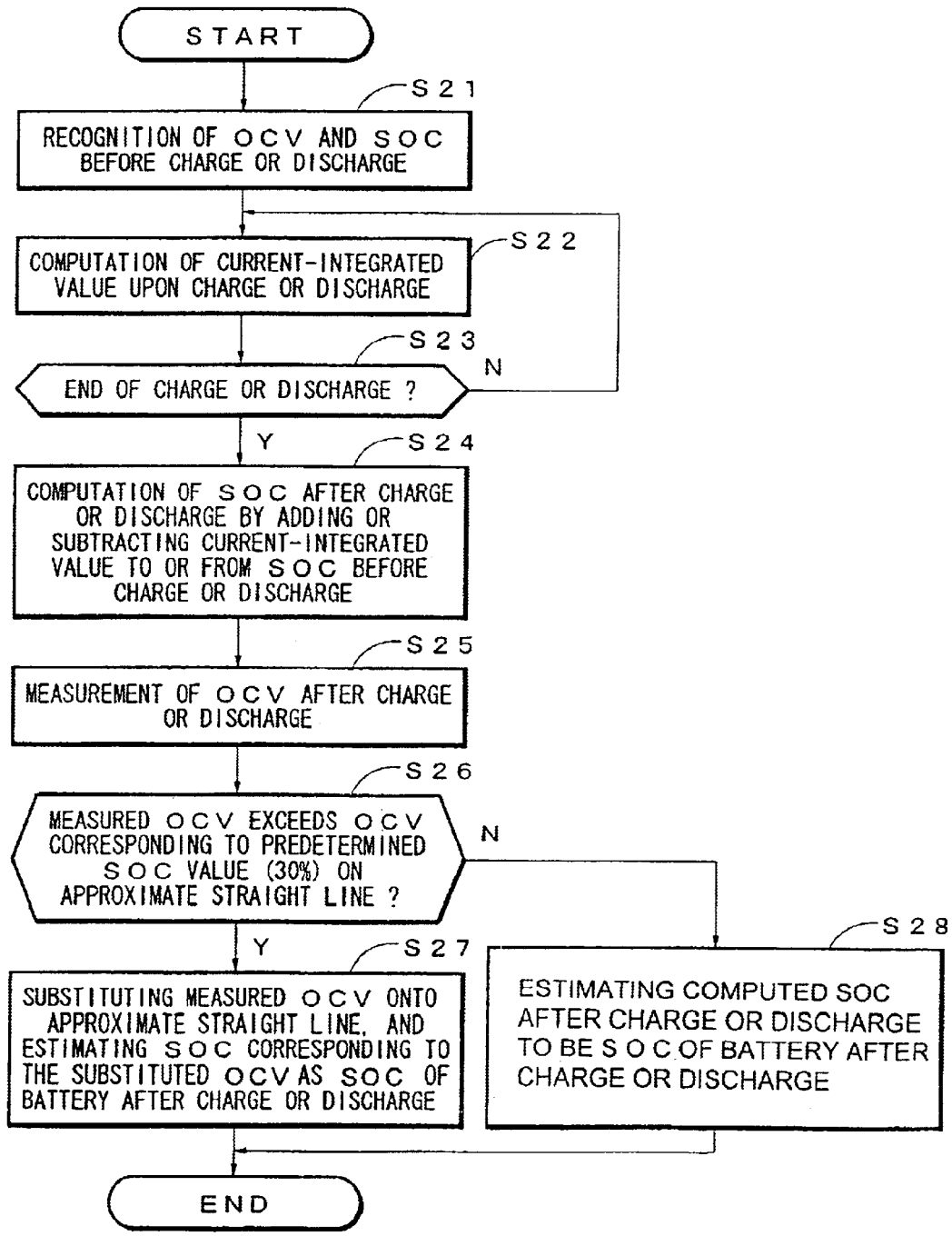
FIG. 32 is a flow chart, in which a process for estimating a state of charge SOC of a battery is carried out by using an approximate straight line computed in the flow chart shown in FIG. 31.

In the following, a method of estimating an electrical quantity (i.e., SOC) of the battery 13 as to a device 1 for controlling an on-vehicle battery will be explained with reference to a flow chart shown in FIG. 32. The CPU 23a carries out a process for estimating SOC of the battery by using the approximate straight line computed in the flow chart shown in FIG. 31, according to the flow chart shown in FIG. 32.

The CPU 23a starts an operation by switching on an ignition switch and first, computes OCVo (OCV before a charge or discharge) and SOCo (electrical quantity) (step S21).

Then, the CPU 23a computes the time integration of the current during the charge or discharge on the basis of an output from the current sensor 15 (step S22). This computation is carried out whenever the current sensor 15 measures the charge or discharge current in a specific sampling cycle, and then it is judged whether or not the charge or discharge is completed (step S23). This process is repeatedly carried out until the charge or discharge is completed.

When the charge or discharge is completed (Y in the step S23), the CPU 23a computes SOC after the charge or discharge by adding or subtracting the time integration of the current to or from the SOC before the charge or discharge (step S24). This computation can be carried out by using the expressions (6) and (7) as described above.

Then, the CPU 23a measures an OCVm (OCV after completion of the charge or discharge) (step S25). Then, the CPU 23a judges whether or not the measured OCVm exceeds the $OCV_{th}$ corresponding to the specific value (30%) of SOC on the approximate straight line (that is, whether or not OCVm>$OCV_{th}$) (step S26).

If the measured OCVm exceeds $OCV_{th}$ (Y in the step S26), the CPU 23a substitutes the measured OCVm into an expression of the approximate straight line read out from the ROM 23c and estimates a SOC corresponding to the substituted OCVm as a SOC of the battery 13 after the charge or discharge (step S27), thereby finishing the process.

On the other hand, if the measured OCVm does not exceed $OCV_{th}$ (N in the step S26), the CPU 23a substitutes the SOC after the charge or discharge computed in the step S24 into the expression of the approximate straight line read out from the ROM 23c and estimates the substituted SOC as a SOC of the battery 13 after the charge or discharge (step S28), thereby finishing the process.

Figure 33:
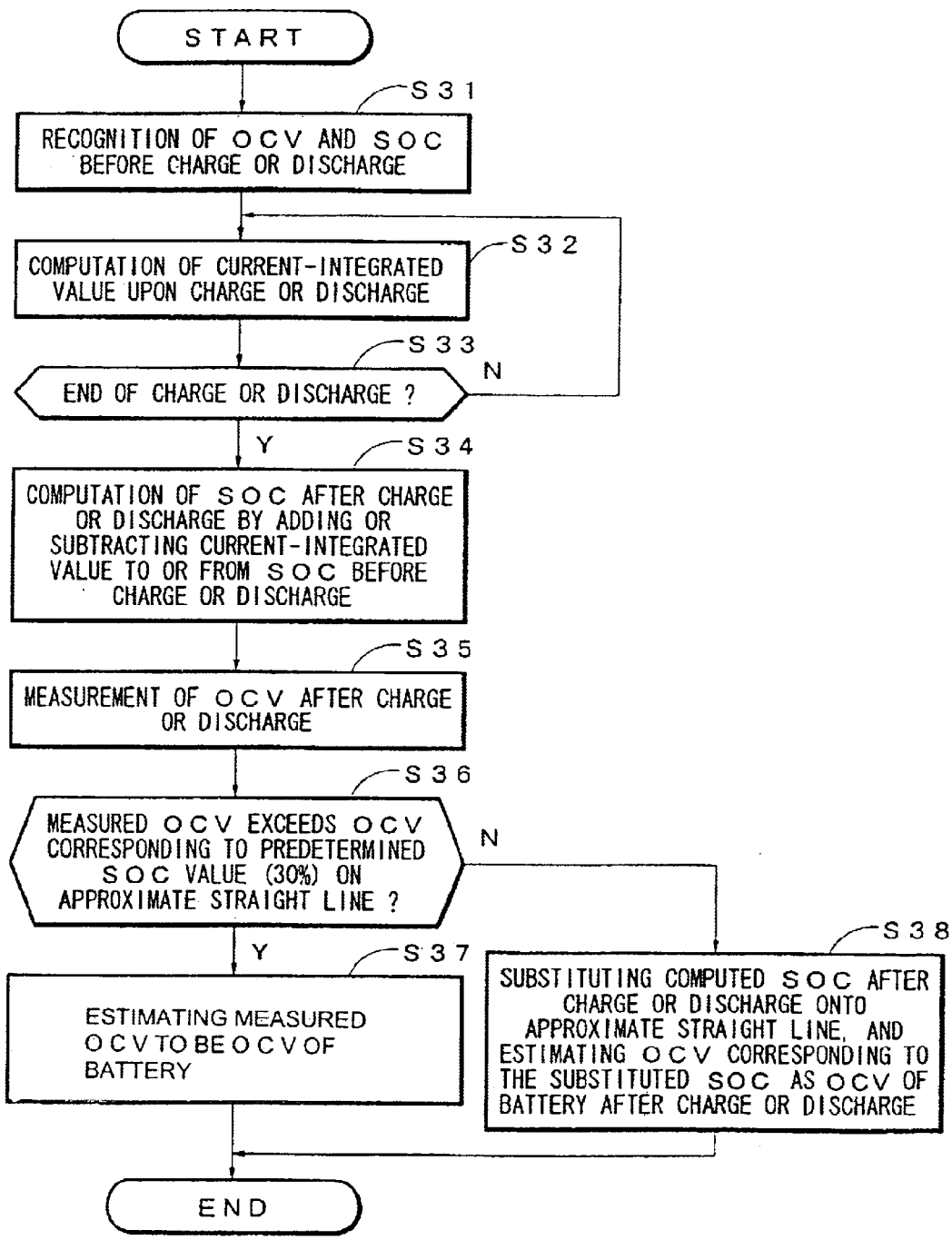
FIG. 33 is a flow chart, in which a process for estimating an open circuit voltage of a battery is carried out by using an approximate straight line computed in the flow chart shown in FIG. 31.

In the following, a method of estimating an open circuit voltage of the battery 13 as to a device 1 for controlling an on-vehicle battery will be explained with reference to a flow chart shown in FIG. 33, which is a flow chart in which a process for estimating an open circuit voltage of the battery 13 is carried out by using the approximate straight line computed in the flow chart shown in FIG. 31. The CPU 23a carries out the process shown in FIG. 33.

The CPU 23a starts an operation by switching on an ignition switch and first, computes OCVo (OCV before a charge or discharge) and SOCo (electrical quantity) (step S31).

Then, the CPU 23a computes the time integration of the current during the charge or discharge on the basis of an output from the current sensor 15 (step S32). This computation is carried out whenever the current sensor 15 measures the charge or discharge current in a specific sampling cycle, and then it is judged whether or not the charge or discharge is completed (step S33). This process is repeatedly carried out until the charge or discharge is completed.

When the charge or discharge is completed (Y in the step S33), the CPU 23a computes SOC after the charge or discharge by adding or subtracting the time integration of the current to or from the SOC before the charge or discharge (step S34). This computation can be carried out by using the expressions (6) and (7) as described above.

Then, the CPU 23a measures an OCVm (OCV after completion of the charge or discharge) (step S35).

Then, the CPU 23a judges whether or not the measured OCVm exceeds the $OCV_{th}$ corresponding to the specific value (30%) of SOC on the approximate straight line (that is, whether or not OCVm>$OCV_{th}$) (step S36).

If the measured OCVm exceeds $OCV_{th}$ (Y in the step S36), the CPU 23a substitutes the measured OCVm into an expression of the approximate straight line read out from the ROM 23c and estimates the substituted OCVm as an open circuit voltage of the battery 13 after the charge or discharge (step S37), thereby finishing the process.

On the other hand, if the measured OCVm does not exceed $OCV_{th}$ (N in the step S36), the CPU 23a substitutes the SOC after the charge or discharge computed in the step S24 into the expression of the approximate straight line read out from the ROM 23c and estimates an OCV corresponding to the substituted SOC as an open circuit voltage of the battery 13 after the charge or discharge (step S38), thereby finishing the process.

Thus, when a charge or discharge is carried out, as a relation between OCV and SOC of the battery 13, which are predetermined, by using SOC data in a range in which the SOC exceeds a specific value (30%) of SOC and OCV data corresponding to the SOC in the range, an approximate straight line is computed by least squares method, and then by using an expression expressing the computed straight line, a SOC after the charge or discharge and an OCV are estimated. That is, when an OCV is measured, if the OCV exceeds $OCV_{th}$, the measured OCV is substituted into an expression of the approximate straight line and a SOC corresponding to the measured OCV is estimated to be a SOC of the battery 13 after the charge or discharge, on the other hand if the OCV does not exceed $OCV_{th}$ (that is, if a relation between the measured OCV and SOC is not a linear relation as shown by a dotted line in FIG. 34), the measured OCV is neglected and not used for the conversion of SOC. Then, the SOC after the charge or discharge, which is computed by the time integration of the current, is substituted into the expression of the approximate straight line and the substituted SOC is stored in the RAM 23b as a SOC of the battery 13 after the charge or discharge, and an OCV corresponding to the substituted SOC is stored in the RAM 23b as an estimated OCV.

Therefore, with a method and device for estimating a state of charge, even in a range in which a relation between OCV and SOC becomes non-linear, a SOC can be accurately estimated.

When the degradation state of the battery 13 is to be known on the basis of a relation between SOC and OCV, by using an estimated OCV obtained by the method and device for estimating an open circuit voltage as described above, the degradation degree can be accurately computed.

Further, as a set value of an OCV upon completion of a discharge when the theoretical amount of coulomb (i.e., full capacity upon non-degradation) is estimated, an estimated OCV for SOC (%) obtained by the approximated straight line as described above can be used. In a calculation of the theoretical amount of coulomb which is used for estimating ADC, the estimation of ADC can be accurately carried out over the whole region of SOC by using the above-mentioned set value of an OCV upon completion of a discharge.

In the preferred embodiment as described above, the specific value of SOC is set to be 30%. However, instead, the specific value may be set to be a different value such as 20% and so on.

In the explanation described above, only the SOC data in a range, in which SOC exceeds the predetermined value (for example, 30%), and the OCV data corresponding to the SOC in the range are collected, then used is an approximate expression expressing an approximate straight line, which is computed from the collected SOC and OCV data. However, instead, used may be an approximate expression expressing an approximate curve computed from the collected SOC and OCV data, that is, an approximate curve having a slight curve, which is close to the approximate straight line described above.

The aforementioned preferred embodiments are described to aid in understanding the present invention and variations may be made by one skilled in the art without departing from the spirit and scope of the present invention.

What is claimed is:

1. A method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:
   computing, as a degradation degree, a ratio of a total electrical quantity chargeable or dischargeable of the battery at any time point to the initial electrical quantity; and
   multiplying an electrical quantity estimated corresponding to said any open circuit voltage by the degradation degree, thereby estimating a state of charge of the battery at said any time point.

2. A method of estimating a state of charge of a battery, in which an electrical quantity corresponding to any open circuit voltage of the battery is estimated on the basis of an initial electrical quantity that is a total electrical quantity chargeable or dischargeable between an open circuit voltage upon fully charged state and an open circuit voltage upon completion of a discharge which are predetermined for the battery upon non-degradation, the method comprising the steps of:
   computing, as a degradation degree, a ratio of a total electrical quantity chargeable or dischargeable between an open circuit voltage upon fully charged state and an open circuit voltage upon completion of a discharge of the battery at any time point to the initial electrical quantity; and
   multiplying an electrical quantity estimated corresponding to said any open circuit voltage by the degradation degree, thereby estimating a state of charge of the battery at said any time point.

3. The method of estimating a state of charge of a battery according to claim 2, wherein the open circuit voltage upon fully charged state and the open circuit voltage upon completion of a discharge for the battery upon non-degradation are determined on the basis of a relation between an open circuit voltage and a state of charge, which relation is predetermined as an approximate expression computed by using data of state of charge in a range in which the state of charge exceeds a predetermined state of charge and data of open circuit voltage corresponding to the state of charge in the range, and if said any open circuit voltage exceeds an open circuit voltage corresponding to the predetermined state of charge on the approximate expression, the electrical quantity corresponding to said any open circuit voltage is estimated to be a state of charge corresponding to an open circuit voltage which is obtained by substituting said any open circuit voltage into an expression of the approximate expression, and if said any open circuit voltage does not exceed an open circuit voltage corresponding to the predetermined state of charge on the approximate expression, the electrical quantity corresponding to said any open circuit voltage is estimated to be a state of charge which is computed by adding or subtracting an integrated value of a charge or discharge current to or from a state of charge before a start of a charge or discharge.

4. The method of estimating a state of charge of a battery according to claim 3, wherein the predetermined relation between an open circuit voltage and a state of charge of the battery is expressed by an approximate expression expressing an approximate straight line which is computed with least squares method by using data of state of charge in a range in which the state of charge exceeds a predetermined state of charge and data of open circuit voltage corresponding to the state of charge in the range.

5. A method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a ratio of a change in an open circuit voltage corresponding to any change in the electrical quantity of the battery upon non-degradation to a change in an open circuit voltage actually arising in the battery at any time point in response to said any change in the electrical quantity; and multiplying an electrical quantity estimated corresponding to said any open circuit voltage by the degradation degree, thereby estimating a state of charge of the battery at said any time point.

6. A method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a ratio of a change in an electrical quantity actually arising in the battery at any time point in response to a change in said any open circuit voltage to a change in an electrical quantity in response to a change in said any open circuit voltage of the battery upon non-degradation; and multiplying an electrical quantity estimated corresponding to said any open circuit voltage by the degradation degree, thereby estimating a state of charge of the battery at said any time point.

7. A method of estimating a state of charge of a battery, in which an electrical quantity corresponding to any open circuit voltage of the battery is estimated on the basis of an initial electrical quantity that is a total electrical quantity chargeable or dischargeable of the battery upon non-degradation, the method comprising the steps of:

computing, as a degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity; and multiplying an electrical quantity estimated corresponding to said any open circuit voltage by the degradation degree, thereby estimating a state of charge of the battery at said any time point.

8. A method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a total electrical quantity chargeable or dischargeable of the battery at any time point to the initial electrical quantity; and revising an open circuit voltage estimated corresponding to said any electrical quantity by the degradation degree, thereby estimating an open circuit voltage of the battery at said any time point.

9. A method of estimating an open circuit voltage of a battery, in which an open circuit voltage corresponding to any electrical quantity of the battery is estimated on the basis of an initial electrical quantity that is a total electrical quantity chargeable or dischargeable between an open circuit voltage upon fully charged state and an open circuit voltage upon completion of a discharge which are predetermined for the battery upon non-degradation, the method comprising the steps of:

computing, as a degradation degree, a ratio of a total electrical quantity chargeable or dischargeable between an open circuit voltage upon fully charged state and an open circuit voltage upon completion of a discharge of the battery at any time point to the initial electrical quantity; and revising an open circuit voltage estimated corresponding to said any electrical quantity by the degradation degree, thereby estimating an open circuit voltage of the battery at said any time point.

10. The method of estimating an open circuit voltage of a battery according to claim 9, wherein the open circuit voltage upon fully charged state and the open circuit voltage upon completion of a discharge for the battery upon non-degradation are determined on the basis of a relation between an open circuit voltage and a state of charge, which relation is predetermined as an approximate expression computed by using data of state of charge in a range in which the state of charge exceeds a predetermined state of charge and data of open circuit voltage corresponding to the state of charge in the range, and if the open circuit voltage corresponding to said any electrical quantity exceeds an open circuit voltage corresponding to the predetermined state of charge in the approximate expression, the open circuit voltage corresponding to said any electrical quantity is estimated to be an open circuit voltage which is measured after a charge or discharge, and if the open circuit voltage corresponding to said any electrical quantity does not exceed an open circuit voltage corresponding to the predetermined state of charge in the approximate expression, the open circuit voltage corresponding to said any electrical quantity is estimated to be an open circuit voltage corresponding to a state of charge which is obtained by substituting a state of charge, which is computed by adding or subtracting an integrated value of a charge or discharge current to or from a state of charge before a start of a charge or discharge, into the approximate expression.

11. The method of estimating an open circuit voltage of a battery according to claim 10, wherein the predetermined relation between an open circuit voltage and a state of charge of the battery is expressed by an approximate expression expressing an approximate straight line which is computed with least squares method by using data of state of charge in a range in which the state of charge exceeds a predetermined state of charge and data of open circuit voltage corresponding to the state of charge in the range.

12. A method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a change in an open circuit voltage corresponding to any change in the electrical quantity of the battery upon non-degradation to a change in an open circuit voltage actually arising in the battery at any time point in response to said any change in the electrical quantity; and revising an open circuit voltage estimated corresponding to said any electrical quantity by the degradation degree, thereby estimating an open circuit voltage of the battery at said any time point.

13. A method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a ratio of a change in an electrical quantity actually arising in the battery at any time point in response to a change in said any open circuit voltage to a change in an electrical quantity in response to a change in said any open circuit voltage of the battery upon non-degradation; and revising an open circuit voltage estimated corresponding to said any electrical quantity by the degradation degree, thereby estimating an open circuit voltage of the battery at said any time point.

14. A method of estimating an open circuit voltage of a battery, in which an open circuit voltage corresponding to any electrical quantity of the battery is estimated on the basis of an initial electrical quantity that is a total electrical quantity chargeable or dischargeable of the battery upon non-degradation, the method comprising the steps of:

computing, as a degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity; and revising an open circuit voltage estimated corresponding to said any electrical quantity by the degradation degree, thereby estimating an open circuit voltage of the battery at said any time point.

15. A method of computing a degradation degree of a battery comprising a step of computing, as the degradation degree, a ratio of a total electrical quantity chargeable or dischargeable of the battery at any time point to an initial electrical quantity that is a total electrical quantity chargeable or dischargeable of the battery upon non-degradation.

16. A method of computing a degradation degree of a battery comprising a step of computing, as the degradation degree, a ratio of a total electrical quantity chargeable or dischargeable between an open circuit voltage upon fully charged state and an open circuit voltage upon completion of a discharge of the battery at any time point to an initial electrical quantity, which is a total electrical quantity chargeable or dischargeable between an open circuit voltage upon fully charged state and an open circuit voltage upon completion of a discharge that are predetermined for the battery upon non-degradation.

17. A method of computing a degradation degree of a battery comprising a step of computing, as the degradation degree, a ratio of a change in an open circuit voltage corresponding to any change in an electrical quantity of the battery upon non-degradation to a change in an open circuit voltage actually arising in the battery at any time point in response to said any change in the electrical quantity.

18. The method of computing a degradation degree of a battery according to claim 17, wherein a discharge current flowing during a discharge is intermittently measured and the measured discharge current is integrated with time, thereby computing said any decrease in the electrical quantity.

19. The method of computing a degradation degree of a battery according to claim 17, wherein a charge current flowing during a charge is intermittently measured and the measured discharge current is integrated with time by multiplying a real-time charging efficiency, thereby computing said any increase in the electrical quantity.

20. The method of computing a degradation degree of a battery according to claim 17, wherein a change in an open circuit voltage in response to said any change in the electrical quantity is computed as a difference between an open circuit voltage before a start of charge or discharge, which is estimated or measured from a terminal voltage of the battery, and an open circuit voltage after a halt of charge or discharge, which is computed on the basis of an initial electrical quantity that is a total electrical quantity chargeable or dischargeable of the battery upon non-degradation, and the change in an open circuit voltage actually arising in the battery at any time point in response to said any change in the electrical quantity is computed as a difference between an open circuit voltage before a start of charge or discharge, which is estimated or measured from a terminal voltage of the battery, and an open circuit voltage after a halt of charge or discharge, which is estimated or measured from a terminal voltage of the battery.

21. The method of computing a degradation degree of a battery according to claim 18, wherein a change in an open circuit voltage in response to said any change in the electrical quantity is computed as a difference between an open circuit voltage before a start of charge or discharge, which is estimated or measured from a terminal voltage of the battery, and an open circuit voltage after a halt of charge or discharge, which is computed on the basis of an initial electrical quantity that is a total electrical quantity chargeable or dischargeable of the battery upon non-degradation, and the change in an open circuit voltage actually arising in the battery at any time point in response to said any change in the electrical quantity is computed as a difference between an open circuit voltage before a start of charge or discharge, which is estimated or measured from a terminal voltage of the battery, and an open circuit voltage after a halt of charge or discharge, which is estimated or measured from a terminal voltage of the battery.

22. The method of computing a degradation degree of a battery according to claim 19, wherein a change in an open circuit voltage in response to said any change in the electrical quantity is computed as a difference between an open circuit voltage before a start of charge or discharge, which is estimated or measured from a terminal voltage of the battery, and an open circuit voltage after a halt of charge or discharge, which is computed on the basis of an initial electrical quantity that is a total electrical quantity chargeable or dischargeable of the battery upon non-degradation, and the change in an open circuit voltage actually arising in the battery at any time point in response to said any change in the electrical quantity is computed as a difference between an open circuit voltage before a start of charge or discharge, which is estimated or measured from a terminal voltage of the battery, and an open circuit voltage after a halt of charge or discharge, which is estimated or measured from a terminal voltage of the battery.

23. A method of computing a degradation degree of a battery comprising a step of computing, as the degradation degree, a ratio of a change in an electrical quantity actually arising in the battery at any time point in response to said any change in an open circuit voltage to a change in an electrical quantity in response to any change in an open circuit voltage of the battery upon non-degradation.

24. A method of computing a degradation degree of a battery comprising a step of computing, as the degradation degree, a value obtained by multiplying a first ratio and a second ratio, wherein the first ratio is a ratio of a difference between an open circuit voltage upon fully charged state and an open circuit voltage upon completion of a discharge of the battery at any time point to a difference between those of the battery upon non-degradation, and the second ratio is a ratio of a change in an open circuit voltage in response to any change in an electrical quantity for the battery upon non-degradation to a change in an open circuit voltage actually arising in the battery at any time point in response to said any change in an electrical quantity.

25. A device for computing a degradation degree of a battery comprising:

first means for computing a change in an electrical quantity during a charge or discharge of a battery;

second means for computing a change in an open circuit voltage in response to any change in an electrical quantity computed by the first means on the basis of an initial electrical quantity that is a total electrical quantity chargeable or dischargeable of the battery upon non-degradation;

third means for estimating or measuring a change in an open circuit voltage actually arising in the battery at any time point in response to said any change in an electrical quantity; and fourth means for computing, as the degradation degree, a rate of the change in an open circuit voltage computed by the second means to the change in an open circuit voltage estimated or measured by the third means.

* * * * *